US009045569B2

(12) United States Patent
Jensen et al.

(10) Patent No.: US 9,045,569 B2
(45) Date of Patent: Jun. 2, 2015

(54) PROCESS OF MAKING MODIFIED METALLOCENE CATALYST, CATALYST PRODUCED AND USE THEREOF

(75) Inventors: Michael D. Jensen, Laurel, MD (US); Michael J. Elder, Baltimore, MD (US); Andrew G. Singleton, Ellicott City, MD (US); Stephen R. Schmidt, Silver Spring, MD (US); Patrick J. Kerwin, Grasonville, MD (US); John H. Hain, Jr., Woodstock, MD (US); Fengjun Hua, Ellicott City, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 6 days.

(21) Appl. No.: 13/979,541

(22) PCT Filed: Jan. 12, 2012

(86) PCT No.: PCT/US2012/021072
§ 371 (c)(1),
(2), (4) Date: Jul. 12, 2013

(87) PCT Pub. No.: WO2012/097146
PCT Pub. Date: Jul. 19, 2012

(65) Prior Publication Data
US 2013/0289227 A1    Oct. 31, 2013

Related U.S. Application Data

(60) Provisional application No. 61/432,956, filed on Jan. 14, 2011.

(51) Int. Cl.
*C08F 4/653* (2006.01)
*C08F 4/642* (2006.01)
(Continued)

(52) U.S. Cl.
CPC . *C08F 4/76* (2013.01); *B01J 31/00* (2013.01); *C08F 2410/01* (2013.01); *C08F 10/02* (2013.01); *C08F 4/65912* (2013.01); *C08F 4/65916* (2013.01); *C08F 4/65925* (2013.01)

(58) Field of Classification Search
CPC ............. C08F 4/65904; C08F 4/65908; C08F 4/65912; C08F 4/65916; C08F 4/6592; C08F 10/00
USPC .......... 502/103, 113, 120, 152; 526/113, 114, 526/160, 165, 348, 943
See application file for complete search history.

(56) References Cited

U.S. PATENT DOCUMENTS
2,827,446 A    3/1958  Breslow .................. 260/94.9
(Continued)

FOREIGN PATENT DOCUMENTS
CN       100379769 C   4/2008
EP       426637        5/1991  .............. C08F 4/603
(Continued)

OTHER PUBLICATIONS
Chien, "Kinetics of Ethylene Polymerization Catalyzed by Bis-(cyclopentadienyl)-titanium Dichloride-Dimethylaluminum Chloride", JACS (1959), 81: 86-92.
(Continued)

*Primary Examiner* — Caixia Lu
(74) *Attorney, Agent, or Firm* — Lerner, David, Littenberg, Krumholz & Mentlik, LLP

(57) ABSTRACT

Olefin polymerization catalysts or catalyst systems comprising a mixture, contact product, reaction product or complex comprising as elements or components: (A) at least one metallocene pre-catalyst compound or polymerization active metallocene compound; (B) at least one titanium containing metallocene compound; and when (A) is a metallocene pre-catalyst compound, (C) at least one activator; provided however: (I) the titanium-containing metallocene compound is inactive or substantially inactive for the polymerization of olefins prior to or concurrently with the use of the catalyst system for olefin polymerization. Also disclosed are processes for producing the catalyst system and polyolefins having desirable combinations of properties, including melt index and molecular weight distribution, which properties are particularly desirable for the manufacture of polyolefin film products, especially LLDPE film A preferred catalyst comprises a zirconium or hafnium metal containing metallocene, an inactivated titanocene and a SiO2 support carrier.

20 Claims, 6 Drawing Sheets

(51) Int. Cl.

| | |
|---|---|
| C08F 4/643 | (2006.01) |
| C08F 4/6592 | (2006.01) |
| C08F 10/00 | (2006.01) |
| C08F 4/76 | (2006.01) |
| B01J 31/00 | (2006.01) |
| C08F 10/02 | (2006.01) |
| C08F 4/659 | (2006.01) |

(56) References Cited

U.S. PATENT DOCUMENTS

| | | | |
|---|---|---|---|
| 3,051,690 A | 8/1962 | Vandenberg | |
| 3,104,249 A | 9/1963 | Clauss et al. | 260/429.5 |
| 4,530,914 A | 7/1985 | Ewen et al. | 502/113 |
| 4,542,199 A | 9/1985 | Kaminsky et al. | 526/160 |
| 4,752,597 A | 6/1988 | Turner | 502/104 |
| 4,792,588 A | 12/1988 | Suga et al. | |
| 4,871,705 A | 10/1989 | Hoel | 502/117 |
| 4,937,299 A | 6/1990 | Ewen et al. | 526/119 |
| 4,939,217 A | 7/1990 | Stricklen | |
| 5,032,563 A | 7/1991 | Matsuura et al. | |
| 5,041,584 A | 8/1991 | Crapo et al. | 556/179 |
| 5,064,797 A | 11/1991 | Stricklen | 502/111 |
| 5,064,802 A | 11/1991 | Stevens et al. | 502/155 |
| 5,225,500 A | 7/1993 | Elder et al. | 526/127 |
| 5,234,723 A | 8/1993 | Babacz | |
| 5,243,002 A | 9/1993 | Razavi | 526/170 |
| 5,279,999 A | 1/1994 | DeBoer et al. | 502/117 |
| 5,281,679 A | 1/1994 | Jejelowo et al. | 526/114 |
| 5,284,613 A | 2/1994 | Ali et al. | |
| 5,308,815 A | 5/1994 | Sangokoya | 502/104 |
| 5,321,106 A | 6/1994 | LaPointe | 526/126 |
| 5,382,630 A | 1/1995 | Stehling et al. | 525/240 |
| 5,399,636 A | 3/1995 | Alt et al. | 526/129 |
| 5,427,991 A | 6/1995 | Turner | 502/103 |
| 5,432,242 A | 7/1995 | Baron | |
| 5,468,707 A | 11/1995 | Pohl et al. | |
| 5,516,861 A | 5/1996 | Jejelowo | 526/126 |
| 5,541,272 A | 7/1996 | Schmid et al. | 526/160 |
| 5,547,675 A | 8/1996 | Canich | 502/117 |
| 5,578,537 A | 11/1996 | Herrmann et al. | 502/120 |
| 5,595,950 A | 1/1997 | Sagar et al. | 502/104 |
| 5,614,455 A | 3/1997 | Herrmann et al. | 502/111 |
| 5,624,878 A | 4/1997 | Devore et al. | 502/152 |
| 5,625,015 A | 4/1997 | Brinen et al. | 526/160 |
| 5,629,253 A | 5/1997 | Chang | 502/111 |
| 5,639,835 A | 6/1997 | Jejelowo | 526/129 |
| 5,643,847 A | 7/1997 | Walzer, Jr. | 502/117 |
| 5,648,310 A | 7/1997 | Wasserman et al. | 502/120 |
| 5,665,665 A | 9/1997 | Brinen et al. | 502/9 |
| 5,672,669 A | 9/1997 | Wasserman et al. | 526/170 |
| 5,674,795 A | 10/1997 | Wasserman et al. | 502/9 |
| 5,721,184 A | 2/1998 | Brinen et al. | 502/104 |
| 5,739,368 A | 4/1998 | Krzystowczyk et al. | 556/187 |
| 5,756,609 A | 5/1998 | Cohen | |
| 5,767,032 A | 6/1998 | Hokkanen et al. | 502/108 |
| 5,783,512 A | 7/1998 | Jacobsen et al. | 502/124 |
| 5,786,291 A | 7/1998 | Speca et al. | 502/104 |
| 5,807,938 A | 9/1998 | Kaneko et al. | 526/160 |
| 5,863,853 A | 1/1999 | Vaughan et al. | 502/108 |
| 5,880,056 A | 3/1999 | Tsutsui et al. | 502/103 |
| 5,902,766 A | 5/1999 | Butler et al. | 502/152 |
| 5,977,251 A | 11/1999 | Kao et al. | 525/53 |
| 6,043,325 A | 3/2000 | Tsutsui et al. | 526/160 |
| 6,090,740 A | 7/2000 | Agapiou et al. | 502/104 |
| 6,159,888 A | 12/2000 | Welch et al. | 502/117 |
| 6,218,330 B1 | 4/2001 | Razavi et al. | 502/107 |
| 6,228,959 B1 | 5/2001 | Nagy | 526/134 |
| 6,258,903 B1 | 7/2001 | Mawson et al. | 502/113 |
| 6,271,321 B1 | 8/2001 | Ford et al. | |
| 6,316,556 B1 | 11/2001 | Kallio et al. | |
| 6,319,989 B1 | 11/2001 | Anderson et al. | 525/191 |
| 6,342,622 B1 | 1/2002 | Arts et al. | |
| 6,417,130 B1 | 7/2002 | Mink et al. | |
| 6,420,501 B1 | 7/2002 | Uwai et al. | 526/165 |
| 6,479,599 B1 | 11/2002 | Peil et al. | 526/127 |
| 6,555,495 B2 | 4/2003 | Peterson et al. | 502/104 |
| 6,559,090 B1 | 5/2003 | Shih | 502/152 |
| 6,573,343 B1 | 6/2003 | Follestad | 526/65 |
| 6,656,866 B2 | 12/2003 | Wenzel | 502/117 |
| 6,664,352 B1 | 12/2003 | Fredriksen et al. | 526/160 |
| 6,683,149 B2 | 1/2004 | Jain et al. | 526/348 |
| 6,686,306 B2 | 2/2004 | Shih | 502/113 |
| 6,703,340 B2 | 3/2004 | Yang et al. | 502/152 |
| 6,713,575 B2 | 3/2004 | Yang et al. | 526/160 |
| 6,740,617 B2 | 5/2004 | Mink et al. | 502/152 |
| 6,774,194 B2 | 8/2004 | Albizzati et al. | 526/161 |
| 6,833,416 B2 | 12/2004 | Kinnan et al. | |
| 6,833,417 B2 | 12/2004 | Ehrman et al. | 526/82 |
| 6,894,131 B2 | 5/2005 | McCullough et al. | 526/160 |
| 6,943,224 B2 | 9/2005 | Shih | 526/113 |
| 7,005,491 B2 | 2/2006 | Weng et al. | 526/336 |
| 7,101,936 B2 | 9/2006 | Weng et al. | |
| 7,132,382 B2 | 11/2006 | McCullough et al. | 502/120 |
| 7,148,298 B2 | 12/2006 | Jensen et al. | |
| 7,192,902 B2 | 3/2007 | Brinen et al. | 502/129 |
| 7,247,680 B2 | 7/2007 | Marechal | |
| 7,256,247 B2 | 8/2007 | Shamshoum et al. | |
| 7,276,566 B2 | 10/2007 | Muruganandam et al. | 526/160 |
| 7,410,926 B2 | 8/2008 | Kao | 502/113 |
| 7,429,634 B2 | 9/2008 | Brant et al. | 526/64 |
| 7,452,948 B2 | 11/2008 | Jacobsen et al. | 526/160 |
| 7,470,758 B2 | 12/2008 | Jensen et al. | 526/160 |
| 7,517,939 B2 | 4/2009 | Yang et al. | 526/129 |
| 7,538,168 B2 | 5/2009 | Voskoboynikov et al. | |
| 7,557,171 B2 | 7/2009 | Voskoboynikov et al. | |
| 7,566,677 B2 | 7/2009 | Muruganandam et al. | 502/120 |
| 7,576,163 B2 | 8/2009 | Yang et al. | 526/160 |
| 7,579,415 B2 | 8/2009 | Agapiou et al. | 526/165 |
| 7,652,160 B2 | 1/2010 | Yang et al. | 556/53 |
| 7,662,894 B2 | 2/2010 | Hamed et al. | 526/113 |
| 7,667,064 B2 | 2/2010 | Voskoboynikov et al. | |
| 7,714,072 B2 | 5/2010 | Michie, Jr. et al. | |
| 7,732,542 B2 | 6/2010 | Yang et al. | |
| 7,790,820 B2 | 9/2010 | Jensen et al. | |
| 7,799,879 B2 | 9/2010 | Crowther et al. | |
| 2001/0037005 A1 | 11/2001 | Weatherhead | 526/160 |
| 2002/0119890 A1 | 8/2002 | Wenzel et al. | 502/439 |
| 2004/0132935 A1 | 7/2004 | Arjunan et al. | 526/160 |
| 2005/0182210 A1 | 8/2005 | Muruganandam et al. | 526/160 |
| 2006/0287449 A1 | 12/2006 | Miyamoto et al. | |
| 2007/0167578 A1 | 7/2007 | Arriola et al. | |
| 2008/0146755 A1 | 6/2008 | Hamed et al. | |
| 2008/0312390 A1 | 12/2008 | Dong et al. | 526/116 |
| 2009/0270570 A1 | 10/2009 | Tsuda et al. | 526/159 |
| 2010/0234547 A1 | 9/2010 | Kolb et al. | 526/172 |
| 2010/0331501 A1 | 12/2010 | Murray et al. | |
| 2010/0331505 A1 | 12/2010 | Masino et al. | |

FOREIGN PATENT DOCUMENTS

| | | | |
|---|---|---|---|
| EP | 426638 | 5/1991 | C08F 4/602 |
| EP | 890581 | 1/1999 | C08F 4/64 |
| EP | 1605000 A1 | 12/2005 | |
| KR | 100691576 B1 | 3/2007 | |
| WO | 9114713 | 10/1991 | C08F 4/646 |
| WO | 9200333 | 1/1992 | C08F 4/76 |
| WO | 9428064 A1 | 12/1994 | |
| WO | 9743323 A1 | 11/1997 | |
| WO | 2005090427 | 9/2005 | C08F 297/08 |

OTHER PUBLICATIONS

Grassi et al., "Reductive Decomposition of Cationic Half-Titanocene (IV) Complexes, Precursors of the Active Species in Syndiospecific Styrene Polymerization", Organometallics (1996), 15: 480-482.

Henrici-Olive et al., "The Active Species in Homogeneous Ziebler-Natta Catalysts for the Polymerization of Ethylene", Angew. Chem. Inter. Ed. (1967), 6(9): 790-798.

Wild et al., "Synthesis and Molecular Structures of Chiral ansa-Titanocene Derivatives with Bridged Tetrahydroindenyl Ligands", Journal of Organometallic Chemistry (1982), 232: 233-247.

International Search Report and Written Opinion issued May 8, 2012 for International Application No. PCT/US12/21072.

US 9,045,569 B2

PROCESS OF MAKING MODIFIED METALLOCENE CATALYST, CATALYST PRODUCED AND USE THEREOF

RELATED APPLICATIONS

This application claims the benefit of the filing date of International Patent Application No. PCT/US2012/021072 filed Jan. 12, 2012, which claims the priority and the benefit of the filing date of U.S. Provisional Patent Application No. 61/432,956 filed Jan. 14, 2011, the disclosure of which is hereby incorporated by reference.

BACKGROUND OF THE INVENTION

Embodiments of the present invention relate to processes for preparing active catalysts, including supported catalysts, suitable for the polymerization or copolymerization of olefins and the products, including polymer polymerization products produced in accordance with the processes described. Such products are typically industrially and commercially useful polymers.

Catalyst compositions comprising organometallic complex compounds generally including metallocenes, in combination with an activator, such as aluminoxane, are known for the polymerizing olefins and such catalysts are generally considered valuable in view of their good activity, in other words, the ability to produce a high quantity of olefin polymer for each gram of catalyst. Properties of the polymers produced using such catalysts can be affected not only by polymerization process conditions but also by characteristics of the catalyst composition such as its chemical composition, morphology and the like. In particular, it is recognized that further improvements are needed to identify catalysts and catalyst systems that are active and capable of producing useful polymers such as high molecular weight polymers possessing or exhibiting a low melt index.

Use of catalyst systems of the present invention in various polymerization processes can provide products which exhibit different properties. In the case of olefin polymers, their suitability for particular applications depends, for example, on the nature of the monomers on which they are based and on the choice and ratio of comonomers and the typical physical parameters which characterize the polymer, such as number average (Mn) or weight average (Mw) molecular weight, molecular weight distribution (expressed, for example, as Mw/Mn), degree of branching, degree of crosslinking, crystallinity, density, presence of functional groups in the polymer and the like, as well as on polymer properties resulting from the process used, such as the content of low molecular weight impurities the presence of catalyst residues, etc., as well as costs.

Various classes or types of single site or metallocene catalyst systems produce polymers having generally recognized properties derived from the uniformity of a catalytically active site. Thus, such catalysts typically produce polymers having narrow molecular weight distributions (Mw/Mn equal to about 2 or less) and uniform polymer architecture. The uniformity of single-site catalysts typically results in uniform polymer chains in terms of, for example, the distribution of short chain branching throughout the polymer chains. Additionally, the response of single-site catalysts to polymerization conditions or the use of comonomers or chain terminating agents, such as hydrogen, allows for tailoring the polymer architecture, and thus properties of the polymers produced.

In contrast, traditional Ziegler-Natta (Z-N) catalysts, based on titanium (Ti) and magnesium (Mg), typically produce broader molecular weight distribution polymers, for example Mw/Mn=4 to 6. The active catalytic sites of such Z-N catalysts are not uniform and the different sites present typically react differently to polymerization conditions, as well as to comonomer or the use of hydrogen. Thus, the resulting polymer chains do not exhibit a uniform architecture. Thus, controlling polymer properties can be difficult because of the differing response of the mixture of active sites in Z-N catalysts to varying conditions and monomers or reactants. For example, film produced using linear low density polyethylene (LLDPE) produced with traditional Z-N catalysts may be inferior to film based on LLDPE produced with metallocene catalysts (also referred to as m-LLDPE) with respect to, for example, the efficiency of comonomer usage to achieve a desired density, or film properties such as film clarity or puncture resistance. However, one advantage of traditional Z-N catalysts over metallocene catalysts is their ability, under typical polymerization conditions, to produce polymers having sufficiently high Mw to be useful in film processing, where melt strength is critical for processing, or having other desirable polymer properties or both. In the absence of added hydrogen during polymerization, Z-N catalysts are capable of producing ultra-high molecular weight polyolefin polymers or resins, having values of Mw≥1,000,000. For resins that typically require lower Mw, such as those used to produce LLDPE film, hydrogen can be introduced to the polymerization reactor where it functions as a chain terminating agent, thereby lowering Mw. In contrast, many metallocene catalysts, especially very active metallocenes, can not produce polymers having the desired molecular weight for the target application, e.g., LLDPE film, under practical polymerization conditions. Thus there remains a need for improved catalyst systems capable of producing polymers having a uniform polymer architecture, particularly at desirably high molecular weight as measured, for example, by a low melt index. The present invention addresses such needs as well as others.

BRIEF SUMMARY OF THE INVENTION

An embodiment of the invention comprises an olefin polymerization catalyst or catalyst system comprising a mixture, contact product, reaction product or complex comprising as elements or components: (A) at least one metallocene pre-catalyst compound or polymerization-active metallocene compound; (B) at least one titanium-containing metallocene compound; and when (A) is a metallocene pre-catalyst compound, (C) at least one compound selected from the group consisting of: (c1) an organoaluminum oxy-compound; (c2) an ionizing ionic compound; and (c3) an organoaluminum compound; provided however: (I) the titanium-containing metallocene compound is inactive or substantially inactive for the polymerization of olefins; or (II) if the titanium containing metallocene compound is initially active or capable of being activated for olefin polymerization and thus includes titanium which exhibits an oxidation state of $Ti^{+4}$, the titanium present in the compound is reduced to an oxidation state of $Ti^{+3}$ so that the titanium containing metallocene compound is inactive or substantially inactive prior to or concurrently with the use of the catalyst system for olefin polymerization.

Another embodiment comprises a process for preparing the above-described catalyst system wherein a titanocene pre-catalyst compound is deactivated towards olefin polymerization by reacting it with an organoaluminum compound. In a preferred embodiment the organoaluminum compound is an aluminum alkyl, such as tri-isobutylaluminum, triethylaluminum, di-isobutylaluminum hydride or diethylaluminum chloride.

In another embodiment the catalyst system is used to produce a polyolefin, preferably polyethylene such as linear low density polyethylene (LLDPE) exhibiting a desirable combination of properties that make it particularly suitable for producing film. The polymers include those exhibiting narrow molecular weight distributions (as indicated by weight to number average ratios, Mw/Mn), for example, less than about 3, such as about 2.0 to about 2.6. Additionally, in the absence of added hydrogen during polymerization, polyethylene polymers produced using catalysts of the invention also exhibit low melt index values (MI), for example, values of about 1 or less, for example about 0 to about 0.8, as measured according to ASTM D 1238, Condition E. Furthermore, in another embodiment LLDPE with a melt index of about 1 may be obtained by the addition of hydrogen during polymerization.

In still another embodiment a polymerization catalyst is prepared using the above processes and wherein the active catalyst is supported on carrier such as $SiO_2$ including a Group 3 to Group 10 metal-containing metallocene complex is mixed with aluminoxane as a co-catalyst or catalyst activator to produce a catalyst system suitable for homopolymerizing an olefin such as ethylene or copolymerizing an olefin such as ethylene with at least one $C_3$ to $C_{20}$ alpha-olefin monomer to form a polymer under olefin polymerization conditions. A particularly preferred embodiment comprises an active metallocene, such as a zirconocene, an inactive or substantially inactive titanocene and aluminoxane, particularly methylaluminoxane (MAO).

DETAILED DESCRIPTION

Figure 1:
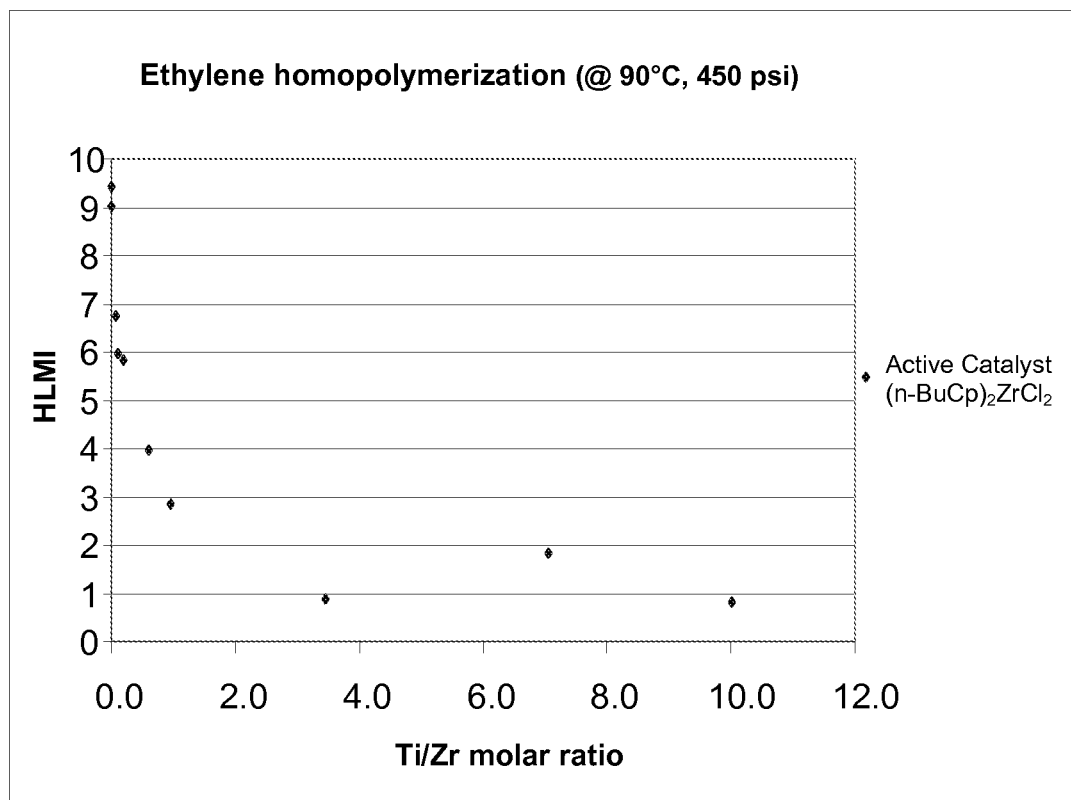
FIG. 1 illustrates the performance of catalysts prepared according to the invention in terms of the molar ratio of titanium in the deactivated titanocene to zirconium in the active zirconocene on high load melt index (HLMI) of polyethylene produced with the catalyst system.

High molecular weight polyolefins are particularly useful industrial polymers. Thus it is desirable to increase the molecular weight of polyolefins that are synthesized using simple, inexpensive active metallocene catalysts, such as bis(n-butylcyclopentadienyl)-zirconium dichloride or bis(indenyl)-zirconium dichloride or rac-bis(indenyl)ethan-1,2-diylzirconium dichloride or bis(1-n-butyl-3-methyl-cyclopentadienyl)zirconium dichloride and the like. Zirconium-based metallocene catalysts such as these have limited utility because of their inability to produce sufficiently high molecular weight (low melt-index) polyolefins.

Definitions

As used herein the following terms or phrases have the indicated meanings.

Aluminoxane, alternatively referred to in the literature and herein as alumoxane, is generally understood by those skilled in the art to include a class of compounds, including mixtures of compounds, having a linear or cyclic structure, or a mixture of linear and cyclic structures, as shown by the chemical formulas below:

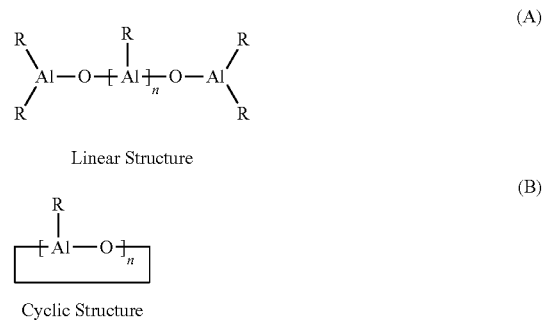

(A) Linear Structure (B) Cyclic Structure wherein in the above formulas, R is a hydrocarbon group, such as an alkyl group of 1 to 20 carbon atoms, preferably 1 to 12 carbon atoms, more preferably 1 to 6 carbon atoms, such as methyl, ethyl, propyl, isopropyl, sec-butyl, isobutyl, tert-butyl, pentyl, hexyl, and is more preferably $C_1$-$C_5$ alkyl, particularly methyl; an alkenyl group of 2 to 20 carbon atoms, preferably 2 to 12 carbon atoms; an aryl group of 6 to 20 carbon atoms, preferably 6 to 12 carbon atoms; or an arylalkyl group of 7 to 20 carbon atoms, preferably 7 to 12 carbon atoms; and n is an integer indicating a degree of polymerization and is typically about 2 to about 50, preferably about 5 to about 40, more preferably about 7 to about 35.

Furthermore, for purposes of the present invention, aluminoxane includes not only the compounds and structures immediately above, but also derivatives, complexes and/or associations of such compounds.

The terms "catalysts" and "catalyst systems" are used interchangeably herein.

The term "hydrocarbyl substituent" or "hydrocarbyl group" is used in its ordinary sense, which is well known to those skilled in the art. Specifically, it refers to a group having a carbon atom directly attached to the remainder of the molecule and having predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy); (3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every about ten carbon atoms in the hydrocarbyl group.

The term "lower" when used in conjunction with terms such as alkyl, alkenyl, and alkoxy, is intended to describe such groups that contain a total of up to about 10 carbon atoms.

The terms "group", "radical", and "substituent" are used interchangeably in this document. Thus, by way of example, the terms "hydrocarbyl radical", "hydrocarbyl" and "hydrocarbyl group" are used interchangeably throughout this document. Furthermore, for purposes of this disclosure, "hydrocarbyl radical" is defined to be a radical, which contains hydrogen atoms and up to 100 carbon atoms and which may be linear, branched, or cyclic, and when cyclic, aromatic or non-aromatic.

For purposes of this disclosure, the term "oligomer" refers to compositions having 2-75 "mer" units and the term polymer refers to compositions having 76 or more mer units. Furthermore, a "mer" is defined as a unit of an oligomer or polymer that originally corresponded to or derives from one or more of the monomers used in the oligomerization or polymerization reaction. For example, the mer of polyethylene would be ethylene.

Polymers can be characterized, in part, by their flow properties. Such flow can be measured according to accepted test methods, including, for example, melt index or MI. An accepted standard test for measuring MI, especially MI of polyethylenes, is ASTM D 1238, Condition E, which is conducted at 190° C. and 2.16 kg weight or load. The units of melt index are grams per 10 minutes or decigrams per second, but such units are typically not included in reported values, particularly if the test method is specified. For polypropylenes the temperature is typically increased to 230° C. Another test for characterizing the flow of polymers, particularly high molecular weight and/or low flow polymers is referred to as the High Load Melt Index test, or HLMI. The HLMI test method, which is particularly suitable for low flow polyethylenes, is ASTM D 1238, Condition F, which is conducted at 190° C. using a weight or load of 21.6 kg. The ratio of HLMI to MI is referred to as the Melt Flow Ratio or MFR. The melt flow values have been associated with other polymer characteristics, such as for example, lower values of flow being associated with higher molecular weights and lower values of MFR with narrower molecular weight distributions, Mw/Mn (weight average molecular weight to number average molecular weight).

As noted, useful polymers produced employing the catalysts and catalyst systems according to the present disclosure are also usefully employed in film applications. Various properties are useful for characterizing such polymers. One is Elmendorf tear, which is measured on film samples using the method of ASTM D-1922. The test is particularly useful for measuring and comparing film tear properties of extruded film in the "machine direction" and transverse to the machine direction. Another test is film clarity or haze as determined by ASTM D1003-97 and still another is puncture resistance as measured by dart impact strength according to ASTM D1709, Method A.

The term "catalyst system" as used in the present disclosure typically refers to a catalyst precursor/activator or pre-catalyst/activator pair. When "catalyst system" is used to describe such a pair before activation, it means the unactivated catalyst compound or pre-catalyst together with an activator and, optionally, a co-activator. When it is used to describe such a pair after activation, it means the activated catalyst and the activator.

The term "pre-catalyst" as used in the present disclosure typically refers to a compound comprising a transition metal atom, which is capable of, and eventually is activated, and after activation is typically referred to as a catalyst. In each instance, reference to an "active" catalyst or catalyst system means a catalyst or catalyst system that is capable of polymerizing one or more olefins under suitable olefin polymerization conditions. The presence of organometallic compounds, for example, organoaluminum compounds including preferably an alkylalumoxane such as methylalumoxane, in the catalyst system or during the catalyzed reaction is thought to be necessary in order to activate the catalyst, or to maintain its activity, by alkylation and ionization or formation of a complex system. Consequently, such organometallic compounds are typically also referred to as co-catalysts. The present invention is not limited by the mechanism or chemical pathway by which the pre-catalyst is activated or its activity maintained. Catalyst precursor is also often referred to in the art as pre-catalyst, catalyst, catalyst compound, transition metal compound or transition metal complex. These words can be used interchangeably. Activator and co-catalyst can also be used interchangeably.

A scavenger is a compound that is typically added to facilitate oligomerization or polymerization by scavenging or reacting with impurities that may be present and, absent a scavenger, react with and consume a pre-catalyst or activated catalyst. Some scavengers are also capable of acting as catalyst activators and may be referred to as co-activators. A co-activator that is not a scavenger may also be used in conjunction with an activator in order to form an active catalyst. In some embodiments a co-activator can be pre-mixed with the transition metal compound to form an alkylated transition metal compound. The transition metal compound may be neutral as in a pre-catalyst, or a charged species with a counter ion as in an activated catalyst system.

When an alumoxane or modified alumoxane is used as an activator, the pre-catalyst-to-activator molar ratio is from about 1:3000 to 10:1; alternatively, 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments utilize a 5000-fold molar excess over the pre-catalyst (per metal catalytic site). The preferred minimum activator-to-catalyst precursor (or pre-catalyst) ratio is 1:1 molar ratio.

Preferred co-activators, when used, are alumoxanes such as methyl alumoxane, modified alumoxanes such as modified methyl alumoxane, and aluminum alkyls such as tri-isobutyl aluminum, and trimethyl aluminum; most preferred is tri-isobutyl aluminum.

The term "solvent" as used in the present disclosure means one or more hydrocarbon solvents and it is used in its generic sense of a diluent except where the context of the disclosure requires a particular component (the solute) to be dissolved, in which case the solvent is suitable for substantially dissolving the component under the given conditions to form a uniformly dispersed mixture (solution) at the molecular or ionic size level. Thus, reference to a solvent does not preclude the possibility that the solute or dissolved component is in equilibrium with an undissolved portion of the solute, provided that the amount that is not dissolved does not exceed about 10 wt. % of the total solute present (dissolved plus undissolved); alternatively about 5 wt. %; for example, about 2 wt. %. Otherwise, a "solvent" can also be understood to refer to a diluent. In some circumstances a suitable liquid can be both a diluent and a solvent for different components that may be present. For example, toluene can be a diluent in which water is dispersed to form an emulsion and water can also be a solvent (or a component of a mixed solvent) for aluminoxane formed from the reaction of water with an organoaluminum compound. Hydrocarbon solvents comprise carbon and hydrogen, but other atoms can also be present, such as chlorine or bromine.

Generally, aluminoxane is prepared according to various methods well-known in the art, typically by reacting an organoaluminum compound to form aluminoxane, including, for example, a $C_1$ to $C_5$ trialkyl aluminum compound and a source of water, for example, water per se, water present in a "wet" diluent or as the water of hydration in a suitable salt. The aluminoxane preferably remains in solution following its formation. Examples of organoaluminum compounds useful for preparing the aluminoxane include: trialkylaluminum compounds, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum; tricycloalkylaluminum compounds, such as tricyclohexylaluminum and tricyclooctylaluminum; dialkylaluminum halide compounds, such as dimethylaluminum chloride, diethylaluminum chloride, diethylaluminum bromide and diisobutylaluminum chloride; dialkylaluminum hydride compounds, such as diethylaluminum hydride and diisobutylaluminum hydride; dialkylaluminum alkoxide compounds, such as dimethylaluminum methoxide and diethylaluminum ethoxide; and dialkylaluminum aryloxide compounds, such as diethylaluminum phenoxide. Preferred are trialkylaluminum and tricycloalkylaluminum compounds; particularly preferred are tri-isobutylaluminum, trimethylaluminum, triethylaluminum, di-isobutylaluminum hydride and diethylaluminum chloride.

Also suitable are modified methyl alumoxane compounds, such as modified methyl alumoxane (MMAO) type 3A, commercially available from Akzo Chemicals, Inc. under the trade name Modified Methylalumoxane type 3A and described in further detail in U.S. Pat. No. 5,041,584.

Activation by means other than an organoaluminum compound is also described (see U.S. Pat. No. 6,686,306, incorporated herein by reference to the extent permitted) and is suitable for use herein. Such activation includes the use of agglomerate composite particles of an inorganic oxide (e.g., silica) and an ion exchanging layered compound (e.g., clay), which provide enhanced dispersion and accessibility of their Lewis acidity which renders them extremely proficient support-activators for metallocene and constrained geometry, as well as other transition metal compound pre-catalysts. This permits the support-activator effectively to activate, e.g., ionize, the pre-catalysts when in a pre-activated (e.g., ionizable) state as well as to support the active catalyst during polymerization.

The physical and/or chemical state of metallocene catalyst systems of the present invention are not well-defined in the art. While the pre-catalyst compound may be capable of being characterized, when it is contacted with other components in order to provide a suitably activated form for use as an olefin polymerization catalyst, its exact structure is difficult to precisely identify or may, in fact not be known. Therefore, for purposes of the present invention it is suitable to describe the catalyst by identifying the components which are contacted in order to produce an "active" catalyst for olefin polymerization. Thus, generally speaking and not limited to a polymerization catalyst, a product resulting from the contact of two or more components or reactants can be defined as a "contact product." Furthermore, generally the term "contact" or "contacting" is used herein to refer to materials which may be mixed, blended, dispersed, dissolved, slurried, reacted, treated, or otherwise contacted in some other manner. For example, such as a catalyst system comprising a mixture, contact product, reaction product or complex resulting from a metallocene pre-catalyst compound or polymerization-active metallocene compound wherein the metallocene compound is contacted with at least one compound selected from the group consisting of: (1) an organoaluminum oxy-compound; (2) an ionizing ionic compound; and (3) an organoaluminum compound. Furthermore, the catalyst composition of the present invention also includes a "deactivated" titanocene, as described hereinafter.

Processes of the invention, including preparation of polymerization catalysts, their precursors or pre-catalysts and intermediates, as well as other reactants, such as aluminoxane and catalyst systems comprising aluminoxane and/or organoaluminum compounds are typically conducted under an inert atmosphere. Useful inert gasses include nitrogen, helium, argon, methane and mixtures thereof.

Particularly useful polymerization catalysts or catalyst systems comprise organometallic complex compounds, especially metallocenes, which are well known in the art Suitable metallocene polymerization catalysts are described, for example, in U.S. Pat. Nos. 6,686,306 and 6,943,224 and the further patent references cited therein, all incorporated herein by reference to the extent permitted. For example, as described in U.S. Pat. No. 6,943,224, single-site catalyst systems are characterized by the fact that their metal centers behave alike during polymerization thus making uniform polymers. Catalysts are judged to behave in a single-site manner when the polymer they make meets some basic criteria (for example, narrow molecular weight distribution, or uniform comonomer distribution). Thus, the metal can have various ligands around it and be classified as "single-site" as long as the polymer that it produces has certain properties. Metallocene catalysts are particularly preferred for the invention described herein.

In addition to achieving the desired polymer product properties using catalyst systems of the present invention in combination with a polymerization process, other factors can be significant for evaluating the efficiency or suitability of a catalyst system, such as the activity of the catalyst system, that is to say, the amount of catalyst required for conversion of a given amount of olefin, the product conversion per unit time and the product yield. The stability and ease of handling of the catalyst or its components is another factor that affects the catalyst system choice for use in commercial embodiments. Most metallocene catalysts are sensitive to air and moisture to varying degrees. Such catalysts and catalyst systems are typically reduced in activity or irreversibly destroyed by exposure to (atmospheric) oxygen and/or water. Most Ziegler-Natta and metallocene catalysts, for example, deactivate spontaneously on exposure to air and become unusable. Therefore such catalysts are typically protected from exposure to air and moisture during preparation, storage and use. However, as will be described below, the present catalyst system is unusual in that a significant component of the catalyst composition is intentionally deactivated, or substantially deactivated, towards the polymerization of olefins in order to achieve the advantages of the overall catalyst system.

A "metallocene" is conventionally understood to comprise the complex of a metal, such as Zr, Ti, Hf, Sc, Y, V or La, that is bound to two cyclopentadienyl (Cp) rings, or derivatives thereof, such as indenyl, tetrahydroindenyl, fluorenyl and mixtures. In addition to the two Cp ligands, other groups can be attached to the metal center, most commonly alkyls and aromatics. The Cp rings can be linked together (so-called "bridged metallocene" structures), as in most polypropylene catalysts, or they can be independent and freely rotating, as in most (but not all) metallocene-based polyethylene catalysts. The defining feature is the presence of at least one and preferably two Cp ligands or derivatives. Metallocene catalysts can be employed either as so-called "neutral metallocenes" in which case an alumoxane, such as methylalumoxane, is used as a co-catalyst, or they can be employed as so-called "cationic metallocenes" which are neutral metallocenes which have been activated, e.g., ionized, by an activator such that the active catalyst species incorporates a stable and loosely bound non-coordinating anion as a counter ion to a cationic metal metallocene center. Cationic metallocenes are disclosed, for example, in U.S. Pat. Nos. 5,064,802; 5,225,500; 5,243,002; 5,321,106; 5,427,991; and 5,643,847; and EP 426 637 and EP 426 638, the disclosures of which are incorporated herein by reference to the extent permitted.

Metallocene compounds suitable for use in the present invention include metallocenyl or substituted metallocenyl compounds of Groups 3-10 generally, such as Fe, Co, Ni, Zn, V, Mn, etc.; for example the Group 4 transition metals of the Periodic Table, such as Ti, Zr, and Hf. Such compounds include bis(cyclopentadienyl)-zirconium dichloride, bis(n-butylcyclopentadienyl)-zirconium dichloride or bis(indenyl)-zirconium dichloride, rac-bis(indenyl)ethan-1,2-diylzirconium dichloride, bis(1-n-butyl-3-methyl-cyclopentadienyl)zirconium dichloride and the like, but a significant number of compounds are known in the art. Thus, metallocene compounds based on titanium are suitable for use herein and are referred to as titanocenes. As further described herein, in order to function as a suitable component in the presently claimed invention such titanocenes are deactivated or substantially deactivated as regards their ability to effect polymerization of olefins. In other words, whereas the art discloses such titanocenes as olefin polymerization catalysts, catalyst components or pre-catalyst compounds, the polymerization activity of such titanocenes is deactivated or substantially deactivated in order to be useful in the present invention. Suitable metallocene compounds for use in the present invention are specifically identified in U.S. Pat. Nos. 6,559,090, 6,943,224, 7,148,298, 7,470,758, 7,576,163 and 7,652,160, the listings of which are incorporated herein by reference to the extent permitted, and are alternatively described in further detail below.

More specifically, the transition metal pre-catalyst can be at least one metallocene compound, at least one constrained geometry transition metal compound or mixtures thereof capable of (A) being activated upon contact with the support-activator or (B) being converted upon contact with an organometallic compound, to an intermediate which is capable of being activated upon contact with a support-activator.

The pre-catalyst compounds can be generically represented by the formula:

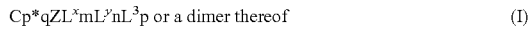

$$Cp^*qZL^xmL^ynL^3p \text{ or a dimer thereof} \qquad (I)$$

wherein:

$Cp^*$ represents an anionic, delocalized, π-bonded cyclopentadienyl group, or substituted cyclopentadienyl group, as well as a substituted or unsubstituted derivative of a cyclopentadienyl group, that is bound to Z, containing up to 50 non-hydrogen atoms, optionally two $Cp^*$ groups may be joined together by a moiety having up to 30 non-hydrogen atoms in its structure thereby forming a bridged structure, and further optionally one $Cp^*$ may be bound to $L^x$;

Z is a metal of Group 3 (Sc, Y, La, Ac), Group 4 (Ti, Zr, Hf), or the Lanthanide metals (Ce, Pr, Nd, Pm, Sm, Eu, Gd, Tb, Dy, Ho, Er Tm Yb, Lu), preferably Group 4 (Ti, Zr, Hf), of the Periodic Table of the Elements in the +2, +3 or +4 formal oxidation state, counter balancing the anionic $Cp^*$ and L group(s); provided however that for purposes of the present invention titanium in the +3 formal oxidation state is understood not to result in an active metallocene polymerization catalyst.

$L^x$ is an optional, divalent substituent of up to 50 non-hydrogen atoms that, when present, together with $Cp^*$ forms a metallocycle with Z;

$L^y$ each occurrence independently represents an optional neutral Lewis base having up to 20 non-hydrogen atoms;

$L^3$ each occurrence independently represents a monovalent, anionic moiety having up to 50 non-hydrogen atoms, typically a hydrocarbon-based radical or group, optionally, two $L^3$ groups together may constitute a divalent anionic moiety having both valences bound, preferably covalently or datively bound, to Z, or a neutral, conjugated or non-conjugated diene that is π-bonded to Z (whereupon Z is in the +2 oxidation state), or further optionally one or more $L^3$ and one or more $L^y$ groups may be bonded together thereby constituting a moiety that is both covalently bound to Z and coordinated thereto by means of Lewis base functionality;

q is 1 or 2;

m is an integer of 0 or 1;

n is an integer of 0 to 3;

p is an integer from 0 to 3, preferably from 1 to 3; and the sum of q+m+p is equal to the formal oxidation state of Z; and provided that where any one of $L^x$, $L^y$ and $L^3$ groups is hydrocarbyl-containing, such L group is not $Cp^*$.

Examples of suitable anionic, delocalized π-bonded cyclopentadienyl derivative groups constituting $Cp^*$ include indenyl, fluorenyl, tetrahydroindenyl, tetrahydrofluorenyl, octahydrofluorenyl, cyclopentadienyl, cyclohexadienyl, dihydroanthracenyl, hexahydroanthracenyl, and decahydroanthracenyl groups, as well as $C_1$-$C_{10}$ hydrocarbyl-substituted derivatives thereof.

Preferred $Cp^*$ groups are cyclopentadienyl, pentamethylcyclopentadienyl, tetramethylcyclopentadienyl, 1,3-dimethylcyclopentadienyl, n-butylcyclopentadienyl, indenyl, 2,3-dimethylindenyl, fluorenyl, 2-methylindenyl and 2-methyl-4-phenylindenyl. Each carbon in the $Cp^*$ ring may independently be substituted with, a radical, selected from halogen, hydrocarbyl, halohydrocarbyl and hydrocarbyl substituted metalloid radicals wherein the metalloid is selected from Group 14 (C, Si, Ge, Sn, Pb) of the Periodic Table of the Elements. Included within the term 'hydrocarbyl' are $C_1$-$C_{20}$ straight, branched and cyclic alkyl radicals, $C_6$-$C_{20}$ aromatic radicals, $C_7$-$C_{20}$ alkyl-substituted aromatic radicals, and $C_7$-$C_{20}$ aryl-substituted alkyl radicals. In addition two or more such radicals may together form a fused ring system or a hydrogenated fused ring system. Suitable hydrocarbyl-substituted organometalloid radicals include mono-, di- and trisubstituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. The recitation 'metalloid', as used herein, includes nonmetals such as boron, phosphorus and the like which exhibit semi-metallic characteristics.

Representative examples of suitable $L^y$ groups include diethylether, tetrahydrofuran, dimethylaniline, aniline, trimethylphosphine, and n-butylamine. $L^y$ can also represent a second transition metal compound of the same type as Formulas I, III or IV such that two metal centers, e.g., Z and Z', are bridged by one or two $L^3$ groups. Such dual metal center bridged structures are described in WO/1992/000333.

Preferred pre-catalysts represented by Formula I include those containing either one or two Cp* groups. The latter pre-catalysts include those containing a bridging group linking the two Cp* groups. Preferred bridging groups are those corresponding to the Formula:

$$(E(R^1)_2)_x \quad \text{(II)}$$

wherein

E is silicon or carbon, $R^1$ independently each occurrence is hydrogen or a group selected from silyl, hydrocarbyl, or hydrocarbyloxy, said $R^1$ having up to 30 carbon or silicon atoms, and x is 1 to 8. Preferably, $R^1$ independently each occurrence is methyl, benzyl, tert-butyl or phenyl.

Examples of the foregoing bis(Cp*) containing pre-catalysts are compounds corresponding to the formula:

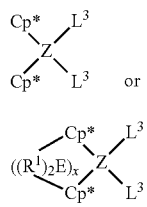

wherein:

Cp* is as described previously;

Z is titanium, zirconium or hafnium, preferably zirconium or hafnium, in the +2 or +4 formal oxidation state; with the proviso regarding titanium-based metallocene compounds as discussed above.

the optional substituents on the cyclopentadienyl ring in each occurrence independently can preferably be selected from the group of hydrogen, hydrocarbyl, silyl, germyl, cyano, halo and combinations thereof, said substituents having up to 20 non-hydrogen atoms, or adjacent substituent groups together can form a divalent derivative (i.e., a hydrocarbadiyl, siladiyl or germadiyl group) thereby forming a fused ring system; and $L^3$ independently each occurrence is an anionic ligand group of up to 50 non-hydrogen atoms, or two $L^3$ groups together can constitute a divalent anionic ligand group of up to 50 non-hydrogen atoms or a conjugated diene having from 4 to 30 non-hydrogen atoms forming a π complex with Z, whereupon Z is in the +2 formal oxidation state, and $R^1$, E and x are as previously defined; thus, each $L^3$ may be independently, each occurrence hydride, $C_1$-$C_{50}$ hydrocarbon-based radicals including hydrocarbyl radicals, substituted hydrocarbyl radicals wherein one or more hydrogen atoms is replaced by an electron-withdrawing group, such as a halogen atom or alkoxide radical, or $C_1$-$C_{50}$ hydrocarbyl-substituted metalloid radicals, wherein the metalloid is selected from the Group 4 of the Periodic Table of Elements, provided that where any $L^3$ is hydrocarbon-based, such $L^3$ is different from Cp*. In addition any two $L^3$ groups together, may constitute an alkylidene olefin, acetylene or a cyclometallated hydrocarbyl group.

As used herein, the term "hydrocarbon-based radical or group" denotes a radical or group having a carbon atom directly attached to the remainder of the molecule and having a predominantly hydrocarbon character within the context of this invention. Moreover, in this context the terms "group" and "radical" are used interchangeably. Such radicals include the following:

hydrocarbon radicals; that is, aliphatic radicals, aromatic- and alicyclic-substituted radicals, and the like, of the type known to those skilled in art;

substituted hydrocarbon radicals; that is, radicals containing pendant non-hydrocarbon substituents, that in the context of this invention, do not alter the predominantly hydrocarbon character of the radical or constitute a poison for the pre-catalyst. Those skilled in the art will be aware of suitable substituents; examples are halo, nitro, hydroxy, alkoxy, carbalkoxy, and alkylthio; and hetero radicals; that is, radicals which, while predominantly hydrocarbon in character within the context of this invention, contain atoms other than carbon present as a member of the linear structure of a chain or ring otherwise composed of carbon atoms. Suitable hetero-atoms will be apparent to those skilled in the art and include, for example, nitrogen, oxygen, phosphorus and sulfur. In metallocene and constrained geometry catalysts such hydrocarbon-based radicals may be bonded to Z through the heteroatom.

In general, no more than three substituents or heteroatoms, and preferably no more than one, will be present for each 10 carbon atoms in the hydrocarbon-based radical.

More specifically for metallocene and constrained geometry catalysts, the hydrocarbon-based radical or group of $L^3$ for the pre-catalyst compounds can be substituted or unsubstituted, cyclic or non-cyclic, linear or branched, aliphatic, aromatic, or mixed aliphatic and aromatic including hydrocarbylene, hydrocarbyloxy, hydrocarbylsilyl, hydrocarbylamino, and hydrocarbylsiloxy radicals having up to non-hydrogen atoms. The preferred $L^3$ groups are independently selected from halo, hydrocarbyl, and substituted hydrocarbyl radicals. The hydrocarbon-based radical may typically contain from 1 to about 50 carbon atoms, preferably from 1 to about 12 carbon atoms and the substituent group is preferably a halogen atom.

Exemplary hydrocarbyl radicals for $L^3$ are methyl, ethyl, propyl, butyl, amyl, isoamyl, hexyl, isobutyl, heptyl, octyl, nonyl, decyl, cetyl, 2-ethylhexyl, phenyl and the like, with methyl being preferred. Exemplary substituted hydrocarbyl radicals for $L^3$ include trifluoromethyl, pentafluorphenyl, trimethylsilylmethyl, and trimethoxysilylmethyl and the like. Exemplary hydrocarbyl substituted metalloid radicals for $L^3$ include trimethylsilyl, trimethylgermyl, triphenylsilyl, and the like. Exemplary alkyldiene radicals for two $L^3$ groups together include methylidene, ethylidene and propylidene.

The foregoing metal complexes are especially suited for the preparation of polymers having stereoregular molecular structure. In such capacity it is preferred that the complex possesses $C_s$ or $C_2$ symmetry or that it possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., J. Am. Chem. Soc. 110, 6255-6256 (1980). Examples of chiral structures include bis-indenyl complexes. Similar systems based on Ti(IV) or Zr(IV) are disclosed for preparation of isotactic olefin polymers in Wild et al., J. Organomet. Chem, 232, 233-47 (1982), incorporated herein to the extent permitted.

Exemplary bridged ligands containing two π-bonded groups are: (dimethylsilyl-bis-cyclopentadienyl), (dimethylsilyl-bismethylcyclopentadienyl), (dimethylsilyl-bis-ethylcyclopentadienyl), (dimethylsilyl-bis-t-butylcyclopentadienyl), (dimethylsilyl-bistetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilylcyclopentadienyl-fluorenyl), (1,1,2,2-tetramethyl-1,2-disilyl-biscyclopentadienyl), (1,2-bis(cyclopentadienyl))ethane, and (isopropylidene-cyclopentadienyl-fluorenyl).

Preferred $L^3$ groups are selected from hydride, hydrocarbyl, silyl, germyl, halohydrocarbyl, halosilyl, silylhydrocarbyl and aminohydrocarbyl groups, or two $L^3$ groups together can constitute a divalent derivative of a conjugated diene or a neutral, π-bonded, conjugated diene. Most preferred $L^3$ groups are $C_1$-$C_{20}$ hydrocarbyl groups.

Examples of preferred pre-catalyst compounds of Formula III and IV include compounds wherein the Cp* group is selected from cyclopentadienyl, indenyl, tetrahydroindenyl, fluorenyl, and octahydrofluorenyl; the substituents on the foregoing Cp* groups each occurrence is hydrogen, methyl, ethyl, propyl, butyl, pentyl, hexyl (including isomers), norbornyl, benzyl, phenyl, etc.; and $L^3$ is selected from methyl, neopentyl, trimethylsilyl, norbornyl, benzyl, methylbenzyl, and phenyl; q is 2, and m and n are zero.

A further class of metal complexes useful in the present invention correspond to the formula:

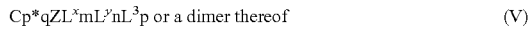

Cp*qZL$^x$mL$^y$nL$^3$p or a dimer thereof    (V)

wherein:

Cp* is as defined previously;

Z is a metal of Group 4 of the Periodic Table of the Elements in the +2, +3 or +4 formal oxidation state; with the proviso regarding titanium-based metallocene compounds as discussed above.

$L^x$ is a divalent substituent of up to 50 non-hydrogen atoms that together with Cp* forms a metallocycle with Z;

$L^y$ is an optional neutral Lewis base ligand having up to 20 non-hydrogen atoms;

$L^3$ each occurrence is a monovalent, anionic moiety having up to 20 non-hydrogen atoms, optionally two $L^3$ groups together may form a divalent anionic moiety having both valences bound to Z or a neutral $C_5$-$C_{30}$ conjugated diene, and further optionally $L^y$ and $L^3$ may be bonded together thereby forming a moiety that is both covalently bound to Z and coordinated thereto by means of Lewis base functionality;

q is 1 or 2;
m is 1;
n is a number from 0 to 3;
p is a number from 1 to 2; and
the sum of q+m+p is equal to the formal oxidation state of z.

Preferred divalent $L^x$ substituents include groups containing up to 30 non-hydrogen atoms comprising at least one atom that is oxygen, sulfur, boron or a member of Group 14 of the Periodic Table of the Elements directly attached to the Cp* group, and a different atom, selected from the group consisting of nitrogen, phosphorus, oxygen or sulfur that is covalently bonded to Z.

Illustrative pre-catalysts that may be employed in the practice of the present invention include: cyclopentadienyltitanium trimethyl, cyclopentadienyltitanium triethyl, cyclopentadienyltitanium triisopropyl, cyclopentadienyltitanium triphenyl, cyclopentadienyltitanium tribenzyl, cyclopentadienyltitanium-2,4-pentadienyl, cyclopentadienyltitanium dimethylmethoxide, cyclopentadienyltitanium dimethylchloride, pentamethylcyclopentadienyltitanium trimethyl, indenyltitanium trimethyl, indenyltitanium triethyl, indenyltitanium tripropyl, indenyltitanium triphenyl, tetrahydroindenyltitanium tribenzyl, pentamethylcyclopentadienyltitaniumtriisopropyl, pentamethylcyclopentadienyltitanium tribenzyl, pentamethylcyclopentadienyltitanium dimethylmethoxide, pentamethylcyclopentadienyltitanium dimethylchloride, ($\eta^5$-2,4-dimethyl-1,3-pentadienyl)titanium trimethyl, octahydrofluorenyltitanium trimethyl, tetrahydroindenyltitanium trimethyl, tetrahydrofluorenyltitanium trimethyl, (1,1-dimethyl-2,3,4,9,10-η-1,4,5,6,7,8-hexahydronaphthalenyl)titanium trimethyl; (1,1,2,3-tetramethyl-2,3,4,9,10-η-1,4,5,6,7,8-hexahydronaphthalenyl)titanium trimethyl; (tert-butylamido)(tetramethyl-$\eta^5$-cyclopentadienyl) dimethylsilanetitanium dichloride; (tert-butylamido) (tetramethyl-$\eta^5$-cyclopentadienyl)dimethylsilanetitanium dimethyl; (tert-butylamido)(tetramethyl-$\eta^5$-cyclopentadienyl)-1,2-ethanediyltitanium dimethyl; (tert-butylamido) (tetramethyl-$\eta^5$-indenyl)dimethylsilaLnetitanium dimethyl; (tert-butylamido)(tetramethyl-$\eta^5$-cyclopentadienyl)dimethylsilane titanium (III) 2-(dimethylamino)benzyl; (tert-butylamido)(tetramethyl-$\eta^5$-cyclopentadienyl)dimethylsilanetitanium (III) allyl; (tert-butylamido)(tetramethyl-$\eta^5$-cyclopentadienyl)dimethylsilanetitanium (II) 1,4-diphenyl-1,3-butadiene; (tert-butylamido)(2-methylindenyl) dimethylsilanetitanium (II) 1,4-diphenyl-1,3-butadiene; (tert-butylamido)(2-methylindenyl)dimethylsilanetitanium (IV) 1,3-butadiene; (tert-butylamido)(2,3-dimethylindenyl) dimethylsilanetitanium (II) 1,4diphenyl-1,3-butadiene; (tert-butylamido)(2,3-dimethylindenyl)dimethylsilanetitanium (IV) 1,3-butadiene; (tert-butylamido)(2,3-dimethylindenyl) dimethylsilanetitanium (II) 1,3-pentadiene; (tert-butylamido)(2-methylindenyl)dimethylsilanetitanium (II) 1,3-pentadiene; (tert-butylamido)(2-methylindenyl) dimethylsilanetitanium (IV) dimethyl; (tert-butylamido)(2-methyl-4-phenylindenyl)dimethylsilanetitanium (II) 1,4-diphenyl-1,3-butadiene; (tert-butylamido)(tetramethyl-$\eta^5$-cyclopentadienyl)dimethylsilanetitanium (IV) 1,3-butadiene; (tert-butylamido)(tetramethyl-$\eta^5$-cyclopentadienyl)dimethylsilanetitanium (II) 1,4-dibenzyl-1,3-butadiene; (tert-butylamido)(tetramethyl-$\eta^5$-cyclopentadienyl)dimethylsilanetitanium (II) 2,4-hexadiene; (tert-butylamido)(tetramethyl-$\eta^5$-cyclopentadienyl)dimethylsilanetitanium (II) 3-methyl-1,3-pentadiene; (tert-butylamido)(2,4-dimethyl-1,3-pentadien-2-yl)dimethylsilanetitanium dimethyl; (tert-butylamido)(1,1-dimethyl-2,3,4,9,10-η-1,4,5,6,7,8-hexahydronaphthalen-4-yl) dimethylsilanetitanium dimethyl, and (tert-butylamido)(1,1,2,3-tetramethyl-2,3,4,9,10-η-1,4,5,6,7,8-hexahydronaphthalen-4-yl)dimethylsilanetitanium dimethyl.

Bis(Cp*) containing complexes including bridged complexes suitable for use in the present invention include: biscyclopentadienylzirconium dimethyl, biscyclopentadienyltitanium diethyl, cyclopentadienyltitanium diisopropyl, biscyclopentadienyltitanium diphenyl, biscyclopentadienylzirconium dibenzyl, biscyclopentadienyltitanium-2,4-pentadienyl, biscyclopentadienyltitanium methylmethoxide, biscyclopentadienyltitanium methylchloride, bispentamethylcyclopentadienyltitanium dimethyl, bisindenyltitanium dimethyl, indenylfluorenyltitanium diethyl, bisindenyltitanium methyl(2-(dimethylamino)benzyl), bisindenyltitanium methyltrimethylsilyl, bistetrahydroindenyltitanium methyltrimethylsilyl, bispentamethylcyclopentadienyltitanium diisopropyl, bispentamethylcyclopentadienyltitanium dibenzyl, bispentamethylcyclopentadienyltitanium methylmethoxide, bispentamethylcyclopentadienyltitanium methylchloride, (dimethylsilyl-bis-cyclopentadienyl)zirconium dimethyl, (dimethylsilyl-bis-pentamethylcyclopentadienyl) titanium-2,4-pentadienyl, (dimethylsilyl-bis-t-butylcyclopentadienyl)zirconiumdichloride, (methylene-bis-pentamethylcyclopentadienyl)titanium (III) 2-(dimethylamino) benzyl, (dimethylsilyl-bis-indenyl)zirconium dichloride, (dimethylsilyl-bis-2-methylindenyl)zirconium dimethyl, (dimethylsilyl-bis-2-methyl-4-phenylindenyl)zirconium dimethyl, (dimethylsilyl-bis-2-methylindenyl)zirconium-1, 4-diphenyl-1,3-butadiene, (dimethylsilyl-bis-2-methyl-4-phenylindenyl)zirconium (II) 1,4-diphenyl-1,3-butadiene, (dimethylsilyl-bis-tetrahydroindenyl)zirconium (II) 1,4-diphenyl-1,3-butadiene, (dimethylsilyl-bis-fluorenyl)zirconium dichloride, (dimethylsilyl-bis-tetrahydrofluorenyl)zirconium di(trimethylsilyl), (isopropylidene) (cyclopentadienyl)(fluorenyl)zirconium dibenzyl, and (dimethylsilylpentamethylcyclopentadienylfluorenyl)zirconium dimethyl.

Other catalyst systems are particularly useful for producing polymers having low levels of long-chain branching and they comprise metallocene complexes suitable for use in various embodiments of the present invention. Such catalysts include those disclosed in U.S. Pat. No. 7,148,298 (and its divisional U.S. Pat. No. 7,470,758), U.S. Pat. Nos. 7,576,163, 7,517,939 (and its divisional U.S. Pat. No. 7,652,160), the disclosures of each of which is incorporated herein to the extent permitted.

Suitable metallocene complexes and catalyst compositions disclosed in U.S. Pat. No. 7,148,298 (and its divisional U.S. Pat. No. 7,470,758) and include catalyst compositions comprising the contact product of at least one ansa-metallocene, at least one organoaluminum compound, and at least one activator-support, wherein: a) the ansa-metallocene comprises a compound having the formula: $(X^1)(X^2)(X^3)(X^4)M^1$, wherein $M^1$ is titanium, zirconium, or hafnium; $(X^1)$ and $(X^2)$ are independently selected from a cyclopentadienyl, an indenyl, a fluorenyl, or a substituted analog thereof, wherein at least one of $(X^1)$ and $(X^2)$ is substituted; at least one substituent of the substituted $(X^1)$ or $(X^2)$ comprises an unsaturated group having the formula $—SiR^4_2R^5$, wherein each $R^4$ is independently selected from a hydrocarbyl group or a substituted hydrocarbyl group having from 1 to about 20 carbon atoms; $R^5$ is an alkenyl group, an alkynyl group, an alkadienyl group, or a substituted analog thereof having from 1 to about 20 carbon atoms; $(X^1)$ and $(X^2)$ are connected by a substituted or unsubstituted bridging group comprising one atom bonded to both $(X^1)$ and $(X^2)$, wherein the atom is carbon, silicon, germanium, or tin; and any substituent on $R^4$ any substituent on $R^5$, any substituent on the substituted bridging group, any additional substituent on $(X^1)$ or $(X^2)$, and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, $—SO_2X$, $—OAlX_2$, $—OSiX_3$, $—OPX_2$, $—SX$, $—OSO_2X$, $—AsX_2$, $—As(O)X_2$, $—PX_2$, wherein X is a monoanionic group such as halide, hydride, amide, alkoxide, alkyl thiolate, or a substituted derivative thereof, any of which having from 1 to about 20 carbon atoms; a halide; or hydrogen; b) the organoaluminum compound comprises a compound with the formula: $Al(X^5)_n(X^6)_{3-n}$, wherein $(X^5)$ is a hydrocarbyl having from 1 to about 20 carbon atoms; $(X^6)$ is an alkoxide or an aryloxide having from 1 to about 20 carbon atoms, halide, or hydride; and n is a number from 1 to 3, inclusive; and c) the activator-support comprises: a solid oxide treated with an electron-withdrawing anion; a layered mineral, an ion-exchangeable activator-support, or any combination thereof. Specific examples of ansa-metallocenes and catalyst compositions disclosed in the patent are suitable for use herein.

Additional metallocene complexes and catalyst compositions suitable for use herein are disclosed in U.S. Pat. No. 7,576,163 and include catalyst compositions comprising a contact product of: 1) at least one ansa-metallocene; 2) optionally, at least one organoaluminum compound; and 3) at least one activator; wherein: a) the at least one ansa-metallocene comprises a compound having the formula: $(X^1)(X^2)(X^3)(X^4)M$, wherein M is titanium, zirconium, or hafnium; $(X^1)$ and $(X^2)$ are independently a substituted fluorenyl or a substituted indenyl; one substituent on $(X^1)$ and $(X^2)$ is a bridging group bonded to both $(X^1)$ and $(X^2)$ and having the formula $CH_2CH[(CH_2)_nCH=CH_2]$, or a substituted analog thereof, wherein n is an integer from 1 to 8, inclusive; $(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; and any substituent on the bridging group, any additional substituent on the substituted fluorenyl, and any additional substituent on the substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen; b) the at least one organoaluminum compound comprises a compound having the formula: $Al(X^5)_n(X^6)_{3-n}$, wherein $(X^5)$ is a hydrocarbyl having from 1 to 20 carbon atoms; $(X^6)$ is alkoxide or aryloxide, any of which having from 1 to 20 carbon atoms, halide, or hydride; and n is a number from 1 to 3, inclusive; and c) the at least one activator comprises a solid oxide treated with an electron-withdrawing anion; wherein the at least one organoaluminum compound is optional when at least one of $X^3$ and $X^4$ is a hydrocarbyl group having up to 20 carbon atoms, H, or $BH_4$. Specific examples of ansa-metallocenes and catalyst compositions disclosed in the patent are suitable for use herein.

Other suitable catalyst compositions are disclosed in U.S. Pat. No. 7,517,939 (and its divisional U.S. Pat. No. 7,652, 160) include catalyst compositions comprising a contact product of: 1) at least one ansa-metallocene; 2) optionally, at least one organoaluminum compound; and 3) at least one activator, wherein: a) the at least one ansa-metallocene comprises a compound having the formula: $(X^1)(X^2)(X^3)(X^4)M^1$, wherein $M^1$ is titanium, zirconium, or hafnium; $(X^1)$ and $(X^2)$ are independently a substituted cyclopentadienyl, a substituted indenyl, or a substituted fluorenyl; one substituent on $(X^1)$ and $(X^2)$ is a bridging group having the formula $ER^1R^2$, wherein E is a carbon atom, a silicon atom, a germanium atom, or a tin atom, and E is bonded to both $(X^1)$ and $(X^2)$, and wherein $R^1$ and $R^2$ are independently an alkyl group or an aryl group, either of which having up to 12 carbon atoms, or hydrogen, wherein at least one of $R^1$ and $R^2$ is an aryl group; at least one substituent on $(X^1)$ is a substituted or an unsubstituted alkenyl group having up to 12 carbon atoms; at least one substituent on $(X^2)$ is an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; or a halide; $(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^4_2$ or $SO_3R^4$, wherein $R^4$ is an alkyl group or an aryl group, any of which having up to 12 carbon atoms; and any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen; b) the at least one organoaluminum compound comprises a compound having the formula: $Al(X^5)_n(X^6)_{3-n}$, wherein $(X^5)$ is a hydrocarbyl having from 1 to 20 carbon atoms; $(X^6)$ is an alkoxide or an aryloxide, any of which having from 1 to 20 carbon atoms, halide, or hydride; and n is a number from 1 to 3, inclusive; and c) the at least one activator is selected independently from: i) an activator-support selected from a solid oxide treated with an electron-withdrawing anion, a layered mineral, and an ion-exchangeable activator-support, or any combination thereof; and ii) an organoboron compound or an organoborate compound; or iii) a combination thereof; wherein the at least one organoaluminum compound is optional when at least one of $(X^3)$ and $(X^4)$ is a hydrocarbyl group having up to 20 carbon atoms, H, or $BH_4$. Specific examples of ansa-metallocenes and catalyst compositions disclosed in the patent are suitable for use herein.

Additionally suitable catalyst compositions are disclosed in U.S. Pat. No. 7,576,163 and include catalyst compositions comprising a contact product of: 1) at least one ansa-metallocene; 2) optionally, at least one organoaluminum compound (described in the patent); and 3) at least one activator (described in the patent); wherein: a) the at least one ansa-metallocene comprises a compound having the formula: $(X^1)(X^2)(X^3)(X^4)M$, m wherein M is titanium, zirconium, or hafnium; $(X^1)$ and $(X^2)$ are independently a substituted fluorenyl or a substituted indenyl; one substituent on $(X^1)$ and $(X^2)$ is a bridging group bonded to both $(X^1)$ and $(X^2)$ and having the formula $CH_2CH[(CH_2)_nCH=CH_2]$, or a substituted analog thereof, wherein n is an integer from 1 to 8, inclusive; $(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^4_2$ or $SO_3R^4$, wherein $R^4$ is an alkyl group or an aryl group, any of which having up to 12 carbon atoms; and any substituent on the bridging group, any additional substituent on the substituted fluorenyl, and any additional substituent on the substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen; b) the at least one organoaluminum compound comprises a compound having the formula: $Al(X^5)_n(X^6)_{3-n}$, wherein $(X^5)$ is a hydrocarbyl having from 1 to 20 carbon atoms; $(X^6)$ is alkoxide or aryloxide, any of which having from 1 to 20 carbon atoms, halide, or hydride; and n is a number from 1 to 3, inclusive; and c) the at least one activator comprises a solid oxide treated with an electron-withdrawing anion; wherein the at least one organoaluminum compound is optional when at least one of $X^3$ and $X^4$ is a hydrocarbyl group having up to 20 carbon atoms, H, or $BH_4$. Specific examples of ansa-metallocenes and catalyst compositions disclosed in the patent are suitable for use herein.

Other compounds which are useful in the preparation of catalyst compositions according to this invention, especially compounds containing other Group 4 metals, will, of course, be apparent to those skilled in the art. Methods for preparing the above catalysts are conventional and well known in the art.

The above described metallocene pre-catalyst compounds from which the subject catalyst is derived or prepared are well known. The disclosure of such components and the methods of forming the same have been described in various publications, including U.S. Pat. Nos. 5,064,802; 5,321,106; 5,399,636; 5,541,272; 5,624,878; 5,807,938; EP 890 581; WO/1991/014713; and WO/1992/000333. The teaching of each of the above cited references is incorporated herein in its entirety by reference to the extent permitted.

In formulas I and III to V, each $L^3$ group is preferably a halogen atom, an unsubstituted hydrocarbyl or a hydrocarbyloxy group. The most preferred compounds are those having each $L^3$ being halogen.

It will be understood that the identity of the various L groups of the transition metal compounds will determine the nature of the process steps needed to form the ultimate catalyst composition which is believed to exist, during polymerization, as an activated pair of a cation, or cation like (referred to herein collectively as "Cationic") component and an anion or anion like (referred to herein collectively as "Anionic") component. The Cationic component is the pre-catalyst which has undergone activation typically by imparting a full or partial positive charge to the metal center Z and the Anionic component is a full or partial negatively charged component derived from the activator or support-activator and is believed to be in close proximity to, and provides charge balance for, the activated metal center Z under conventional polymerization reaction conditions while remaining labile. The term "labile" is used herein to mean that under polymerization conditions, the anionic component is only loosely associated at the site of the catalyst activity so as to permit displacement by a polymerizable monomer at the point of monomer addition.

Thus, the manner in which the pre-catalyst is activated typically depends on the identity of the L groups, particularly $L^3$. From a generic standpoint, activation of pre-catalyst is believed to result from removal of at least one $L^3$ of Formulas I and III to V from the metal center in a manner sufficient to generate an open coordination site at said metal center.

A variety of mechanisms and materials are known or possible for accomplishing activation. Depending on the identity of $L^3$ and the support-activator, such mechanisms may be induced in 1 or 2 stages (relative to a designated molecule). Activation in a single stage typically involves separately synthesizing a pre-catalyst that can be activated directly by, for example a support-activator as described above (e.g., wherein $L^3$ is initially selected as hydrocarbyl in the synthesis of the pre-catalyst). Activation in 2 stages typically involves a pre-activation (e.g., alkylation) first stage wherein at least one electronic withdrawing L group of the pre-catalyst compounds (e.g., Cl) is replaced with at least one less electronic withdrawing L group (e.g., alkyl or olefin) which is more easily displaced in the second stage by the support-activator to cause activation at the metal center Z. Accordingly, pre-activation can be induced via known alkylation reactions with organometallic compounds, such as organolithium or preferably organoaluminum hydrides or alkyls. Pre-activation permits one to use a support-activator for completing activation and thereby eliminate the need to use methylalumoxane or activating agents such as boron containing activators (or co-catalysts).

Thus, while activation mechanisms by which conventional coordination catalyst systems operate include, but are not limited to (a) abstraction of at least one $L^3$ group by a Lewis acid by an abstracting moiety such as carbonium, tropylium, carbenium, ferrocenium and mixtures, and (b) protonation (by a Bronsted acid) of the $L^3$ group, when $L^3$ constitutes a hydride or hydrocarbyl (e.g. alkyl) group, such mechanisms typically require materials additional to the support for implementation. The same is not true when a support activator is used. Thus it can be an advantage for support activators that conventional ionizing agents used to produce ionic catalysts can be eliminated and replaced with a support-activator which performs the dual function of activation and supporting agent.

From a practical standpoint, it is preferred that $L^3$ be halogen, e.g., Cl, in the pre-catalyst. This stems from the fact that when $L^3$ is halogen (highly electron withdrawing) the pre-catalyst is very stable and can easily be transported. However, because $L^3$ in this instance is highly electron withdrawing, it may be more difficult to induce activation thereof by the support-activator method. Thus, as indicated above, it is possible to pre-activate the pre-catalyst, by replacement of the halogens constituting $L^3$ with less electron withdrawing groups such as hydrocarbyl groups, e.g., alkyl groups, using organometallic compounds. The particular point in time when the organometallic compound contacts the pre-catalyst is at the option of the manufacturer and can be (a) before, during or after contact of the support-activator with pre-catalyst prior to entry into the polymerization zone and/or (b) upon or during polymerization by direct addition to the polymerization zone. However, because pre-activated catalysts are less stable than the halogenated precursors thereof, organometallic compound addition, when employed, is preferably conducted in the presence of a support or support-activator. Use of a support activator can also be an advantage in that activation of the pre-catalyst (having L=halogen) can be delayed by avoiding the use of the organometallic compound to induce pre-activation until polymerization occurs. Thus, such pre-catalyst can be impregnated into/onto the support or support activator and the same recovered without activation until used for polymerization. When employing lower amounts of organometallic compound, such compound can be added to the reactor during polymerization.

Accordingly, a preferred embodiment comprises using pre-catalyst wherein each $L^3$ group compound is a halogen atom. In this embodiment the pre-catalyst and support or support-activator are separately mixed. In another embodiment said pre-catalyst, support or support-activator and at least one organometallic compound (represented by Formula VI below) as a scavenger and/or alkylating agent are admixed simultaneously prior to polymerization. In this embodiment, at least one of the halogens constituting $L^3$ becomes a new hydrocarbyl $L^3$ group derived from the organometallic compound during pre-activation. More specifically, when used as a scavenging and alkylating agent, the organometallic compound is typically added directly to the polymerization zone, whereas when employed as an alkylating agent alone it is desirably added to the mixture of support or support-activator and pre-catalyst. Organometallic compounds suitable for use in pre-activation include those represented by formula (VI):

$$M(R^{12})_s \qquad \text{VIII}$$

wherein M represents an element of the Group 1, 2 or 13 of the Periodic Table, a tin atom or a zinc atom; each $R^{12}$ independently represents a hydrogen atom, a halogen atom, hydrocarbyl, typically $C_1$ to $C_{24}$ hydrocarbyl, including $C_1$ to $C_{24}$ alkyl or alkoxy and aryl, aryloxy, arylalkyl, arylalkoxy, alkylaryl or alkylaryloxy group having 6 to 24 carbon atoms (such as a hydrogen atom, halogen atom (e.g., chlorine, fluorine, bromine, iodine and mixtures thereof), alkyl groups (e.g., methyl, ethyl, propyl, pentyl, hexyl, heptyl, decyl, isopropyl, isobutyl, sec-butyl, t-butyl), alkoxy groups (e.g., methyoxy, ethoxy, propoxy, butoxy, isopropoxy), aryl groups (e.g., phenyl, biphenyl, naphthyl), aryloxy groups (e.g., phenoxy), arylalkyl groups (e.g., benzyl, phenylethyl), arylalkoxy groups (benzyloxy), alkylaryl groups (e.g., tolyl, xylyl, cumenyl, mesityl), and alkylaryloxy groups (e.g., methylphenoxy). For pre-catalyst compounds when at least one $L^3$ is non-hydrocarbyl, preferably at least one $R^{12}$ is hydrocarbyl, e.g., an alkyl group having 1 to 24 carbon atoms or an aryl, arylalkyl or alkylaryl group having 6 to 24 carbon atoms, e.g., to provide a source of hydrocarbyl groups for alkylation of the pre-catalyst. In each instance, "s" is the oxidation number of M.

Preferred organometallic compounds for pre-activation are those wherein M is aluminum. Representative examples of suitable organometallic compounds include alkyl aluminum compounds, preferably trialkyl aluminum compounds, such as trimethyl aluminum, triethyl aluminum, triisopropyl aluminum, triisobutyl aluminum, tri-n-propylaluminum, tri-isobutylaluminum, tri-n-butylaluminum, triamylaluminum, and the like; alkyl aluminum alkoxides such as ethyl aluminum diethoxide, diisobutyl aluminum ethoxide, di(tert-butyl) aluminum butoxide, diisopropyl aluminum ethoxide, dimethyl aluminum ethoxide, diethyl aluminum ethoxide, di-n-propyl aluminum ethoxide, di-n-butyl aluminum ethoxide, and the like; aluminum alkoxides such as aluminum ethoxide, aluminum propoxide, aluminum butoxide and the like; alkyl or aryl aluminum halides such as diethyl aluminum chloride, ethyl aluminum dichloride, diisopropyl aluminum chloride and the like; aluminum aryloxides such as aluminum phenoxide, and the like; and mixed aryl, alkyl or aryloxy, alkyl aluminum compounds and aluminum hydrides such as dimethylaluminum hydride, diethylaluminum hydride, diisopropylaluminum hydride, di-n-propylaluminum hydride, diisobutylaluminum hydride, and di-n-butylaluminum hydride. The most preferred organometallic compounds are the trialkyl aluminum compounds. When at least one $L^3$ of the transition metal compounds is halogen, the pre-catalyst and/or the organometallic compound can be mixed in an inert diluent prior to, simultaneously with, or after contact (of either one) with, for example, a support or support-activator. The pre-catalyst, when two L groups are halogen, is stable to materials which are poisons to the activated catalyst.

In another preferred embodiment wherein in the pre-catalyst each $L^3$ of a pre-catalyst compound (or material) is a hydrocarbyl, a hydrocarbylene or a hydrocarbyloxy group, there is no need for the addition or handling of the organometallic compound. Thus, the catalyst composition can be readily formed and used without pre-activation. However, even in this instance, it is still preferred to employ at least some organometallic compound as a scavenger during polymerization to deactivate potential poisons to the activated catalyst.

Alternatively, single site or metallocene catalysts comprising transition metal pre-catalysts which typically require activation to form a cationic metal center by an organometal Lewis acid, can be activated using an alkylaluminoxane, more particularly methylalumoxane or MAO. For purposes of the present invention a titanocene such as Tebbe's reagent, $Cp_2TiCl(CH_2)Al(CH_3)_2$, may also be useful.

Deactivated or Substantially Deactivated Titanocenes

As described above, titanocenes are included within the general class of metallocene pre-catalysts, as well as activated catalysts suitable for polymerizing olefins. However, for purposes of the present invention, such titanocene pre-catalyst compounds (or even activated titanocene compounds which would otherwise be catalytically active for polymerization) are intentionally deactivated or substantially deactivated for polymerization of olefins so that they are no longer suitable for such polymerization use. However, such deactivated compounds are included as a component, indeed a significant component of the catalyst or catalyst systems of the present invention. While such use may appear to be counterintuitive, it has been found that inclusion of such compounds results in a catalyst or catalyst system which is capable of polymerizing polyolefins having one or more preferred properties, namely high molecular weight, a relatively narrow molecular weight distribution and which also exhibit a low melt flow relative to polymers produced in the absence of such an "inactive" titanocene compound or component.

Thus, although the titanocene is inactive or substantially inactive insofar as its ability to effect polymerization of olefinic monomers by itself, it is highly effective for desirably modifying the polymerization characteristics of, for example, zirconocene- or hafnocene-containing metallocene pre-catalyst or catalyst systems.

Various alternative embodiments are suitable for inactivating, deactivating and using titanocene pre-catalyst compounds in combination with one or more polymerization pre-catalysts or catalysts, including for example:

(1) reacting a titanocene compound described above with an organoaluminum compound, wherein the reaction is conducted prior to mixing the inactivated titanocene with the metallocene pre-catalyst or activated metallocene catalyst;

(2) reacting the titanocene simultaneously with activation of the metallocene by utilizing an excess of a suitable organometallic or alkylalumoxane compound at a suitable temperature and for a suitable time in order to effect such inactivation;

(3) mixing a titanocene pre-catalyst compound with a carrier support in a liquid composition, including for example wherein the titanocene is present in a diluent or solvent, and carrying out the inactivation reaction in the liquid phase in the presence of the support;

(4) preparing a titanocene pre-catalyst/support mixture using a titanocene compound dispersed or dissolved in a diluent, separating the diluent or solvent from the mixture, typically with drying to produce a supported titanocene pre-catalyst composition and deactivating the supported titanocene compound, preferably followed by drying of the deactivated titanocene;

(5) addition of a previously deactivated titanocene compound in a diluent or solvent to a supported metallocene catalyst/MAO co-catalyst (or other suitable co-catalyst) activated polymerization catalyst system, preferably followed by drying of the resulting mixture so as to form the supported catalyst for use in a polymerization process;

(6) adding a titanocene pre-catalyst compound to a supported, activated metallocene catalyst and deactivating the titanocene in the presence of such supported activated metallocene catalyst, preferably followed by drying of the catalyst system; and (7) deactivating a titanocene in the presence of a catalyst support or carrier and drying the mixture to produce a supported, deactivated titanocene additive for subsequent use as a support for a metallocene pre-catalyst or activated metallocene catalyst. Alternatively, a previously deactivated titanocene compound in a solvent or diluent can be added to a support or carrier and the composition dried for further use in preparing a supported metallocene catalyst system, as just described.

(8) preparing a suitably deactivated, supported titanocene as described in one or more of the methods above and combining such supported deactivated titanocene with a supported, active metallocene or metallocene pre-catalyst which is to be activated in order to obtain a mixed, supported catalyst system. In particular, the support used for the deactivated titanocene need not be the same as the support used for the metallocene.

(9) preparing a suitably deactivated titanocene as described in one or more of the methods above, but in the absence of a support and in the presence of a solvent or diluent and combining such deactivated titanocene with an unsupported active metallocene or metallocene pre-catalyst which is to be activated in order to obtain a homogeneous catalyst system. See, for example, WO 2005/090427, which discloses useful dual olefin polymerization catalyst systems and which is incorporated herein to the extent permitted by law.

Without wishing to be bound by a theory, it is generally accepted that the particle supporting the metallocene component will fracture as a consequence of the polymerization reaction, thus producing very small support particulates. In contrast, since a separately supported, deactivated titanocene component does not effect polymer formation on or within the support particle, it is not expected to be fractured and the support particle size will be about the same in the resulting polymer as when the catalyst system comprising the supported, deactivated titanocene was introduced into the polymerization reaction vessel. In a preferred embodiment, the deactivated titanocene support is significantly smaller compared to the metallocene support so that when it is dispersed in a polymer or copolymer made using such a titanocene component in a polymerization catalyst system, it will not have a significant negative affect on the polymer properties. For example, a particularly preferred embodiment would utilize a significantly smaller support particle size so as not to introduce "gel" or undispersed particles of a size that would cause film produced using such polymer to tear when being processed. For example, in various preferred embodiments a support for a separately supported, deactivated titanocene component typically will have a particle size that is at least about 1% to about 99.99% smaller than a satisfactory or typical support used for the metallocene component; preferably about 20% to about 99.9% smaller; more preferably about 60% to about 99.99% smaller; still more preferably about 80% to about 99.99% smaller; for example, about 80% to about 90% smaller. In terms of specific particle sizes that may be suitable for a separately supported titanocene component, typical supports will have average or mean particle sizes of about 20 microns to about 0.1 microns; preferably about 15 microns to about 0.5 microns; more preferably about 10 microns to about 1 microns; for example, about 9 microns to about 3 microns.

Useful particle sizes can vary according to the polymerization process being employed. For example, useful catalyst particle sizes (average particle size or APS) for use in slurry loop polymerization processes can be about 100 microns; in gas phase polymerization processes about 20 microns to about 40 microns; and for stirred tank processes about 10 microns to about 20 microns. Where substantially deactivated titanocene is prepared as a separate component from the metallocene, useful APS for the supported titanocene component are preferably less than about 10 microns.

Organometallic compounds useful for deactivating the titanocene pre-catalyst can be the same or different organometallic compound used as a co-catalyst for activating the metallocene or zirconocene pre-catalyst compound, as described above. Alternatively, suitable compounds can be selected from the group of organometallic compounds described above as suitable co-catalyst metallocene pre-catalyst compound activators, including an alkylalumoxane such as methylalumoxane. Also useful are organometallic compounds or inorganic compounds such as alkyllithium compounds, dialkylmagnesium compounds, alkylmagnesium chlorides, dialkylzinc compounds, lithium aluminum hydrides and other reducing agents capable of deactivating the titanocene towards polymerization without destroying its metallocene enhancement effect described herein, such as reducing Ti+4 to Ti+3.

In preferred embodiments the deactivating organometallic or organoaluminum compound comprises at least one beta-hydrogen. In other words, the organic ligand of the organometallic or organoaluminum compound comprises at least one carbon atom in the beta position relative to the metal atom (in other words the carbon atom is the second from the metal and the first atom bonded to the metal is typically a carbon atom or a heteroatom) and such carbon itself comprises a hydrogen atom. Among the various alternative deactivating compounds described below, a person skilled in the art will readily discern those compounds comprising at least one beta hydrogen. Particularly preferred compounds of this type include, for example, triisobutyl aluminum, triethyl aluminum and the like. Alternatively, as noted below trimethylaluminum can be used for deactivation although it does not contain a beta hydrogen.

An organoaluminum compound suitable for deactivation of the titanocene can also be, for example, an organoaluminum compound represented by formula (I):

$$R^a_n AlX_{3-n} \quad (I)$$

wherein $R^a$ is a hydrocarbon group of 1 to 12 carbon atoms, X is a halogen atom or hydrogen, and n is 1 to 3. $R^a$ can be, for example, an alkyl group, a cycloalkyl group or an aryl group. Particular examples thereof include alkyl groups, such as methyl, ethyl, n-propyl, isopropyl, n-butyl, isobutyl, pentyl, hexyl, isohexyl, heptyl, nonyl and octyl; cycloalkyl groups such cyclopentyl and cyclohexyl; and aryl groups such as phenyl and tolyl.

Examples of such organoaluminum compounds include: trialkylaluminums, such as trimethylaluminum, triethylaluminum, triisopropylaluminum, triisobutylaluminum, trioctylaluminum and tri-2-ethylhexylaluminum; alkenylaluminums, such as isoprenylaluminum; dialkylaluminum halides, such as dimethylaluminum chloride, diethylaluminum chloride, diisopropylaluminum chloride, diisobutylaluminum chloride and dimethylaluminum bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as dimethylaluminum hydride, diethylaluminum hydride, dihydrophenylaluminum, diisopropylaluminum hydride, di-n-butylaluminum hydride, diisobutylaluminum hydride, diisohexylaluminum hydride, diphenylalunimum hydride, dicylohexylaluminum hydride, di-sec-heptylaluminum hydride and di-sec-nonylaluminum hydride.

Also suitable as the organoaluminum compound is a compound represented by formula (II):

$$R^a_n AlY_{3-n} \quad (II)$$

wherein $R^a$ is the same as in formula (I) above; Y is —$OR^b$ group, —$OSiR^c_3$ group, —$OAlR^d_2$ group, —$NR^e_2$ group, —$SiR^f_3$ group or —$N(R^g)AlR^h_2$ group; n is 1 to 2; $R^b$, $R^c$, $R^d$ and $R^h$ are each methyl, ethyl, isopropyl, isobutyl (iso-Bu), cyclohexyl, phenyl or the like, $R^e$ is hydrogen, methyl (Me), ethyl (Et), isopropyl (iso-Pro), phenyl (Ph), trimethylsilyl or the like; and $R^f$ and $R^g$ are each methyl, ethyl or the like.

Examples of such organoaluminum compounds include:
(a) compounds of the formula $R^a_n Al(OR^b)_{3-n}$, e.g., dimethylaluminum methoxide, diethylaluminum ethoxide and diisobutylaluminum methoxide, diethylaluminum phenoxide;
(b) compounds of the formula $R^a_n Al(OSiR^c)_{3-n}$, e.g., $Et_2Al(OSiMe_3)$, $(iso-Bu)_2Al(OSiMe_3)$ and $(iso-Bu)_2Al(OSiEt_2)$;
(c) compounds of the formula $R^a_n Al(OAlR^d_2)_{3-n}$, e.g., $Et_2AlOAlEt_2$ and $(iso-Bu)_2AlOAl(iso-Bu)_2$;
(d) compounds of the formula $R^a_n Al(NR^e_2)_{3-n}$, e.g., $MeAlNEt_2$, $Et_2AlNHMe$, $Me_2AlNHEt$, $Et_2AlN(SiMe_3)_2$ and $(iso-Bu)_2AlN(SiMe_3)_2$;
(e) compounds of the formula $R^a_n Al(SiR^f_2)_{3-n}$, e.g., $(iso-Bu)_2AlSiMe_3$; and
(f) compounds of the formula $R^a_n Al(N(R^g)AlR^h_2)_{3-n}$, e.g., $Et_2AlN(Me)AlEt_2$ and $(iso-Bu)_2AlN(Et)Al(iso-Bu)_2$.

Of the organoaluminum compounds represented by formulas (I) and (II), preferred are compounds of the formulas $R^a_3Al$, $R^a_n Al(OR^b)_{3-n}$, and $R^a_n Al(OAlR^d_2)_{3-n}$, and particularly preferred are compounds of said formulas in which $R^a$ is an isoalkyl group and n is 2. Alternative preferred embodiments comprise at least one $R^a$ group which is a hydrocarbon possessing two or more carbons in which the beta carbon has one or more hydrogen atoms bonded to it. Most preferred is an organoaluminum compound such as trimethyl aluminum, triethyl aluminum or tri-isobutyl aluminum, the latter being particularly preferred.

Also suitable is a cyclic organometallic compound of Group 13 of the Periodic Table of the Elements, at least one compound represented by formula (III) or formula (IV), or a mixture of compounds of formula (III) and formula (IV) and preferably a cyclic organoaluminum compound (as disclosed in U.S. Pat. No. 5,468,707, incorporated herein to the extent permitted):

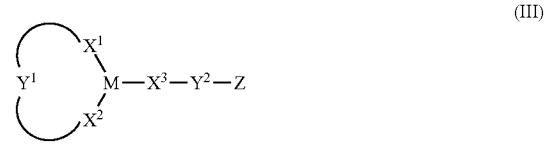

wherein M is B, Al, Ga, or In;
$X^1$, $X^2$, $X^3$ are, in each case independently of one another, $CHR^1$, $NR^2$, O, or S;
$Y^1$, $Y^2$ are, in each case independently of one another, —$(CH_2)_m$—, O—$(CH_2)_p$—$C_6H_4$—$(CH_2)_q$—O—$(CH_2)_p$—$C_6H_6$—$(CH_2)_q$—, O—$(CH_2)_p$—$C_6H_8$—$(CH_2)_q$—, O—$(CH_2)_p$—$C_6H_{10}$—$(CH_2)_q$—, O—$(CH_2)_p$—$C_5H_4$—$(CH_2)_q$—, O—$(CH_2)_p$—$C_5H_6$—$(CH_2)_q$—, O—$(CH_2)_p$—$C_5H_8$—$(CH_2)_q$—, or —$(CH_2)_p$—CH=CH—$(CH_2)_q$—;
Z is $NR^3$, $R^4$, $PR^3$, $R^4$, $OR^5$, or $SR^5$;
$R^1$ is H, OH, halogen, $C_{1-6}$-alkyl or $C_{1-6}$-alkoxyl, $C_{5-7}$-cycloalkyl, or phenyl;

$R^2$, $R^3$, $R^4$, $R^5$ are, in each case independently of one another, H or $C_{1-6}$-alkyl, $C_{5-7}$-cycloalkyl, phenyl, or $R^3$ and $R^4$ together also form a $C_{4-6}$-alkylene bridge;

m is a number from 1 to 6;

p, q are, in each case independently of one another, a number from 0 to 2;

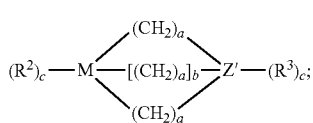
(IV)

wherein M, $R^2$ and $R^3$ are defined as above and wherein Z' is N or P;

a is a number from 2 to 4; and b, c are the numbers 0 or 1 with b+c=1.

Preferably in formula (III) $X^3$ is —$CH_2$—, O—, —S— or an amino group optionally substituted by $C_{1-6}$-alkyl, $C_{5-7}$-cycloalkyl or phenyl. In an alternative preferable embodiment, $Y^2$ is —$(CH_2)_n$— and m is 1-6. In still another alternative preferable embodiment, $Y^2$ is —$(CH_2)_p$—CH=CH—$(CH_2)_q$—, in which the double bond has a cis configuration.

In a further preferable embodiment in formula (IV), b is zero, and $R^2$ and $R^3$ are each independently H, $C_{1-6}$-alkyl, $C_{5-7}$-cycloalkyl or phenyl.

For example, the compound of formula (III) is at least one of:

1-alumina-1-(4-dimethylaminobutyl)cyclobutane; 1-alumina-1-(2-dimethylaminoethyl)cyclopentane; 1-alumina-1-(2-diethylaminoethyl)cyclopentane; 1-alumina-1-(2-dipropylaminoethyl)cyclopentane; 1-alumina-1-(2-diisopropylaminoethyl)cyclopentane; 1-alumina-1-(2-dibutylaminoethyl)cyclopentane; 1-alumina-1-(3-dimethylaminopropyl)cyclopentane; 1-alumina-1-(3-diethylaminopropyl)cyclopentane; 1-alumina-1-(3-dipropylaminopropyl)cyclopentane; 1-alumina-1-(3-diisopropylaminopropyl)cyclopentane; 1-alumina-1-(3-dibutylaminopropyl)cyclopentane; 1-alumina-1-(4-dimethylaminobutyl)cyclopentane; 1-alumina-1-(4-diethylaminobutyl)cyclopentane; 1-alumina-1-(4-dipropylaminobutyl)cyclopentane; 1-alumina-1-(4-diisopropylaminobutyl)cyclopentane; 1-alumina-1-(4-dibutylaminobutyl)cyclopentane; 1-alumina-1-(3-dimethylaminopropyl)-2-methylcyclopentane; 1-alumina-1-(2-dimethylaminoethyl)cyclohexane; 1-alumina-1-(2-diethylaminoethyl)cyclohexane; 1-alumina-1-(2-dipropylaminoethyl)cyclohexane; 1-alumina-1-(2-diisopropylaminoethyl)cyclohexane; 1-alumina-1-(2-dibutylaminoethyl)cyclohexane; 1-alumina-1-(3-dimethylaminopropyl)cyclohexane; 1-alumina-1-(3-diethylaminopropyl)cyclohexane; 1-alumina-1-(3-dipropylaminopropyl)cyclohexane; 1-alumina-1-(3-diisopropylaminopropyl)cyclohexane; 1-alumina-1-(3-dibutylaminopropyl)cyclohexane; 1-alumina-1-(4-dimethylaminobutyl)cyclohexane; 1-alumina-1-(4-diethylaminobutyl)cyclohexane; 1-alumina-1-(4-dipropylaminobutyl)cyclohexane; 1-alumina-1-(4-diisopropylaminobutyl)cyclohexane; 1-alumina-1-(4-dibutylaminobutyl)cyclohexane; 1-alumina-1-(o-diethylaminobenzyl)cyclopentane; 1-alumina-1-(o-diethylaminobenzyl)cyclohexane; 1-alumina-1-(o-diisopropylaminobenzyl)cyclohexane; 1-alumina-1-(2-o-dimethylaminophenylethyl)cyclopentane; 1-alumina-1-(2-o-diethylaminophenylethyl)cyclobutane; 1-galla-1-(3-dimethylaminopropyl)cyclobutane; 1-galla-1-(2-dimethylaminoethyl)cyclopentane; 1-galla-1-(3-dimethylaminopropyl)cyclopentane; 1-galla-1-(2-dimethylaminoethyl)cyclopentane; 1-galla-1-(2-diethylaminoethyl)cyclopentane; 1-galla-1-(2-dipropylaminoethyl)cyclopentane; 1-galla-1-(2-diisopropylaminoethyl)cyclopentane; 1-galla-1-(2-dibutylaminoethyl)cyclopentane; 1-galla-1-(3-diethylaminopropyl)cyclopentane; 1-galla-1-(3-dipropylaminopropyl)cyclopentane; 1-galla-1-(3-diisopropylaminopropyl)cyclopentane; 1-galla-1-(3-dibutylaminopropyl)cyclopentane; 1-galla-1-(4-dimethylaminobutyl)cyclopentane; 1-galla-1-(4-diethylaminobutyl)cyclopentane; 1-galla-1-(4-dipropylaminobutyl)cyclopentane; 1-galla-1-(4-isopropylaminobutyl)cyclopentane; 1-galla-1-(4-dibutylaminobutyl)cyclopentane; 1-galla-1-(3-dimethylaminopropyl)cyclohexane; 1-galla-1-(3-diethylaminopropyl)cyclohexane; 1-galla-1-(3-dipropylaminopropyl)cyclohexane; 1-galla-1-(3-diisopropylaminopropyl)cyclohexane; 1-galla-1-(3-dibutylaminopropyl)cyclohexane; 1-galla-1-(2-dimethylaminoethyl)cyclohexane; 1-galla-1-(2-diethylaminoethyl)cyclohexane; 1-galla-1-(2-dipropylaminoethyl)cyclohexane; 1-galla-1-(2-diisopropylaminoethyl)cyclohexane; 1-galla-1-(2-dibutylaminoethyl)cyclohexane; 1-galla-1-(4-dimethylaminobutyl)cyclohexane; 1-galla-1-(4-diethylaminobutyl)cyclohexane; 1-galla-1-(4-dipropylaminobutyl)cyclohexane; 1-galla-1-(4-isopropylaminobutyl)cyclohexane; 1-galla-1-(4-dibutylaminobutyl)cyclohexane; 1-galla-1-(o-dimethylaminobenzyl)cyclobutane; 1-galla-1-(o-dimethylaminobenzyl)cyclopentane; 1-galla-1-(o-dimethylaminobenzyl)cyclohexane; 1-galla-1-(o-diethylaminobenzyl)cyclohexane; 1-galla-1-(o-dipropylaminobenzyl)cycloheptane; 1-inda-1-(2-diethylaminoethyl)cyclobutane; 1-inda-1-(2-dimethylaminoethyl)cyclopentane; 1-inda-1-(2-diethylaminoethyl)cyclopentane; 1-inda-1-(2-dipropylaminoethyl)cyclopentane; 1-inda-1-(2-diisopropylaminoethyl)cyclopentane; 1-inda-1-(2-dibutylaminoethyl)cyclopentane; 1-inda-1-(3-dimethylaminopropyl)cyclopentane; 1-inda-1-(3-diethylaminopropyl)cyclopentane; 1-inda-1-(3-dipropylaminopropyl)cyclopentane; 1-inda-1-(3-diisopropylaminopropyl)cyclopentane; 1-inda-1-(3-dibutylaminopropyl)cyclopentane; 1-inda-1-(4-dimethylaminobutyl)cyclopentane; 1-inda-1-(4-diethylaminobutyl)cyclopentane; 1-inda-1-(4-dipropylaminobutyl)cyclopentane; 1-inda-1-(4-diisopropylaminobutyl)cyclopentane; 1-inda-1-(4-dibutylaminobutyl)cyclopentane; 1-inda-1-(2-dimethylaminoethyl)cyclohexane; 1-inda-1-(2-diethylaminoethyl)cyclohexane; 1-inda-1-(2-dipropylaminoethyl)cyclohexane; 1-inda-1-(2-diisopropylaminoethyl)cyclohexane; 1-inda-1-(2-dibutylaminoethyl)cyclohexane; 1-inda-1-(3-dimethylaminopropyl)cyclohexane; 1-inda-1-(3-diethylaminopropyl)cyclohexane; 1-inda-1-(3-dipropylaminopropyl)cyclohexane; 1-inda-1-(3-diisopropylaminopropyl)cyclohexane; 1-inda-1-(3-dibutylaminopropyl)cyclohexane; 1-inda-1-(4-dimethylaminobutyl)cyclohexane; 1-inda-1-(4-diethylaminobutyl)cyclohexane; 1-inda-1-(4-dipropylaminobutyl)cyclohexane; 1-inda-1-(4-diisopropylaminobutyl)cyclohexane; 1-inda-1-(4- dibutylaminobutyl)cyclohexane; 1-inda-1-(o-diisopropylaminobenzyl)cyclobutane; 1-inda-1-(o-dimethylaminobenzyl)cyclopentane; 1-inda-1-(o-dibutylaminobenzyl)cyclopentane; 1-inda-1-(o-dimethylaminobenzyl)cyclohexane; 1-inda-1-(o-diethylaminobenzyl)cyclohexane; 1-inda-1-(o-dimethylaminobenzyl)cyclooctane; 2,5-dimethyl-1-(3-dimethylaminopropyl)-2,5-diaza-1-aluminacyclopentane; 2,5-dimethyl-1-(3-dimethylaminopropyl)-2,5-diaza-1-aluminacyclohexane; 2,5-dimethyl-1-(3-dimethylaminopropyl) -2,5-diaza-1-aluminacycloheptane; 2,5-dimethyl-1-(3-dimethylaminopropyl)-2,5-diaza-1-aluminacyclopentane; 2,5-dimethyl-1-(3-diethylaminopropyl)-2,5-diaza-1-aluminacyclohexane; 2,5-dimethyl-1-(3-diethylaminopropyl)-2,5-diaza-1-aluminacycloheptane; 2,5-diethyl-1-(3-dimethylaminopropyl)-2,5-diaza-1-aluminacyclohexane; 2,5-diethyl-1-(3-dimethylaminopropyl)-2,5-diaza-1-aluminacyclopentane, 2,5-diethyl-1-(4-dimethylaminobutyl)-2,5-diaza-1-aluminacyclohexane; 2,5-diethyl-1-(4-dimethylaminobutyl)-2,5-diaza-1-aluminacyclopentane; 2,5-diethyl-1-(4-dimethylaminobutyl)-2,5-diaza-1-aluminacycloheptane; 2-ethyl-5-propyl-1-(4-dimethylaminobutyl)-2,5-diaza-1-aluminacyclohexane; 2-ethyl-5-propyl-1-(4-dimethylaminobutyl)-2,5-diaza-1-aluminacyclopentane; 2-ethyl-5-propyl-1-(4-dimethylaminobutyl)-2,5-diaza-1-aluminacycloheptane; 2,5-dimethyl-1-(3-dimethylaminopropyl)-2,5-diaza-1-gallacyclopentane; 2,5-dimethyl-1-(3-dimethylaminopropyl)-2,5-diaza-1-gallacyclohexane; 2,5-dimethyl-1-(3-dimethylaminopropyl)-2,5-diaza-1-gallacycloheptane; 2,5-dimethyl-1-(3-diethylaminopropyl)-2,5-diaza-1-gallacyclopentane; 2,5-dimethyl-1-(3-diethylaminopropyl)-2,5-diaza-1-gallacyclohexane; 2,5-dimethyl-1-(3-diethylaminopropyl)-2,5-diaza-1-gallacycloheptane; 2,5-diethyl-1-(3-dimethylaminopropyl)-2,5-diaza-1-gallacyclohexane; 2,5-diethyl-1-(3-dimethylaminopropyl)-2,5-diaza-1-gallacyclopentane; 2,5-diethyl-1-(3-dimethylaminopropyl)-2,5-diaza-1-gallacycloheptane; 2,5-diethyl-1-(4-dimethylaminobutyl)-2,5-diaza-1-gallacyclohexane; 2,5-diethyl-1-(4-dimethylaminobutyl)-2,5-diaza-1-gallacyclopentane; 2,5-diethyl-1-(4-dimethylaminobutyl)-2,5-diaza-1-gallacycloheptane; 2-ethyl-5-propyl-1-(4-dimethylaminobutyl)-2,5-diaza-1-gallacyclohexane; 2-ethyl-5-propyl-1-(4-dimethylaminobutyl)-2,5-diaza-1-gallacyclopentane; 2-ethyl-5-propyl-1-(4-dimethylaminobutyl)-2,5-diaza-1-gallacycloheptane; 2,5-dimethyl-1-(3-dimethylaminopropyl)-2,5-diaza-1-indacyclopentane; 2,5-dimethyl-1-(3-dimethylaminopropyl)-2,5-diaza-1-indacyclohexane; 2,5-dimethyl-1-(3-dimethylaminopropyl)-2,5-diaza-1-indacycloheptane; 2,5-dimethyl-1-(3-diethylaminopropyl)-2,5-diaza-1-indacyclopentane; 2,5-dimethyl-1-(3-diethylaminopropyl)-2,5-diaza-1-indacyclohexane; 2,5-dimethyl-1-(3-diethylaminopropyl)-2,5-diaza-1-indacycloheptane; 2,5-diethyl-1-(3-dimethylaminopropyl)-2,5-diaza-1-indacyclohexane; 2,5-diethyl-1-(3-dimethylaminopropyl)-2,5-diaza-1-indacyclopentane; 2,5-diethyl-1-(3-dimethylaminopropyl)-2,5-diaza-1-indacycloheptane; 2,5-diethyl-1-(3-dimethylaminobutyl)-2,5-diaza-1-indacyclohexane; 2,5-diethyl-1-(3-dimethylaminobutyl)-2,5-diaza-1-indacyclopentane; 2,5-diethyl-1-(3-dimethylaminobutyl)-2,5-diaza-1-indacycloheptane; 2-ethyl-5-propyl-1-(4-dimethylaminobutyl)-2,5-diaza-1indacyclohexane; 2-ethyl-5-propyl-1-(4-dimethylaminobutyl)-2,5-diaza-1-indacyclopentane or 2-ethyl-5-propyl-1-(4-dimethylaminobutyl)-2,5-diaza-1-indacycloheptane.

Alternatively for example, the compound of formula IV is at least one of: 5-methyl-1-galla-5-azacyclooctane; 1,5-dimethyl-1-galla-5-azacyclooctane; 1,5-diethyl-1-galla-5-azacyclooctane; 1,5-dipropyl-1-galla-5-azacyclooctane; 1,5-dimethyl-1-alumina-5-azacyclooctane; 1,5-diethyl-1-alumina-5-azacyclooctane; 1,5-diisopropyl-1-alumina-5-azacyclooctane; 1,5-dibutyl-1-alumina-5-azacyclooctane; 1-methyl-5-ethyl-1-galla-5-azacyclooctane; 1-ethyl-5-methyl-1-alumina-5-azacyclooctane; 1,6-dimethyl-1-galla-6-azacyclodecane; 1,6-dimethyl-1-alumina-6-azacyclodecane; 1,6-diethyl-1-galla-6-azacyclodecane; 1,4-dimethyl-1-galla-4-azacyclohexane; 1,6-diethyl-1-alumina-6-azacyclodecane; 1-galla-5-azabicyclo[3.3.3]undecane; 1-galla-4-azabicyclo[2.2.2]octane; 1-alumina-5-azabicyclo[3.3.3]undecane; 1-alumina-4-azabicyclo[2.2.2]octane; 1-galla-6-azabicyclo[4.4.4]tetradecane; 1-alumina-6-azabicyclo[4.4.4]tetradecane; 1,5-dimethyl-1-inda-5-azacyclooctane; 1,5-diethyl-1-inda-5-azacyclooctane; 1,5-dipropyl-1-inda-5-azacyclooctane; 1,5-diisopropyl-1-inda-5-azacyclooctane; 1,5-dibutyl-1-inda-5-azacyclooctane; 1-methyl-5-ethyl-1-inda-5-azacyclooctane; 1-ethyl-5-propyl-1-inda-5-azacyclooctane; 1,6-dimethyl-1-inda-6-azacyclodecane; 1,6-diethyl-1-inda-6-azacyclodecane; 1,4-dimethyl-1-inda-4-azacyclohexane; 1-inda-5-azabicyclo[3.3.3]undecane; 1-inda-4-azabicyclo[2.2.2]octane; 1-methyl-5-cyclohexyl-1-inda-5-azacyclooctane; 1-methyl-5-phenyl-1-inda-5-azacyclooctane; 1-inda-6-azabicyclo[4.4.4]tetradecane; 1,6-dimethyl-1-galla-6-azacyclodecane; 1,6-diethyl-1-galla-6-azacyclodecane; 1,6-dipropyl-1-galla-6-azacyclodecane; 1,6-diisopropyl-1-galla -6-azacyclodecane; 1,6-dibutyl-1-galla-6-azacyclodecane; 1,6-di-tert-butyl-1-galla-6-azacyclodecane; 1,6-diisobutyl-1-galla-6-azacyclodecane; 1,4-dimethyl-1-galla-4-azacyclohexane; 1,4-diethyl-1-galla-4-azacyclohexane; 1,4-dipropyl-1-galla-4-azacyclohexane; 1,4-diisopropyl-1-galla-4-azacyclohexane; 1,4-dibutyl-1-galla-4-azacyclohexane; 1,4-diisobutyl-1-galla-4-azacyclohexane; 1,4-di-tert-butyl-1-galla-4-azacyclohexane; 1-methyl-5-ethyl-1-galla-5-azacyclooctane; 1-methyl-5-propyl-1-galla-5-azacyclooctane; 1-propyl-5-methyl-1-galla-5-azacyclooctane; 1-ethyl-5-methyl-1-galla-5-azacyclooctane; 1-ethyl-6-propyl-1-galla-6-azacyclodecane; 1-propyl-6-butyl-1-galla-6-azacyclodecane; 1-methyl-6-ethyl-1-galla-6-azacyclodecane; 1-methyl-4-ethyl-1-galla-4-azacyclohexane; 1-propyl-4-methyl-1-galla-4-azacyclohexane, or 1-ethyl-4-butyl-1-galla-4-azacyclohexane, substituted by $C_{1-6}$-alkyl, $C_{5-7}$-cycloalkyl or phenyl.

Preferably the cyclic organoaluminum compound is 1-alumina-1-(3-dimethylaminopropyl)cyclohexane or 1,5-dimethyl-1-alumina-5-azacyclooctane.

Also useful are cyclic organoaluminum compounds as disclosed in U.S. Pat. No. 7,294,599 (Jensen et al.; incorporated herein to the extent permitted). This patent discloses synthesis schemes for producing useful alkylaluminumcyclopentanes (ACPs), including alpha and other ring substituted aluminacyclopentanes, and aluminacyclopentenes, as illustrated in formula (V)A through formula (V)G:

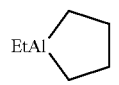

(V)A

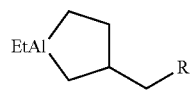

(V)B

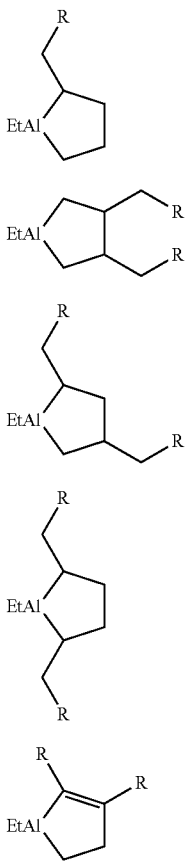

(V)C (V)D (V)E (V)F (V)G wherein in each of (V)A through V(G) R=$C_3H_7$, $C_5H_{11}$, or $C_8H_{17}$.

As will be appreciated by those skilled in the art, potentially useful deactivating compounds as described above and comprising a beta-hydrogen may be preferred from a cost perspective because at least some of them may be less expensive.

Without wishing to be bound by theory, it is believed that deactivated titanocene compounds are useful in the present invention as a consequence of reducing the titanium in an active pre-catalyst compound from $Ti^{+4}$ to $Ti^{+3}$. However, if the titanocene is reduced or deactivated using a compound or method which also reduces or suppresses the activity or utility of the active metallocene polymerization pre-catalyst or catalyst compound or composition, such a method or deactivating agent would not be suitable. Thus, a Grignard reagent, which is typically soluble in an ether and would likely interfere with the active metallocene component would not be preferred even though it may be capable of reducing, and thus deactivating, a titanocene. According to an embodiment of the present invention this can be accomplished, for example, by reacting an organoaluminum compound with the titanocene compound. Suitable molar ratios of Al:Ti for this purpose are about 100:1; alternatively about 75:1; or about 50:1; or about 25:1; or about 15:1; or about 10:1; such as about 5:1; and greater than 1:1. In other words, suitable molar amounts are such that there is a molar excess of aluminum which is present in the organoaluminum compound relative to titanium in the titanocene compound when these compounds are contacted for purposes of deactivating the titanocene. Suitable ranges based on the above values include, for example, about 100:1 to about 5:1; or 100:1 to about 10:1; or about 75:1 to about 5:1; or about 75:1 to about 10:1; or about 15:1 to about 5:1; or greater than 1:1 to about 25:1; etc., and including all permutations and combinations based on the above individual values.

Ascertaining or confirming suitable amounts and reaction conditions for accomplishing titanocene deactivation is readily determined since only limited experimentation is needed to select an inactivating organometallic compound in an amount relative to the titanocene that is sufficient to substantially completely react with the titanocene at a selected temperature and for a given period of time and then to confirm that the titanocene is inactive by using it as the sole catalyst species under olefin polymerization conditions and measuring whether or not polyolefin is produced in a measurable quantity.

For example, several equivalents of a compound capable of inactivating a titanocene towards polymerization, such as an organoaluminum compound, for example a trialkylaluminum, such as triisobutylaluminum, is dissolved or dispersed in a solvent such as heptane or toluene. The inactivator composition is added to a titanocene, for example, bis(cyclopentadienyl) titanium dichloride (sometimes referred to as titanocene dichloride or $Cp_2TiCl_2$, which has a red color). After mixing for a period of time at ambient temperature (about 20° C. to about 25° C.), there is a color change to blue, indicating that the active titanocene has been deactivated. The inactivated titanocene solution can be mixed with a zirconocene that is active for olefin polymerization, such as a so-called simple Zr-based metallocene polyolefin catalyst (for example, a bis(indenyl)zirconium dichloride or bis(n-butylcyclopentadienyl)zirconium dichloride, rac-bis(indenyl)ethan-1,2-diyl-zirconium dichloride, bis(1-n-butyl-3-methyl-cyclopentadienyl)zirconium dichloride, in combination with a metallocene activator, such as methylalumoxane. In one embodiment, the resulting catalyst composition can be used, e.g., to impregnate a carrier or support to produce a supported catalyst for the polymerization of an olefin under polymerization conditions and the molecular weight of the polymer produced by the active zirconocene polyolefin catalyst in combination with the inactive titanocene can produce a higher molecular weight polymer than would otherwise be produced in the absence of the titanocene component. Notably, it can be demonstrated that a modified titanocene-based solution, treated as described above, whether in the form of a solution or applied to a catalyst support or carrier and dried, and used in combination with a compound typically added as a metallocene co-catalyst, such as methylalumoxane (MAO), is inactive or substantially inactive as a polymerization catalyst.

In alternative embodiments of the present invention, the deactivated or substantially deactivated titanocene compound may be previously contacted or mixed with the metallocene pre-catalyst compound or the activated metallocene compound and then used for polymerization, or the deactivated or substantially deactivated titanocene may be separately introduced into the polymerization reactor. Suitable molar amounts of the deactivated or substantially deactivated titanocene compound are used so as to provide a molar ratio of titanium in the titanocene compound (before or after deactivation or substantial deactivation) to transition metal in the metallocene pre-catalyst compound or activated transition metal compound, for example, zirconium and/or hafnium that is typically about 0.0001 to about 100.0; preferably about 0.001 to about 10.0; more preferably about 0.01 to about 5.0; such as about 0.05 to about 1.0. Alternatively useful ranges include a lower value and an upper value selected from values in the range of about 0.01 to about 10, taken at intervals of 0.1. For example, lower values selected from 0.01, 0.02, 0.03, 0.04, 0.05, 0.06, 0.07, 0.08, 0.09, 1.0, etc. and upper values selected from 10, 9.9, 9.8, 9.7, 9.6, 9.5, 9.4, 9.3 9.2, 9.1, 9.0, 8.9, etc. Thus other suitable ranges include, for example, about 0.01 to about 5.0, about 0.05 to about 4.0, 0.1 to about 4.0, and all such other permutations and combinations included within the lower and upper limiting values expressed above.

Evidence for the significant effect of the presence of an inactive titanocene compound on the polymer produced is illustrated in FIG. 1. It can be seen that the value of HLMI decreases sharply as the molar ratio of Ti/Zr increases from "zero" (no inactivated titanocene present) to 10.0 using as a catalyst bis(indenyl)-zirconium dichloride or (n-BuCp)$_2$ZrCl$_2$ activated with methylalumoxane in the polymerization of ethylene conducted at 90° C. and 450 psi total pressure.

For purposes of the present invention, the phrase "substantially inactive" as applied to a titanocene pre-catalyst compound which has been modified so as to be substantially inactive towards olefin polymerization means that after activation of the modified compound in a manner which typically results in an active olefin polymerization catalyst, a substantially inactive titanocene typically will produce less than about 50% of the amount of polyolefin compared to its unmodified, active counterpart; preferably less than about 40%; more preferably less than about 30%; still more preferably less than about 20%; even more preferably less than about 10%; most preferably less than about 5%; such as less than about 1%; for example, less than about 0.5%. In a preferred embodiment a modified, substantially inactive titanocene compound will polymerize trace amounts of polyolefin, for example, greater than 0% to less than about 0.1% compared to its active counterpart compound. Alternatively, a substantially inactive titanocene will be understood by a person skilled in the art to produce about 0, which can be understood to include no polyolefin to only slightly greater than zero grams to about 100 grams of polyolefin per gram of catalyst (g/g, productivity); or about 1 g/g to about 90 g/g; or about 2 g/g to about 80 g/g; or about 5 g/g to about 70 g/g; or about 10 g/g to about 60 g/g. In a most preferred embodiment a substantially inactive or inactive titanocene will not produce a measurable quantity of polyolefin under standard polymerization conditions known in the art (including attempted activation using known activation agents for the pre-catalyst titanocene compound) using the olefin and an unmodified pre-catalyst titanocene compound.

Alternatively, substantially inactive towards olefin polymerization means that using a catalyst system comprising a modified titanocene component in combination with, for example, a zirconocene component which is active for olefin polymerization, no polymer is produced by the titanium-containing component or that if any polymer is produced using such titanium component, it is so exceedingly small that its contribution to the molar mass of polymer produced by the catalyst system is not responsible for raising the weight average molecular weight or lowering the melt index of the polymer composition.

The catalyst system components and catalyst systems described herein, including homogeneous and heterogeneous catalyst systems are suitable for producing polymers, specifically polyolefin polymers, using high pressure polymerization, solution polymerization, slurry polymerization, or gas phase polymerization techniques. Methods and apparatus for effecting such polymerization reactions are well known. The catalyst system according to the present invention can be used in similar amounts and under similar conditions known for olefin polymerization catalysts. Catalysts of the present invention in heterogeneous form are particularly useful in slurry and gas phase polymerization processes; the latter typically use heterogeneous catalyst systems exclusively.

For example, polymerization of olefin monomers can be carried out in the gas phase by fluidizing, under polymerization conditions, a bed comprising the target polyolefin powder and particulates of the catalyst composition using a fluidizing gas stream comprising gaseous monomer. In a solution process the polymerization (or copolymerization if more than one monomer is being polymerized) is typically conducted by introducing the monomer(s) into a solution or suspension of the catalyst composition in a liquid hydrocarbon under conditions of temperature and pressure such that the produced polyolefin forms as a solution in the hydrocarbon diluent. In a slurry process, the temperature, pressure and choice of diluent are such that the produced polymer forms as a suspension or slurry in the liquid hydrocarbon diluent.

Typically in slurry processes, the temperature is from approximately 0° C. to just below the temperature at which the polymer becomes soluble in the polymerization medium. In typical gas phase processes, the temperature is from approximately 0° C. to just below the melting point of the polymer. In typical solution processes, the temperature is typically from the temperature at which the polymer is soluble in the reaction medium, up to approximately 275° C. The use of hydrogen during polymerization as a reaction modifier is also known. In some cases hydrogen can increase catalyst activity, function as a chain transfer agent and modify molecular weight. Therefore, its use, if at all, should be consistent with the desired polymer characteristics. In the present invention it is not necessary to contact hydrogen with the active catalyst species in order to conduct a desirable polymerization reaction. In fact, in order to minimize the cost of hydrogen associated with producing a given polymer resin, polymerization processes using catalysts and catalyst systems of the present invention can be conducted in the absence or substantial absence of added hydrogen.

Support or carrier particles useful in the invention are typically fine particle size inorganic or organic compounds in the form of porous, granular or particulate solids having a large surface area. Inorganic materials are preferred, for example, silica, alumina, silica-alumina, zirconia, magnesia (magnesium oxide), magnesium chloride, pumice, talc, kieselguhr, calcium carbonate, calcium sulfate and mixtures thereof. Alternatively or in combination with inorganic materials, particulate organic materials can be used, including for example, polystyrene, polyethylene, polypropylene, polycarbonate and the like.

Suitable inorganic compounds include inorganic oxides, hydroxides or salts; porous oxides are preferred, including for example SiO$_2$, Al$_2$O$_3$, AlPO$_4$, MgO, ZrO$_2$, TiO$_2$, B$_2$O$_3$, CaO, ZnO, BaO, ThO$_2$, V$_2$O$_5$, Cr$_2$O$_3$ and mixtures thereof, including for example SiO$_2$—MgO, SiO$_2$—Al$_2$O$_3$, SiO$_2$—TiO$_2$, SiO$_2$—V$_2$O$_5$, SiO$_2$—Cr$_2$O$_3$ and SiO$_2$—TiO$_2$_MgO. Alternatively, non-oxide particulates can be used, for example, magnesium dichloride. Preferred carriers or supports comprise SiO$_2$ or Al$_2$O$_3$ or SiO$_2$ and Al$_2$O$_3$ as major ingredient(s). The inorganic oxides or mixtures thereof may further comprise carbonates, sulfates, phosphates, nitrates and oxides, including, for example, Na$_2$CO$_3$, K$_2$CO$_3$, CaCO$_3$, MgCO$_3$, Na$_2$SO$_4$, Al$_2$(SO$_4$)$_3$, BaSO$_4$, KNO$_3$, Mg(NO$_3$)$_2$, Al(NO$_3$)$_2$, Li$_2$O, and the like, typically in small or minor amounts.

A support or carrier typically exhibits the following characteristics: a mean particle diameter of about 10 μm (microns) to about 300 μm, preferably about 20 μm to about 200 μm, for example about 30 µm to about 100 µm; a specific surface area of about 10 m²/g to about 1,000 m²/g, preferably about 50 m²/g to about 700 m²/g, for example at least about 100 m²/g; a pore size of at least about 80 angstroms, preferably about 100 angstroms; and a pore volume of about 0.3 cm³/g to about 2.5 cm³/g. In an alternative embodiment and if desirable for the specific catalyst which is to be produced, before use in the processes described herein the support or carrier can be calcined at about 100° C. to about 1,000° C., preferably about 150° C. to about 700° C. As discussed above regarding embodiments in which a titanocene compound is separately supported from the metallocene, particle sizes suitable for separately supporting such titanocene are typically smaller than the particle sizes suitable for supporting the metallocene component. Useful particle sizes and ranges are disclosed above and need not be repeated here, other than to observe that particularly suitable particle sizes will be selected in part based on the polymerization process to be used, as further described hereinbelow.

A preferred support or carrier comprises $SiO_2$. However, the particular support or carrier can be selected by one skilled in the art of polymerization processes, such selection being influenced by the type of process in which the catalyst comprising the aluminoxane is to be used. In particular, the particle size of the preferred $SiO_2$ will depend on whether the catalyst is to be used in a gas-phase polymerization process, a slurry polymerization process, or a solution polymerization process. For example, preferably:

(A) for use in an olefin polymerization process, the $SiO_2$ has a porosity of about 0.2 to about 2.5 cc/g, more preferably about 0.3 to about 2.0 cc/g, and most preferably about 0.5 to about 1.5 cc/g, each being a measure of the mean pore volume as determined by the BET technique using nitrogen as a probe molecule;

(B) for use in a gas-phase olefin polymerization process, the $SiO_2$ has a mean particle diameter from about 20 microns to about 200 microns, more preferably from about 30 microns to about 150 microns and most preferably from about 40 microns to about 100 microns, each as measured by sieve analysis;

(C) for use in a slurry olefin polymerization process, the $SiO_2$ has an mean particle diameter from about 1 micron to about 150 microns, more preferably from about 5 microns to about 100 microns and most preferably from about 20 microns to about 80 microns, each as measured by sieve analysis; and (D) for use in a solution olefin polymerization process, the $SiO_2$ has an mean particle diameter from about 1 micron to about 40 microns, more preferably from about 2 microns to about 30 microns and most preferably from about 3 microns to about 20 microns, each as measured by sieve analysis.

When a support or carrier, such as $SiO_2$, is mixed with aluminoxane or is present in a reaction mixture when aluminoxane is formed, it is generally accepted that a reaction occurs between the $SiO_2$ and the aluminoxane resulting in the aluminoxane being chemically as well as physically bound to the carrier or support. In various embodiments of the present invention the support or carrier, preferably $SiO_2$, can be present during the reaction of the organoaluminum compound and the emulsified water or the support or carrier can be added to the reaction mixture during the course of the reaction or thereafter. If the aluminoxane and carrier are contacted with one another after the aluminoxane is formed, the aluminoxane can be separated from its reaction mixture, including one or more steps to separate the aluminoxane from unreacted components such as the organoaluminum, and to separate the aluminoxane from the solvent(s) employed during the reaction. If the solvent(s) are allowed to remain with the aluminoxane, the carrier or support can be conveniently added directly to the aluminoxane-solvent composition.

The reaction of $SiO_2$ and aluminoxane is carried out in a solvent, preferably an inert solvent, under an inert atmosphere, preferably argon or nitrogen.

If the $SiO_2$ is not present during formation of the aluminoxane, the order of addition of the $SiO_2$ and aluminoxane and solvent is not critical, and aluminoxane can be added to a slurry of $SiO_2$ in the inert solvent or vice versa. It is also preferred that the $SiO_2$ and aluminoxane mixture be stirred throughout the reaction in order to expedite the reaction process by providing and maintaining an intimate contact between the reactants.

The contact or reaction between $SiO_2$ and aluminoxane may be performed at temperatures greater than about 40° C. to about 150° C., preferably about 40° C. to about 140° C., more preferably about 40° C. to about 110° C., alternatively about 40° C. to about 80° C., all preferably at about atmospheric pressure. The time of the reaction between $SiO_2$ and aluminoxane may be from about 15 minutes (min.) to about 24 hours, preferably from about 30 min. to about 12 hours, more preferably from about 1 hour to about 8 hours, and most preferably from about 2 hours to about 4 hours, in accordance with the conditions of temperature and pressure set forth above.

The silica is preferably dehydroxylated prior to reaction with aluminoxane. Dehydroxylation may be accomplished by any suitable means known in the art. A preferred means for the dehydroxylation reaction is heating of a silica powder in a fluidized bed reactor, under conditions well known to those skilled in the art. Most preferably, conditions are chosen such that the silica is substantially completely dehydroxylated prior to reaction with aluminoxane but, to be useful herein it is not required that the silica be completely dehydroxylated.

Preparation of Supported Catalyst

The processes of various embodiments for preparing catalyst systems of the present invention can be carried out at a convenient temperature, including, for example, −15° C. to about 120° C., for example about 100° C. The time and temperature of mixing the components can be varied provided that the desired catalyst composition is achieved and, based on subsequent observation and/or testing, it is suitably stable until it is used, as well as during use.

As described above, catalyst systems comprising supported and unsupported components can be prepared in alternative embodiments representing all of the permutations and combinations that can be understood by a person skilled in the art. Several alternative catalyst component embodiments are listed in the table below under the column entitled "Catalyst System". For example, a catalyst system embodiment can comprise an active (or to be activated) metallocene (MCN) component and a substantially deactivated titanocene (TCN) component supported on a single carrier, or alternatively the components can be supported individually on separate carriers. However, in a polymerization process in which both catalyst components (MCN and TCN) are present on a single support, such a catalyst system can be supplemented with additional individually supported MCN or additional individually supported, substantially deactivated titanocene. Alternatively, a process in which the catalyst system comprises individually supported active (or to be activated) metallocene and substantially deactivated titanocene components can be supplemented with a supported component comprising both an active metallocene and substantially deactivated titanocene. Several such embodiments can be summarized as shown in the following tables. Naturally, if a metallocene pre-catalyst compound is used, such a compound would be activated prior to the catalyst system functioning as an active polymerization catalyst system, such activation being effected, for example prior to contact of the catalyst system with polymerizable monomers or in situ (a "+" mark indicates that the listed component is present on a support):

| Catalyst System* | 1 | 2 | 3 | 4 | 5 | 6 |
|---|---|---|---|---|---|---|
| Supported MCN pre-catalyst compound | + | + | | | | |
| Supported (MCN pre-catalyst compound and active or substantially inactive TCN) | | | + | | | |
| Supported Activated MCN | | | | | + | + |
| Unsupported TCN (active or substantially inactive)** | + | | | + | | |
| Supported TCN (active or substantially inactive) | | | + | | | + |
| Supported (MCN and active or substantially inactive TCN) | | | | | | + |

*MCN = metallocene; TCN = titanocene
**Active TCN, whether unsupported or supported, when present, is substantially deactivated as described herein for use of the TCN component of the catalyst system for producing polymer.

Further exemplary alternative embodiments (footnotes apply as above):

| Catalyst System | 7 | 8 | 9 | 10 | 11 | 12 |
|---|---|---|---|---|---|---|
| Catalyst system 1 from above table | + | + | | | | |
| Catalyst system 2 from above table | | | + | + | | |
| Catalyst system 6 from above table | | | | | + | + |
| Supported MCN pre-catalyst compound | | | | | | |
| Supported Activated MCN | + | | + | | + | |
| Supported TCN (active or substantially inactive) | | + | | + | | + |

Catalysts of the present invention are useful for carrying out polymerization of monomers. Suitable polymerizable monomers include unsaturated monomers, typically ethylenically unsaturated or olefinic monomers, acetylenically unsaturated monomers, conjugated and non-conjugated dienes and polyenes. The terms olefins and olefinic monomers include olefins, alpha-olefins, diolefins, styrenic monomers (including styrene, alkyl substituted styrene and other polymerizable functionalized styrene derivatives), cyclic olefins, and mixtures thereof. Generally, monomers suitable for use in producing a polymerized product by use of the catalyst systems of the invention disclosed herein include any unsaturated monomers capable of polymerization by the catalysts described herein and comprise at least one member selected from the group consisting of alpha-olefins having from 2 to 2,000, preferably from 2 to 20, and more preferably from 2 to 8 carbon atoms and combinations of two or more of such alpha-olefins, non-conjugated diolefins, acetylenically unsaturated monomers, olefinically unsaturated aromatic monomers, and unsaturated $C_{20}$ to $C_{200}$ macromonomers. Generally an alpha-olefin can be represented by the formula $CH_2$=$CHR^x$, wherein $R^x$ is n-alkyl or branched alkyl, preferably n-alkyl. A linear alpha-olefin is a compound of the same formula wherein $R^x$ is n-alkyl. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene or combinations thereof, as well as long chain terminally unsaturated (e.g., vinyl, vinylidene, etc.) oligomeric or polymeric reaction products formed during the polymerization and $C_{10-30}$ alpha-olefins specifically added to the reaction mixture in order to produce relatively long chain branches in the resulting polymers. Particularly useful commercial polymers are based on the polymerization of ethylene; propylene; 1-butene, 4-methyl-pentene-1,1-hexene, 1-octene, and combinations of ethylene and/or propylene with one or more of such other alpha-olefins. The most preferred is ethylene alone or with other alpha-olefins, e.g., $C_3$ to $C_{20}$ alpha-olefins, for example, ethylene plus 1-hexene; and ethylene plus propylene, with or without a polydiene or nonconjugated diene such as 1,4-hexadiene, norbornadiene, dicyclopentadiene, ethylidene norbornene, 1,7-octadiene and other strained geometry olefins. Other preferred monomers include styrene, halo- or alkyl substituted styrenes, tetrafluoroethylene, and vinylcyclobutene. Mixtures of the above-mentioned monomers may also be employed. Additionally, with use of a suitable catalyst, the polymerization monomers may include functionalized ethylenically unsaturated monomers wherein the functional group is selected from hydroxyl, carboxylic acid, carboxylic acid esters, acetates, ethers, amides, amines and the like. In a further embodiment, catalysts and catalyst systems of the present invention are suitable for copolymerization of ethylene (as the major component) and alpha-olefin (as minor component, for example about 1 mol % to about 15 mol %, preferably about 1 mol % to about 10 mol %) selected from alpha-olefins comprising 4 to 12 carbon atoms.

In a further embodiment, supported catalysts according to the present invention can be suitably used for the homopolymerization of ethylene and, in particular, for the preparation of high density polyethylene (HDPE). Moreover, supported catalysts of the invention can also be suitably used for the copolymerization of ethylene with olefin comonomers and, in particular for the preparation of linear low density and medium density polyethylene (LLDPE). LLDPE and HDPE copolymers produced typically have a content of ethylene units generally comprised between 80 and 99 mol %. Their density is generally comprised between 0.87 and 0.95 cc/g and they are typically characterized by a uniform distribution of the comonomeric units within the polymer chain. Still another suitable use of supported catalysts of the invention is for the homo- or co-polymerization of propylene and alpha-olefins such as, for example, 1-butene.

Suitable polymerization processes include slurry polymerization, liquid bulk polymerization, gas phase polymerization, solution polymerization, etc. Solvents useful in slurry polymerization processes may be saturated aliphatic hydrocarbons or aromatic hydrocarbons, and include isobutane, propane, hexane, heptane, cyclohexane and toluene. The polymerization can be carried out under ambient or high pressure and the polymerization pressure is typically from ambient pressure to about 10 MPa, for example, about 0.2 to about 5 MPa. Suitable polymerization temperatures are typically about −78° C. to about +275° C.; such as about +20° C. to about +150° C. The amount of the supported catalyst typically used during such polymerizations is about $10^{-7}$ to about $10^{-2}$ mol, based on the amount of the metal atom in the single site catalyst, for example, a metallocene. The polymerization process may be conducted continuously or in batch. Aside from the molar ratio of active polymerization catalyst to inactive or substantially inactive polymerization titanocene as taught herein, polymer molecular weight can be controlled by known methods during polymerization, such as by the selection of the temperature and pressure, and introduction of hydrogen into the polymerization system.

Supported catalysts prepared according to the processes of the invention can be used individually or in combinations of more than one for the polymerization of olefins, as well as in combination with metal alkyl compounds to further increase the activity or reduce or eliminate catalyst poisons. Particularly preferred metal alkyl compounds include triethyl aluminum and triisobutyl aluminum.

Supported, active catalysts comprising one or more metallocene compound, one or more activator or co-catalyst compound and one or more deactivated or substantially deactivated titanocene compound as previously described can be prepared according to methods generally known in the art for preparing supported metallocene catalysts according to prior art methods. For example, U.S. Pat. No. 5,880,056 (T. Tsutsui et al.), incorporated herein to the extent permitted, discloses preparation of a supported catalyst by contacting an aluminoxane and/or a transition metal compound with a fine particle carrier in an inert solvent. It is also noted that some prior art catalysts and polymerization methods require that an active metallocene compound, including an active titanocene compound, be contacted with a hydrogenating agent such as hydrogen prior to use of the catalyst in a polymerization process (see, for example, EP 1605000 A1). In contrast, the catalysts and catalyst compositions of the present invention do not require and preferably do not use such a process step.

Typically, during a polymerization process the reaction mixture comprising one or more monomers is contacted with a catalyst composition, suitably activated prior to or in the course of the polymerization process according to suitable polymerization conditions. A homogeneous polymerization process is characterized by use of elevated temperatures and pressures. If desired, hydrogen may be employed as a chain transfer agent for molecular weight control according to known techniques. As in other metallocene polymerizations generally, it is highly desirable that the monomers and solvents employed for homogeneous polymerization be of sufficiently high purity that catalyst deactivation does not occur. Any suitable technique for monomer purification such as devolatilization at reduced pressure, contacting with molecular sieves or high surface area alumina, contacting with a suitable reactant for an expected contaminant or catalyst poison, or a combination of the foregoing processes may be employed.

In one embodiment, the polymerization is conducted as a continuous polymerization, preferably a continuous, solution polymerization, in which catalyst components, monomers, and optionally solvent, adjuvants, scavengers, and polymerization aids are continuously supplied to the reaction zone and polymer product continuously removed therefrom. Within the scope of the terms "continuous" and "continuously" as used in this context are those processes in which there are intermittent additions of reactants and removal of products at small regular or irregular intervals so that, over time, the overall process is substantially continuous.

For a solution polymerization process it is desirable to employ a solution or homogeneous dispersion of the catalyst or catalyst components in a liquid diluent in which the polymer is soluble or substantially under the polymerization conditions employed. One such process utilizing an extremely fine silica or similar dispersing agent to produce a homogeneous catalyst dispersion where either the metal complex or the cocatalyst is only poorly soluble is disclosed in U.S. Pat. No. 5,783,512. A suitable solution polymerization process, especially a continuous solution process is preferably carried out at a temperature between about 80° C. and 250° C., more preferably between about 100° C. and 210° C., and most preferably between about 110° C. and 210° C. A high pressure process is usually carried out at temperatures from about 100° C. to about 400° C. and at pressures above about 500 bar (50 MPa). A slurry process typically uses an inert hydrocarbon diluent and temperatures of from about 0° C. up to a temperature just below the temperature at which the resulting polymer becomes substantially soluble in the inert polymerization medium. Preferred temperatures in a slurry polymerization process are from about 30° C., preferably from about 60° C. up to about 115° C., preferably up to about 100° C. Pressures typically range from atmospheric (100 kPa) to about 500 psi (3.4 MPa).

In all of the foregoing processes, continuous or substantially continuous polymerization conditions are preferably employed. The use of such polymerization conditions, especially continuous, solution polymerization processes employing two or more polymerization catalyst species, for example at least one active species and one that has been deactivated, allows the use of elevated reactor temperatures which results in the economical production of desirable polymers or copolymers in high yields and efficiencies. As is known in the art, both homogeneous and plug-flow type reaction conditions may be employed.

Both the active catalyst or pre-catalyst and the deactivated component may be prepared as a homogeneous composition by addition of the requisite metal complexes to a solvent, for example a solvent in which the polymerization will be conducted or in a diluent compatible with the ultimate reaction mixture. Diluents suitable for use in homogeneous polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene. Chloronaphthalene, ortho-dichlorobenzene, tetrahydro-naphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, especially those that can interfere with the catalyst or polymerization or by other suitable means. Polymerization can also be performed using bulk monomer, such as propylene, as the diluent. In such a system, preferably a minor amount of a solvent such as toluene is incorporated to solubilize the metallocene component in the monomer.

A desired co-catalyst or catalyst activator and the deactivated titanium component may be combined with the catalyst composition, independently or in combination, either prior to, simultaneously with, or after combination with the monomers to be polymerized and any additional reaction diluent.

At all times, the individual solvents, diluents, additives, etc., as well as the pre-catalyst component, deactivated or to-be-deactivated titanium compound or overall active catalyst composition must be protected from oxygen and moisture. Therefore, all such components must be prepared and stored in an oxygen and moisture-free atmosphere, preferably under or in combination with a dry, inert gas such as nitrogen or argon.

Without limiting in any way the scope of the invention, one means for carrying out a homogeneous polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization.

Catalyst components as described above, individually or in combination, along with co-catalyst if the pre-catalyst has not been activated are continuously or intermittently introduced in the reactor liquid phase or any recycled portion thereof. The reactor temperature and pressure may be controlled by adjusting the solvent/monomer ratio, the catalyst addition rate, as well as by cooling or heating coils, jackets or both. The polymerization rate can typically be controlled by the rate of catalyst addition. Where an ethylene copolymer is being produced, the ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or, if used, a chain transfer agent, as is well known in the art. Upon exiting the reactor, the effluent is contacted with a catalyst kill agent such as water, steam or a suitable alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process a typical mean residence time of the catalyst and polymer in the reactor is generally from about 5 minutes to about 8 hours, and preferably from about 10 minutes to about 6 hours.

Alternatively, a solution or homogeneous polymerization may be carried out in a continuous loop reactor with or without a monomer, or catalyst component(s) gradient between differing regions thereof, optionally accompanied by separated addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are disclosed in U.S. Pat. Nos. 5,977,251, 6,319,989 and 6,683,149.

The polymer products produced by the catalysts, catalyst systems and processes, including polymerization processes using the catalysts and catalyst systems of the present invention typically exhibit a narrow molecular weight distribution, typically narrower than polymers and copolymers produced using analogous catalysts and catalyst systems but in the absence of a deactivated or substantially deactivated titanocene compound. Polymer molecular weight distribution (MWD) is a measure of the range of molecular weights within a given copolymer sample. It is typically characterized in terms of at least one of the ratios of weight-average to number-average molecular weight, Mw/Mn, and z-average to weight-average molecular weight, Mz/Mw, where:

$Mw=(\Sigma N_i M_i^2)/\Sigma N_i M_i$ $Mn=(\Sigma N_i M_i)/\Sigma N_i$ $Mz=(\Sigma N_i M_i^3)/\Sigma N_i M_i^2$ wherein $N_i$ is the number of molecules of molecular weight $M_i$.

Molecular weight and molecular weight distribution can be measured by techniques well known in the art, for example, high-temperature size exclusion chromatography/gel permeation chromatography (SEC/GPC). For example, one method uses a Polymer Laboratories, PL-220, gel permeation chromatograph (GPC) at 150° C. equipped with a Precision in-line two-angle light scattering detector (LS), Refractive Index detector (RI) and Differential Viscometer (DV). The system can usefully be operated at 150° C. with 1,2,4-trichlorobenzene as the mobile phase. Three PLgel-20 µm mixed-ALS (Polymer Laboratories) crosslinked polystyrene gel columns are conveniently used. This technique is discussed in "Liquid Chromatography of Polymers and Related Materials III", J. Cazes editor, Marcel Dekker, 1981, p. 207 (incorporated herein by reference to the extent permitted). Typically, no corrections for column spreading are needed since data on generally accepted standards, e.g., National Bureau of Standards Polyethene 1475 (NIST) and anionically produced hydrogenated polyisoprene (NIST 1844, polypropylene sample or an alternating ethylene-propylene copolymer) demonstrate that such corrections of Mw/Mn or Mz/Mw are less than 0.05 unit. Mz, Mw and Mn are directly calculated from RI (concentration detection) and hydrodynamic diameter from LS (light scattering hydrodynamic diameter). The numerical analyses can be performed using a commercially available computer software program, known as PL Cirrus. The methods for determining such molecular characteristics are well known in the polymer art. The equipment and polymer reference standards used in making such measurements can vary, e.g., column types, polystyrene or polymethacrylate reference standards, diluents, temperature, chemical nature and molecular conformation of samples. Similarly, molecular weight values can be calculated using so-called universal calibration theory (based on RI and viscometer detectors) or absolute molecular weights (based on multi-angle laser light scattering (Malls) LS and Zimm plot) including corrections for branching using measured polymer intrinsic viscosity and hydrodynamic volume/radius of gyration diameters. However, comparisons of different polymers can be made provided that a consistent set of test conditions and assumptions are used which are appropriate for the polymers being tested in order to determine such molecular weight values.

Use of the catalyst systems taught herein result in both polymer and process improvements, including: polymers having desirably narrow molecular weight distributions, typically exhibiting ratios of Mw/Mn of greater than about 1.75 or about 2, to less than 3; or less than 2.8; or less than 2.6; or less than 2.5, 2.4, 2.3, 2.2 or 2.1. For example, about 1.75 to less than 3; alternatively about 1.8 to about 2.9; or about 1.9 to about 2.8; or about 2.0 to about 2.7; or about 2.0 to about 2.6; or about 2.1 to about 2.5, including each of the values and ranges between about 1.75 to less than 3 in increments of 0.1. Particularly useful polymers exhibit molecular weight distributions, Mw/Mn, of about 2.0 to about 2.6, for example about 2.4. Furthermore, the catalysts or catalyst systems of the present invention also exhibit high catalyst activity.

Polymers produced using the catalyst systems of the present invention exhibit other desirable polymer properties, including levels of melt flow or melt index (MI) such that the polymers are particularly suitable for film forming and exhibit desirably high levels of film strength, etc. In an embodiment, useful polymers, for example polyethylene, particularly linear low density polyethylene (LLDPE) produced using catalysts or catalyst systems of the type disclosed herein exhibit MI values equal to or less than about 1 (in other words, 1 gram per 10 minutes (g/10 min); alternatively, equal to or less than about 0.5; alternatively equal to or less than about 0.1; or about 0.1 to about 1; or about 0.1 to about 0.5 or about 0.5 to about 1. Such useful polymers also exhibit values of MFR at approximately a 1 melt index (calculated as the ratio of HLMI/MI) of about 14 to about 30; or about 15 to about 25; or about 16 to about 20.

The polymers, particularly the alphaolefin based polymers, produced according to the catalyst system of this invention have utility according to the molecular weight, comonomer incorporation level (where included), polydispersity index (PDI) or molecular weight distribution (MWD, or Mw/Mn), etc. Thus, typical applications include films, fibers, molded thermoplastics by any of the known means of melt processing and subsequent extrusion and/or thermoforming. In such applications incorporation of additives such as processing aids, stabilizers, pigments, fillers and other polymer components as are conventionally known can be utilized. Specific examples include high density polyethylene and isotactic polypropylene film, including oriented forms of film and those modified by the incorporation of resins or other additives.

The following examples are provided as specific illustrations of embodiments of the claimed invention. It should be understood, however, that the invention is not limited to the specific details set forth in the examples. It should be understood, however, that the invention is not limited to the specific details set forth in the examples. All parts and percentages in the examples, as well as in the specification, are by weight unless otherwise specified.

Furthermore, any range of numbers recited in the specification hereinabove or in the paragraphs referring to various aspects of the invention, as well as in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . . 50%, 51%, 52% . . . . 95%, 96%, 97%, 98%, 99%, or 100%. Moreover, any numerical range represented by any two values of R, as calculated above is also specifically disclosed.

EXAMPLES

The following are the general procedures used in the examples described below. Unless otherwise specified, all operations were run under inert atmosphere such as in a glove box.

Bench scale polymerization was carried out in a 2 L ZipperClave® reactor (Autoclave Engineers, Erie, Pa.). The reactor was remotely controlled using a desktop computer running IFIX version 4.0 software program. Materials were handled and preloaded in a Vacuum Atmosphere glove box under an atmosphere of argon. The reactor body was prepared by preheating the unit to the desired internal temperature. Temperature control of the reactor was maintained during the run within approximately 1° C. of the setpoint using a temperature controlled skid designed by Thomas Ladisch Associates of Gilbertsville, Pa. and an associated steam generator. In the following examples, unless otherwise indicated, the term "catalyst charge" refers to the amount of supported catalyst that has been dried prior to it being charged to the catalyst charge vessel.

The following procedure is generally used to start a polymerization test: a sample cylinder is prepared within a glovebox (also referred to as a dry box) and is charged with all the necessary components: the catalyst, a poison scavenger, such as triisobutylaluminum and solvent, such as heptane, to facilitate transfer of these components into the reactor. Using an external supply of argon to pre-purge all piping connections, this mixture is removed from the dry box and is connected to an injection port on the reactor. The contents of the cylinder are then transferred into an autoclave reactor by flushing it in with the polymerization solvent, such as isobutane. The reactor's marine type impellor is started and the computer program is initiated to control the pressure and temperature at the designated setpoints for the polymerization, the ethylene being fed on demand by a mass-flow controller. A typical polymerization run can be conducted over a period of about one hour. When the polymerization test is finished, the ethylene automatically shuts off and the Temperature Control Skid goes into cooling mode to bring the reactor temperature down to room temperature. Once the internal temperature of the reactor has dropped below 50° C. the stirrer is stopped and all gases are vented from the reactor unit. The reactor body is then opened to remove the polyolefin product. The internal reactor walls and stirrer are then cleaned. The reactor unit is resealed and pressurized with argon gas to ensure no leaks are present in the system. Once the unit has passed this pressure test the argon is vented, the reactor is again heated to above 100° C. and purged with argon to prepare for the next polymerization test cycle.

The polymers were characterized using the following tests: Melt Index (MI) and high load melt index (HLMI) measured according to ASTM method D1238-04; Melt flow ratio, defined as the ratio of HLMI/MI; molecular weight values measured using high temperature size exclusion chromatography/gel permeation chromatography (SEC/GPC) as described above.

Examples 1-11

For the examples, various stock solutions of $Cp_2TiCl_2$ and tri-isobutyl aluminum (TIBA) at different ratios of Ti:Al are charged to a catalyst charge apparatus containing dried $(n-BuCp)_2ZrCl_2/MAO/SiO_2$ metallocene (MCN) olefin polymerization catalyst along with 0.5 mL TIBA as a reactor scavenger. All runs were conducted at a total pressure of 450 psi, at 80° C. in an isobutane slurry. A deactivated titanocene stock solution was typically prepared in a glove box under an atmosphere of argon as follows. For example, to an oven dried 50 mL volumetric flask was charged 0.544 grams of (red solid) $Cp_2TiCl_2$ followed by 42 mL of 25.5 wt % triisobutylaluminum in heptane. Addition of the clear colorless triisobutylaluminum solution to the red solid afforded immediately a deep purple violet colored solution. The flask was swirled and left for approximately 30 minutes before using.

Polymerizations according to Example 1 were conducted using varying molar ratios of titanium in the polymerization-deactivated titanocene compound to zirconium in the active zirconocene (Ti/Zr). FIG. 1 illustrates the significant effect of the presence of inactive titanocene compound on the polymer produced. It can be seen that the value of HLMI decreases sharply as the molar ratio of Ti/Zr increases from "zero" (no inactivated titanocene present) to 10.0 using as a catalyst bis(indenyl)zirconium dichloride or $(n-BuCp)_2ZrCl_2$ activated with methylalumoxane in the polymerization of ethylene conducted at 90° C. and 450 psi total pressure.

Typical preparation of $(n-BuCp)_2ZrCl_2$-MAO—$SiO_2$ polymerization catalyst.

Under a moisture-free, inert atmosphere 440 g of 30 wt. % MAO in toluene, 211 grams of dried, de-gassed toluene and 4.5 g of $(n-BuCp)_2ZrCl_2$ is charged to a round bottom glass flask. The mixture is stirred for 1 hour, after which it is charged to 494 g of Grace 2468 Sylopol $SiO_2$, previously calcined at 600° C. for 4 hours. The mixture is shaken and dried under vacuum. Inductively coupled plasma atomic emission spectroscopy is used to determine the Zr concentration present in the catalyst (wt. %).

TABLE 1

| | Example: | | | | |
|---|---|---|---|---|---|
| | 1 | 2 | 3 | 4 | 5 |
| Polymerization catalyst* | MCN | MCN | MCN | MCN | MCN |
| Catalyst Charge (mgs) | 50 | 63 | 48 | 49 | 56 |
| % Zr in Cat. (wt %) | 0.14 | 0.14 | 0.14 | 0.14 | 0.14 |
| Zr in Cat. Charge (mmole) | 7.67E−04 | 9.67E−04 | 7.36E−04 | 7.52E−04 | 8.59E−04 |
| added TIBAL* (mL) | 0.5 | 0.5 | 0.5 | 0.5 | 0.5 |
| added Ti sol'n. (mL) | 0 | 0 | 0.1 | 0.05 | 0.01 |
| stock sol'n Ti conc. (mol/L) | 0.00E+00 | 0.00E+00 | 5.20E−02 | 5.20E−02 | 5.20E−02 |
| Ti added to cat. (mmol) | 0.00E+00 | 0.00E+00 | 5.20E−03 | 2.60E−03 | 5.20E−04 |
| run duration (min.) | 60 | 60 | 60 | 60 | 60 |
| polymer yield (g) | 68 | 73 | 66 | 64 | 69 |
| cat. productivity (g/g) | 1366 | 1159 | 1365 | 1308 | 1236 |
| cat. activity (g/g/hr) | 1366 | 1159 | 1365 | 1308 | 1236 |
| MCN* activity (g/g/h) | 220132 | 186730 | 219904 | 210812 | 199137 |
| MCN activity (g/mm/h) | 89028 | 75519 | 88936 | 85259 | 80537 |
| Ti:Zr molar ratio | 0.000 | 0.000 | 7.061 | 3.458 | 0.605 |
| MI | 0.55 | 0.58 | 0.1 | 0 | 0.23 |
| HLMI | 9.01 | 9.42 | 1.84 | 0.87 | 3.95 |
| HMLI/MI | 16.4 | 16.2 | 18.4 | NA | 17.2 |
| Mn/1000 | 77.670 | 74.26 | 101.81 | 129.45 | — |
| Mw/1000 | 161.720 | 156.45 | 242.04 | 312.03 | — |
| Mw/Mn | 2.11 | 2.11 | 2.38 | 2.4 | |

| | Example | | | | | |
|---|---|---|---|---|---|---|
| | 6 | 7 | 8 | 9 | 10 | 11 |
| Polymerization catalyst‡ | MCN | MCN | MCN | MCN | MCN | NONE |
| Catalyst Charge (mgs) | 50 | 50 | 50 | 52 | 54 | 0 |
| % Zr in Catalyst (wt %) | 0.14 | 0.14 | 0.14 | 0.14 | 0.14 | 0 |
| Zr in Cat. Charge (mmole) | 7.67E−04 | 7.67E−04 | 7.67E−04 | 7.98E−04 | 8.29E−04 | 0.00E+00 |
| added TIBAL* (mL) | 0.5 | 0.5 | 0.5 | 0.5 | 0.5 | 0.5 |
| added Ti sol'n. (mL) | 1 | 1 | 2 | 0.1 | 0.75 | 1 |
| stock sol'n Ti conc. (mol/L) | 7.68E−05 | 7.68E−03 | 7.68E−05 | 7.68E−03 | 7.68E−05 | 5.20E−02 |
| Ti added to cat. (mmol) | 7.68E−05 | 7.68E−03 | 0.000154 | 0.000768 | 5.76E−05 | 5.20E−02 |
| run duration (min.) | 60 | 68 | 60 | 60 | 60 | 60 |
| polymer yield (gms) | 55 | 35 | 66.2 | 74.6 | 67 | 0 |
| cat. productivity (g/g) | 1108 | 702 | 1324 | 1435 | 1241 | 0 |
| cat. activity g/g/hr | 1108 | 619 | 1324 | 1435 | 1241 | 0 |
| MCN activity g/g/h | 178555 | 99819 | 213364 | 231190 | 199947 | 0 |
| MCN activity (g/mm/h) | 72213 | 40370 | 86291 | 93500 | 80864 | |
| Ti:Zr molar ratio | 0.100 | 10.011 | 0.200 | 0.963 | 0.070 | NA |
| MI | 0.37 | 0 | 0.33 | 0.16 | 0.39 | |
| HLMI | 5.96 | 0.81 | 5.84 | 2.86 | 6.75 | |

TABLE 1-continued

| HMLI/MI | 16.1 | NA | 17.7 | 17.9 | 17.3 |
| Mn/1000 | 72.44 | 130.27 | — | 100.46 | — | — |
| Mw/1000 | 175.71 | 299.13 | — | 190.8 | — | — |
| Mw/Mn | 2.43 | 2.30 | | 1.9 | | |

*Abbreviations:
MCN = metallocene catalyst, the same metallocene catalyst was used in each run, $(n\text{-BuCp})_2\text{ZrCl}_2/\text{MAO}/\text{SiO}_2$;
TIBAL = tri-isobutyl aluminum scavenger;
MI = melt index;
HLMI = high load melt index;
Mn = number average molecular weight;
Mw = weight average molecular weight.

FIG. 1 presents HLMI data from the above examples plotted against the Ti/Zr molar ratio. It illustrates the significant effect of the presence of inactive titanocene compound on the polymer produced. It can be seen that the value of HLMI decreases sharply as the molar ratio of Ti/Zr increases from "zero" (no inactivated titanocene present) to 10.0 using as a catalyst bis(indenyl)zirconium dichloride or $(n\text{-BuCp})_2\text{ZrCl}_2$ activated with methylalumoxane in the polymerization of ethylene conducted at 90° C. and 450 psi total pressure.

Examples 12-14

In these examples, three catalysts were prepared. In contrast to Table 1, the Ti-component was incorporated during the metallocene/MAO impregnation of the SiO2, followed by removal of the solvent from the finished catalyst.

The catalyst used in Comparative Example 12 was bis(indenyl)zirconium dichloride $((\text{Ind})_2\text{ZrCl}_2)$ and MAO supported on silica; no inactivated Ti component was added. Example 13 was run in order to demonstrate that the inactivated titanocene used in Example 14 was incapable of effecting polymerization under the conditions of the examples. The inventive catalyst of Example 14 was prepared similarly, except that after mixing the $(\text{Ind})_2\text{ZrCl}_2$ plus MAO solution for about 1 hour, a previously prepared stock solution obtained from treatment of $\text{Cp}_2\text{TiCl}_2$ with 17 molar equivalents of TIBAL was added to the $(\text{Ind})_2\text{ZrCl}_2/\text{MAO}$ solution. The resulting Zr/Ti-containing solution or mixture was briefly stirred and then transferred via canula to dehydrated silica gel (Sylopol 2404). The mixture was shaken until a free flowing solid was obtained and residual solvent was removed via vacuum. Ethylene polymerization runs were conducted in isobutane at 90° C. and at a total pressure of 450 psi, similar to the examples in Table 1.

TABLE 2

| | Example | | |
| --- | --- | --- | --- |
| | 12 | 13 | 14 |
| catalyst ID | Comparative | Reference | Invention |
| catalyst components | $(\text{Ind})_2\text{ZrCl}_2/$ MAO/SiO2 | $\text{Cp}_2\text{TiCl}_2/\text{TIBA}/$ MAO/SiO$_2$ | $(\text{Ind})_2\text{ZrCl}_2/\text{MAO}$ + $\text{Cp}_2\text{TiCl}_2/\text{TIBA}/\text{SiO}_2$ |
| catalyst charge (mgs) | 50 | 50 | 57 |
| % Zr in cat. charge (wt %) | 0.5 | 0 | 0.5 |
| Zr in cat. charge (mmole) | 0.0027 | 0.0000 | 0.0031 |
| additional TIBAL added as scavenger (mL) | 0.5 | 0.5 | 0.5 |
| added Ti sol' n. (mL) | 0 | 0.5 | 0.5 |
| Ti conc. (mol/L) | 0.052 | 0.052 | 0.052 |
| Ti added (mmol) | 0 | 0.026 | 0.026 |
| run duration (min.) | 60 | 41 | 60 |
| polymer yield (gms) | 63 | 0 | 49 |
| cat. productivity (g/g) | 1262 | 0 | 860 |
| cat. activity (g/g/h) | 1262 | 0 | 860 |
| MCN activity (g/g/h) | 58671 | NA | 39966 |
| Ti:Zr molar ratio | 0.00 | NA | 0.10 |
| MI | 0.19 | NA | 0 |
| HLMI | 3.54 | NA | 1.57 |
| HLMI/MI | 18.56 | NA | NA |
| Mn/1000 | 105 | NA | 118 |
| Mw/1000 | 290 | NA | 301 |
| Mw/Mn | 2.76 | NA | 2.55 |

As can be seen from the results in Table 1, as the molar ratio of Ti:Zr increases, the melt index or high load melt index decreases without significantly increasing the molecular weight distribution. Likewise, as can be seen from the results in Table 2, where the polymerizing zirconocene catalyst is based on $\text{Ind}_2\text{Zr(Cl)}_2$ instead of $(n\text{-BuCp})_2\text{Zr(Cl)}_2$, and the components are dried in the preparation, the melt index again decreases as the molar ratio of Ti:Zr increases. Also, the decrease in melt index is achieved without increasing the molecular weight distribution. This is a significant result, e.g. in making m-LLDPE, as it is difficult, using either of the high activity zirconocene catalysts of these examples by themselves, to produce a polymer having a desirably low melt index, for example about 1 or lower, and a density of approximately 0.918 g/mL under desirable or practical polymerization conditions. In particular, it is expected that common, low cost, high activity metallocene catalysts such as $(n\text{-BuCp})_2\text{Zr} (\text{Cl})_2$ or $\text{Ind}_2\text{Zr(Cl)}_2$ under typical polymerization conditions will produce a m-LLDPE having a 4 or 3 melt index at a 0.918 density. While lower melt index values using such catalysts might be achieved by conducting the polymerization at lower reactor temperature, lower temperature has a negative effect on production rate and other operating variables. Thus, the ability to produce a low density, low melt index using the present invention represents a significant advance.

Examples 15-16

These examples represent bulk propylene polymerizations using rac-bis(indenyl)ethan-1,2-diyl-zirconium dichloride/SiO$_2$/MAO supported catalyst. The catalyst was prepared as follows: $\text{Et}(\text{Ind})_2\text{Cl}_2$ (58 mg, 0.138 mmol) was dissolved in 9 mL of toluene and mixed with 1.5 mL of 30 wt % MAO in toluene (Albemarle) for 0.5 hours. The resulting solution was then added to 5 g of SiO$_2$/MAO (17 wt % Al) in toluene (9 mL) and stirred for 1.5 hours. The solid catalyst was collected on a closed frit filter, washed with pentane (3×15 mL), and dried under vacuum. The yield was 4.8 g of an orange powder containing 0.19 wt % Zr. The $Cp_2TiCl_2$/TIBAL deactivated premix was prepared as follows: 0.8 mg of $Cp_2TiCl_2$ was stirred with 0.8 mL of 25 wt % TIBAL in heptane for 1 hour prior to use. Polymerization conditions: 1050 mL propylene, 0.8 mL TIBAL (25 wt % solution in heptane), 70° C., 1 hour. The polymerization procedure was generally as described above for the ethylene polymerizations. The results are summarized in Table 3 below.

TABLE 3

| | Example* | |
|---|---|---|
| | 15 | 16 |
| Catalyst charge, mg | 25.4 | 25.0 |
| $Cp_2TiCl_2$/TIBAL, premix, mL | 0 | 0.125 |
| isotactic PP Yield, g | 93.1 | 12.1 |
| Catalyst Activity, Kg/g-Cat-h | 3.67 | 0.48 |
| ABD**, g/mL | 0.44 | — |
| Mw/1000 | 24.7 | 37.8 |
| Mw/Mn | 2.14 | 1.90 |

*rac-bis (Indenyl) ethan-1,2-diyl-zirconium dichloride **ABD = Apparent Bulk Density; weight of the polymerized polymer powder or particles (sometimes referred to as fluff or flake), for a given volume.

It can be seen from the above results that the catalyst composition of the present invention produced an isotactic polypropylene polymer having a significantly higher molecular weight and a narrower molecular weight distribution. The activity of the titanium containing catalyst composition was lower under the conditions of these experiments. It is noted that higher values of ABD are preferred for both polyethylene and polypropylene.

Examples 17-20

The effect of hydrogen addition on polymer properties is shown in Examples 17-20, summarized in Table 4 and using a catalyst composition of the present invention for the copolymerization of ethylene and hexene-1.

TABLE 4*

| | Example | | | |
|---|---|---|---|---|
| | 17 | 18 | 19 | 20 |
| Catalyst Charge (mg) | 48.5 | 45.5 | 51.1 | 50.0 |
| Zr in Catalyst (wt. %) | 0.13 | 0.13 | 0.13 | 0.13 |
| Zr in catalyst charge (mmole) | 0.0007 | 0.0006 | 0.0007 | 0.0007 |
| Titanocene | $Cp_2TiCl_2$ | $Cp_2TiCl_2$ | $Cp_2TiCl_2$ | $Cp_2TiCl_2$ |
| $H_2$ added to mix tank (psi) | 0 | 10 | 5 | 2 |
| Total mix tank $H_2 + C_2$ (psi) | — | 740 | 600 | 600 |
| $H_2:C_2$ molar ratio | 0 | 0.014 | 0.008 | 0.003 |
| Polymer Yield (g) | 56.24 | 58.31 | 86.75 | 96.35 |

TABLE 4*-continued

| | Example | | | |
|---|---|---|---|---|
| | 17 | 18 | 19 | 20 |
| Catalyst Productivity (g/g) | 1160 | 1282 | 1698 | 1927 |
| Catalyst Activity (g/g/hr) | 1160 | 1282 | 1698 | 1927 |
| Metallocene Activity (g/g/hr) | 201193 | 222352 | 294550 | 334343 |
| Metallocene Activity (g/mm/h) | 81389 | 89948 | 119154 | 135252 |
| Ti/Zr Molar ratio | 0.068 | 0.072 | 0.064 | 0.066 |
| MI | 0.54 | 24.17 | 9.34 | 1.55 |
| HLMI | 10.1 | 395.19 | 150 | 23.86 |
| HMLI/MI (Shear) | 18.7 | 16.4 | 16.1 | 15.4 |
| Polymer density (g/ml) | 0.9169 | 0.9209 | 0.9190 | 0.9146 |
| Mn/1000 | 63.75 | 30.38 | 49.00 | 58.58 |
| Mw/1000 | 138.58 | 63.49 | 81.27 | 116.65 |
| Mw/Mn | 2.2 | 2.1 | 1.7 | 2.0 |
| Mz/1000 | 239.12 | 115.17 | 124.26 | 184.01 |

*Catalyst for all runs: $(nBuCp)_2ZrCl_2$/ $MAO/SiO_2$ 1-hexene co-monomer, 75 mL 1 M toluene; 0.13 wt% Zr in catalyst; titanocene used: $Cp_2TiCl_2$, 0.006 mL titanocene solution added to metallocene charge vessel; Ti concentration=7.79E−03 (mol/L); Ti added 4.68E−05 (mmol); TIBAL (0.5 mL, 1 molar toluene solution) added as scavenger; additional 10 ml dry heptane added to each metallocene charge vessel; pressure setpoint=350 psi; run temperature=80 ° C.; run duration=60 minutes.

Figure 2:
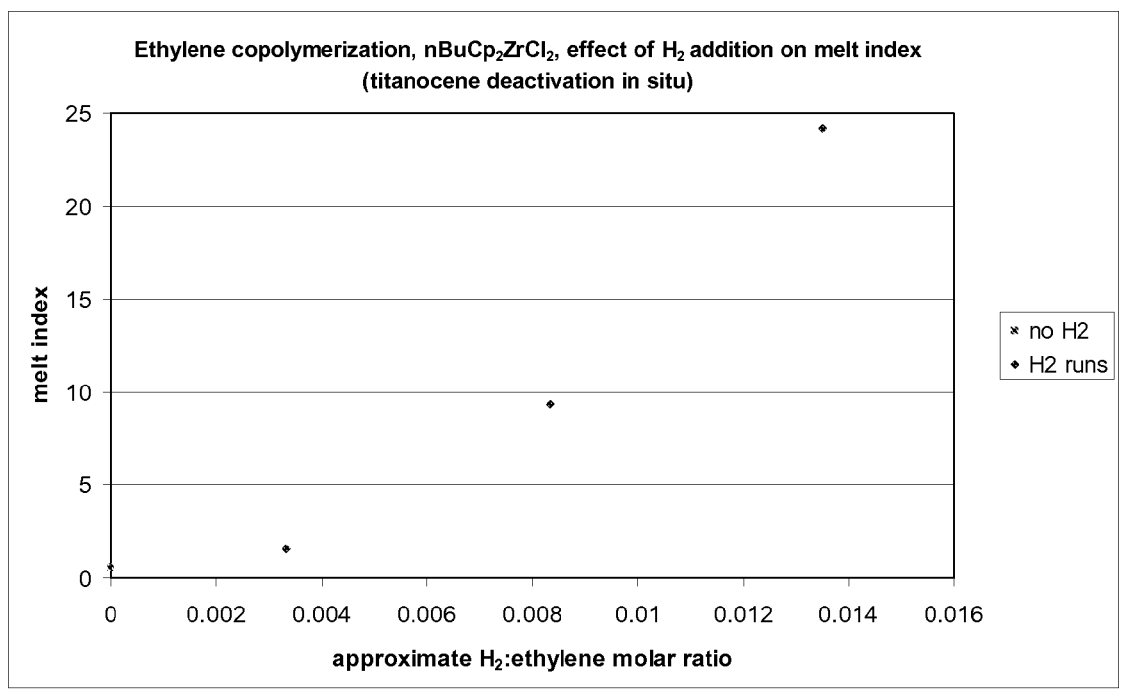
FIG. 2 illustrates the effect of hydrogen addition on the melt index of polymer produced using a catalyst system embodiment of the present invention.

The melt index values for the polymers produced in Examples 17-20 are also illustrated in FIG. 2, which demonstrates that hydrogen addition to the polymerization can be used to control melt index of the polymer produced. Note that for these examples the ratio of Ti:Zr was kept at approximately 0.68 (range=0.72 to 0.64).

Examples 21-31

Figure 3:
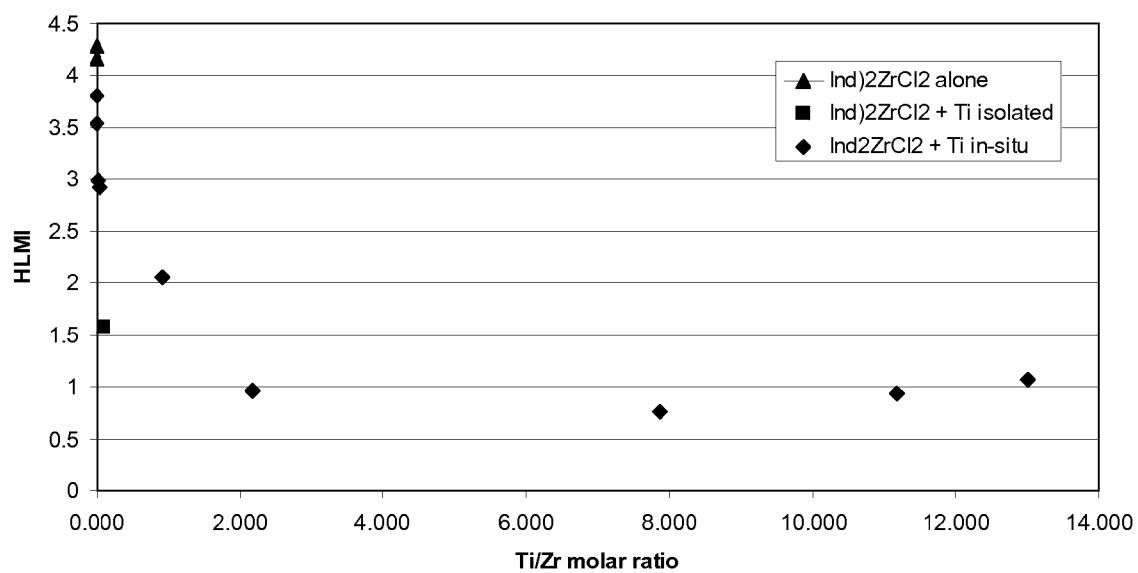
FIG. 3 illustrates that HLMI varies inversely as a function of the Ti/Zr molar ratio in the catalyst, wherein a titanocene/tri-isobutyl aluminum (TIBAL) solution was added directly to the catalyst charge vessel.

In the following experimental polymerization runs summarized in Table 5, the first two results, including measurement of HLMI, represent control or reference runs for the $(Ind)_2ZrCl_2$ metallocene catalyst. The remainder of the runs and the data obtained for the polymers produced were obtained by adding a titanocene/TIBAL solution directly to the catalyst charge vessel. In contrast to the results obtained above in Examples 12-14 (Table 2) for $(Ind)_2ZrCl_2$+deactivated titanocene catalyst, no attempt was made to isolate the catalyst represented by $(Ind)_2ZrCl_2$+deactivated titanocene (the reaction product of the titanocene with TIBAL) as a dry powder. The results are summarized in Table 5 and the HLMI results are illustrated in FIG. 3.

TABLE 5

| Polymerization Examples 21-32* | | | | | | |
|---|---|---|---|---|---|---|
| | Example | | | | | |
| | 21 | 22 | 23 | 24 | 25 | 26 |
| catalyst charge (mg) | 50 | 62.5 | 45.6 | 37.7 | 53.1 | 54.4 |
| Zr in catalyst (wt %) | 0.40 | 0.40 | 0.40 | 0.40 | 0.40 | 0.40 |
| Zr in catalyst charge (mmole) | 0.0022 | 0.0027 | 0.0020 | 0.0017 | 0.0023 | 0.0024 |
| TIBAL added as scavenger (mL)** | 0.5 | 0.5 | 0.5 | 0.5 | 0.5 | 0.5 |
| Titanocene | — | — | $Cp_2TiCl_2$ | $Cp_2TiCl_2$ | $Cp_2TiCl_2$ | $Cp_2TiCl_2$ |
| Ti solution added to metallocene charge vessel(ml) | 0 | 0 | 0.5 | 0.25 | 0.5 | 0.1 |
| Ti conc. (mol/L) | NA | NA | 5.20E−02 | 5.20E−02 | 5.20E−02 | 5.20E−02 |
| Ti added (mmol) | 0 | 0 | 2.60E−02 | 1.30E−02 | 2.60E−02 | 5.20E−03 |
| Polymer Yield (g) | 38.32 | 64.21 | 10.93 | 16.75 | 12.9 | 44.2 |
| Catalyst Productivity (g/g) | 766 | 1027 | 240 | 444 | 243 | 813 |
| Catalyst Activity (g/g/hr) | 766 | 1027 | 240 | 444 | 243 | 813 |
| Metallocene Activity (g/g/hr) | 44548 | 59716 | 13932 | 25825 | 14121 | 47227 |
| Metallocene Activity (g/mm/h) | 17482 | 23435 | 5468 | 10135 | 5542 | 18534 |
| Ti/Zr molar ratio | 0.000 | 0.000 | 13.006 | 7.866 | 11.169 | 2.180 |
| Polymer Properties | | | | | | |
| HLMI | 4.17 | 4.28 | 1.07 | 0.76 | 0.94 | 0.96 |

| | Example | | | | |
|---|---|---|---|---|---|
| | 27 | 28 | 29 | 30 | 31 |
| catalyst charge (mg) | 65 | 50 | 49.7 | 55.0 | 58.0 |
| Zr in catalyst (wt %) | 0.40 | 0.40 | 0.40 | 0.40 | 0.40 |
| Zr in catalyst charge (mmole) | 0.0028 | 0.0022 | 0.0022 | 0.0024 | 0.0025 |
| TIBAL added as scavenger (mL)** | 0.5 | 0.5 | 0.5 | 0.5 | 0.5 |
| Titanocene | $Cp_2TiCl_2$ | $Cp_2TiCl_2$ | $Cp_2TiCl_2$ | $Cp_2TiCl_2$ | $Cp_2TiCl_2$ |
| Ti solution added to metallocene charge vessel(ml) | 0.05 | 1.00 | 0.50 | 0.05 | 0.25 |
| Ti conc. (mol/L) | 5.20E−02 | 7.79E−05 | 7.79E−05 | 7.79E−05 | 7.79E−05 |
| Ti added (mmol) | 2.60E−03 | 7.79E−05 | 3.90E−05 | 3.90E−06 | 1.95E−05 |
| Polymer Yield (g) | 54.68 | 61.07 | 43.8 | 34 | 41.6 |
| Catalyst Productivity (g/g) | 841 | 1221 | 881 | 618 | 717 |
| Catalyst Activity (g/g/hr) | 841 | 1221 | 881 | 618 | 717 |
| Metallocene Activity (g/g/hr) | 48897 | 70995 | 51226 | 35932 | 41690 |
| Metallocene Activity (g/mm/h) | 19189 | 27861 | 20103 | 14101 | 16361 |
| Ti/Zr molar ratio | 0.912 | 0.036 | 0.018 | 0.002 | 0.008 |
| Polymer Properties | | | | | |
| HLMI | 2.06 | 2.93 | 2.99 | 3.80 | 3.54 |

*Polymerization catalyst for all runs = $(Ind)_2ZrCl_2/MAO/SiO_2$.
**1 Molar toluene solution
Common conditions:
Additional 10 ml dry heptane added to each metallocene charge bomb;
Pressure setpoint = 450 psi;
Run temperature = 90° C.;
Run duration = 60 minutes.

Examples 32-36

Figure 4:
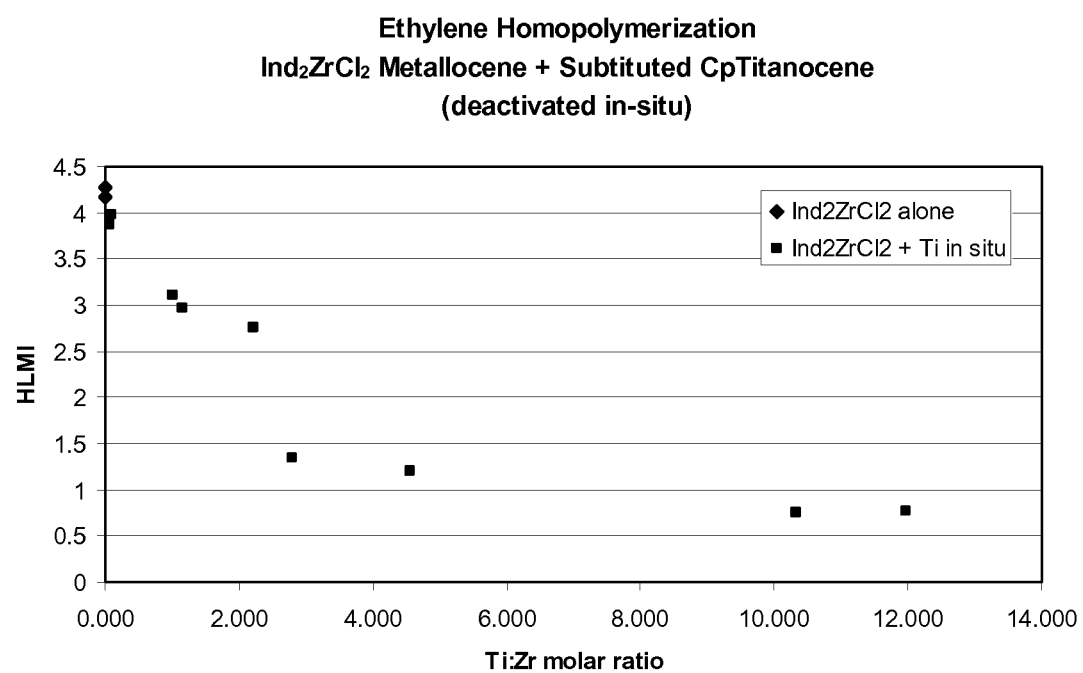
FIG. 4 illustrates that melt index of the copolymer varies inversely with the molar Ti:Zr ratio.

The experimental conditions and data for Examples 32-36 are summarized in Table 6 and the HLMI results for the copolymers produced are plotted against the molar ratio of Ti/Zr in FIG. 4. The metallocene catalyst used for these examples was $nBuCp_2ZrCl_2$ and included varying amounts of $Cp_2TiCl_2$ and TIBAL solution added to the catalyst vessel. Example 32 represents the control, where no Ti was added. FIG. 4 illustrates that melt index of the copolymer varies inversely with the molar Ti:Zr ratio. In contrast to the examples summarized in Table 1 where homopolymers were obtained, these results demonstrate that a low density, or density target of LLDPE, such as less than about 0.20 g/mL, less than a 1 melt index polymer can be produced using the technology of the present invention at a relatively high polymerization reaction temperature of, for example, 80° C. This is of practical importance, especially in operations on a commercial scale.

Common conditions:
Polymerization monomers=Ethylene plus 75 mL 1-hexene Comonomer; TIBAL (0.5 mL, 1 molar toluene solution) added as scavenger; additional 10 ml dry heptane added to each metallocene charge bomb; pressure setpoint=350 psi; run temperature=80° C.; run duration=60 minutes.

Examples 37-47

Figure 5:
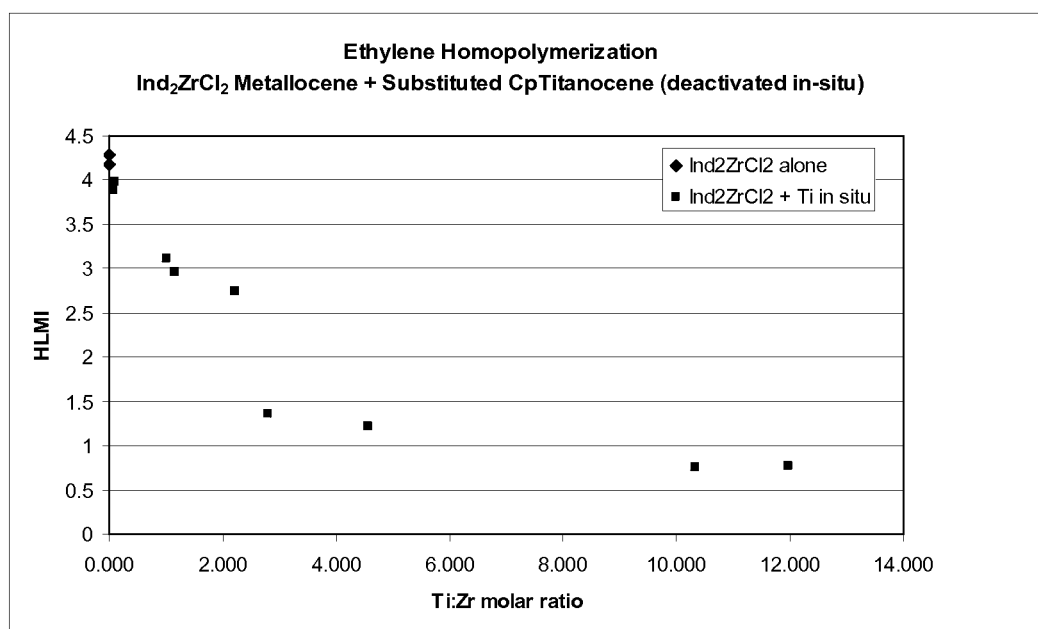
FIG. 5 illustrates that melt index of the copolymer varies inversely with the molar Ti:Zr ratio.

The experimental conditions and data for Examples 37-47 are summarized in Table 7 and the HLMI results for the ethylene homopolymers produced are plotted against the molar ratio of Ti/Zr in FIG. 5. The metallocene catalyst used for these examples was $(Ind)_2ZrCl_2/MAO/SiO_2$ and a substituted titanocene, $(EtCp)_2ZrCl_2$ deactivated in situ with TIBAL was used in combination, except for Examples 37 and 38, which were control runs using the same metallocene catalyst without added titanocene. FIG. 5 illustrates that melt index of the copolymer varies inversely with the molar Ti:Zr ratio.

TABLE 6

Co-Polymerization Examples*

|  | Example | | | | |
| --- | --- | --- | --- | --- | --- |
|  | 32 | 33 | 34 | 35 | 36 |
| catalyst charge (mg) | 47.2 | 56.8 | 52.9 | 55.6 | 48.5 |
| Zr in catalyst (wt %) | 0.13 | 0.13 | 0.13 | 0.13 | 0.13 |
| Zr in catalyst charge (mmole) | 0.0007 | 0.0008 | 0.0008 | 0.0008 | 0.0007 |
| titanocene | None | $Cp_2TiCl_2$ | $Cp_2TiCl_2$ | $Cp_2TiCl_2$ | $Cp_2TiCl_2$ |
| Ti solution added to metallocene charge vessel (ml) | 0.0 | 0.05 | 0.5 | 0.2 | 0.006 |
| Ti concentration (mol/L) | 0 | 7.79E−03 | 7.79E−03 | 7.79E−03 | 7.79E−03 |
| Ti added (mmol) | 0 | 3.90E−04 | 3.90E−03 | 1.56E−03 | 4.68E−05 |
| polymer yield (gms) | 63.45 | 80.3 | 29.4 | 50.15 | 56.24 |
| catalyst productivity (g/g) | 1344 | 1414 | 556 | 902 | 1160 |
| catalyst activity g/g/hr | 1344 | 1414 | 556 | 902 | 1160 |
| metallocene activity g/g/hr | 233238 | 245289 | 96428 | 156497 | 201193 |
| metallocene activity (g/mm/h) | 94352 | 99227 | 39008 | 63308 | 81389 |
| Ti/Zr molar ratio | 0.000 | 0.481 | 5.169 | 1.967 | 0.068 |
| Polymer Properties | | | | | |
| MI | 0.84 | 0.38 | 0.029 | 0.063 | 0.54 |
| HLMI | 13.25 | 6.48 | 0.48 | 0.95 | 10.1 |
| HMLI/MI (Shear) | 15.8 | 17.1 | 16.6 | 15.0 | 18.7 |
| density (g/ml) | 0.9183 | 0.9161 | 0.9150 | 0.9141 | 0.9169 |
| Mn/1000 | 88.95 | 81.07 | 181.94 | 146.09 | 63.75 |
| Mw/1000 | 157.15 | 151.12 | 332.69 | 274.48 | 138.58 |
| Mw/Mn | 1.8 | 1.9 | 1.8 | 1.9 | 2.2 |
| Mz/1000 | 242.22 | 233.53 | 486.84 | 412.11 | 239.12 |

*Polymerization catalyst for Examples 32-36 was $(nBuCp)_2ZrCl_2/MAO/SiO_2$

TABLE 7

| | Example | | | | | |
|---|---|---|---|---|---|---|
| | 37‡ | 38‡ | 39 | 40 | 41 | 42 |
| support or finished catalyst charge (mg) | 50 | 62.5 | 74.0 | 57.0 | 50.0 | 69.0 |
| Zr in catalyst (wt %) | 0.40 | 0.40 | 0.40 | 0.40 | 0.40 | 0.40 |
| Zr in catalyst charge (mmole) | 0.0022 | 0.0027 | 0.0032 | 0.0025 | 0.0022 | 0.0030 |
| Titanocene solution added to charge vessel (ml) | 0 | 0 | 0.050 | 0.025 | 0.70 | 0.50 |
| Ti concentration (mol/L) | DNA | DNA | 6.949E−03 | 6.949E−03 | 6.949E−03 | 6.949E−03 |
| Ti added (mmol) | 0 | 0 | 3.47E−04 | 1.74E−04 | 4.86E−03 | 3.47E−03 |
| polymer yield (g) | 38.32 | 64.21 | 53.6 | 60.79 | 40.22 | 69.47 |
| catalyst productivity (g/g) | 766 | 1027 | 724 | 1066 | 804 | 1007 |
| catalyst activity (g/g/hr) | 766 | 1027 | 724 | 1066 | 804 | 1007 |
| metallocene activity (g/g/hr) | 44548 | 59716 | 42102 | 61991 | 46757 | 58522 |
| metallocene activity (g/mm/h) | 17482 | 23435 | 16523 | 24328 | 18349 | 22966 |
| Ti/Zr molar ratio | 0.000 | 0.000 | 0.107 | 0.070 | 2.219 | 1.149 |
| Polymer properties | | | | | | |
| HLMI | 4.17 | 4.28 | 3.98 | 3.88 | 2.75 | 2.96 |

| | Example | | | | |
|---|---|---|---|---|---|
| | 43 | 44 | 45 | 46 | 47 |
| support or finished catalyst charge (mg) | 46.6 | 52.0 | 56.6 | 53.0 | 46.0 |
| Zr in catalyst (wt %) | 0.40 | 0.40 | 0.40 | 0.40 | 0.40 |
| Zr in catalyst charge (mmole) | 0.0020 | 0.0023 | 0.0025 | 0.0023 | 0.0020 |
| Titanocene solution added to charge vessel (ml) | 0.3 | 1.5 | 1.0 | 4.0 | 3.0 |
| Ti concentration (mol/L) | 6.949E−03 | 6.949E−03 | 6.949E−03 | 6.949E−03 | 6.949E−03 |
| Ti added (mmol) | 2.08E−03 | 1.04E−02 | 6.95E−03 | 2.78E−02 | 2.08E−02 |
| polymer yield (g) | 43.7 | 50.37 | 47.7 | 16.4 | 16.9 |
| catalyst productivity (g/g) | 938 | 969 | 843 | 309 | 367 |
| catalyst activity (g/g/hr) | 938 | 969 | 843 | 309 | 367 |
| metallocene activity (g/g/hr) | 54509 | 56304 | 48986 | 17986 | 21355 |
| metallocene activity (g/mm/h) | 21391 | 22096 | 19224 | 7058 | 8381 |
| Ti/Zr molar ratio | 1.020 | 4.573 | 2.801 | 11.963 | 10.338 |
| Polymer properties | | | | | |
| HLMI | 3.11 | 1.21 | 1.35 | 0.77 | 0.75 |

\*Polymerization catalyst for all runs: $(Ind)_2ZrCl_2/MAO/SiO_2$
\*\*Titanocene (deactivated in situ with TIBAL) for all runs: $(EtCp)_2TiCl_2$
‡Titanocene not added to runs 37 and 38
Common Conditions for all runs:
TIBAL (0.5 mL, 1 molar toluene solution) added as scavenger;
additional 10 ml dry heptane added to each metallocene charge vessel;
pressure setpoint = 450 psi;
run temperature = 90° C.;
run duration = 60 minutes.

Examples 48-64

For these examples, three $Cp_2TiCl_2$ and alkylaluminum compositions are pre-supported on separate silica particles from those used to support $(n-BuCp)_2ZrCl_2$ and MAO.

The following reagents were used for these preparations: titanocene dichloride and triisobutylaluminum (TIBAL) 1 M in toluene, both from Akzo Nobel; Grace Silica XPO-2402 (1.6056 cc/g pore volume, 286 $m^2$/g surface area; trimethylaluminum (TMAL) 2 M in toluene from Aldrich Chemical; and heptanes (Fischer HPLC grade), which was dried over activated 4 A sieves and de-gassed with argon.

The first of these silica-supported titanocene-alkylaluminum solids, possessing a higher Ti:SiO2 ratio than the other two below, and used in examples 48-57, was prepared as follows: in an oxygen- and moisture-free glovebox, 0.0414 grams of maroon colored titanocene dichloride was charged to a 250 mL round-bottomed flask, followed by 10.0 mL of 1 M TIBAL, 5.8 mL of dry, degassed heptanes and a stir bar. Stirring for 30 minutes afforded a dark violet solution. To this solution was charged 9.9878 g of XPO-2402 silica. The flask was swirled until the silica gave a free-flowing white powder of homogenous consistency. The flask was fitted with a vacuum adaptor and dried at 53° C. under high vacuum for 3 hours to afford 11.318 g of a light purple solid.

The second silica-supported titanocene-alkylaluminum solid, possessing a lower Ti:SiO2 ratio and used in examples 58, and 60-62 was prepared as follows: in an oxygen- and moisture-free glovebox, 0.0042 grams of maroon colored titanocene dichloride was charged to a 125 mL round-bottom flask, followed by 1.0 mL of 1 M TIBAL, 15 mL of dry, degassed heptanes and a stir bar. Stirring for 30 minutes afforded a clear violet solution.

To a separate 250 mL Erlenmeyer flask was charged 9.9338 g of XPO-2402 silica. Then the violet solution containing titanocene and TIBAL was added, via pipette to the top of the silica bed, about 3 mL at a time. After each addition, the flask containing the silica-containing mixture was shaken. After all of the solution was added, the silica containing mixture or composition was further mixed with a spatula until no liquid was visible and all the silica was wetted. The flask was fitted with a vacuum adaptor and dried at 50° C. under high vacuum for 3 hours to afford 9.9878 g of a white solid. The third silica-supported titanocene-alkylaluminum solid, used in example 59, was prepared similarly.

Copolymerizations using the above prepared Ti-containing solids were conducted at 80° C. and 450 psi in isobutane. As in the previous polymerizations, 1-hexene was dried over 4 A molecular sieves activated at 450° C., and isobutane was passed through beds of activated charcoal, alumina and molecular sieves prior to use. The solids containing one of the above modified titanocene compositions and a supported, $n-BuCp)_2ZrCl_2$-MAO—$SiO_2$ polymerization catalyst, along with 10 mL of dry, degassed heptanes, were charged to a stainless steel catalyst charging tube, attached to the polymerization reactor and flushed into the reactor with isobutane. The marine-impellor stirrer was set to 500 rpm, the reactor was brought to temperature, and 75 mL of 1-hexene was flushed into the reactor with ethylene. The reactor pressure was set to 350 total psi and ethylene was fed on demand. After 1 hour, the reactor was vented and the polymer collected. The polymer was treated with an antioxidant solution (4 mL per 25 g of polymer), then dried. Antioxidant solution was prepared by dissolving 15 g of 4,4'-thiobis(6-t-butyl-m-cresol) (Santonox R, Monsanto Chemical Co.), 15 g of didodecyl 3',3'-thiodipropionate (Sigma-Aldrich Co.) and 15 g 2,6-Di-t-butyl-4-methylphenol (Sigma-Aldrich Co.) in 3.8 L of acetone (HPLC grade, Fisher Scientific).

Figure 6:
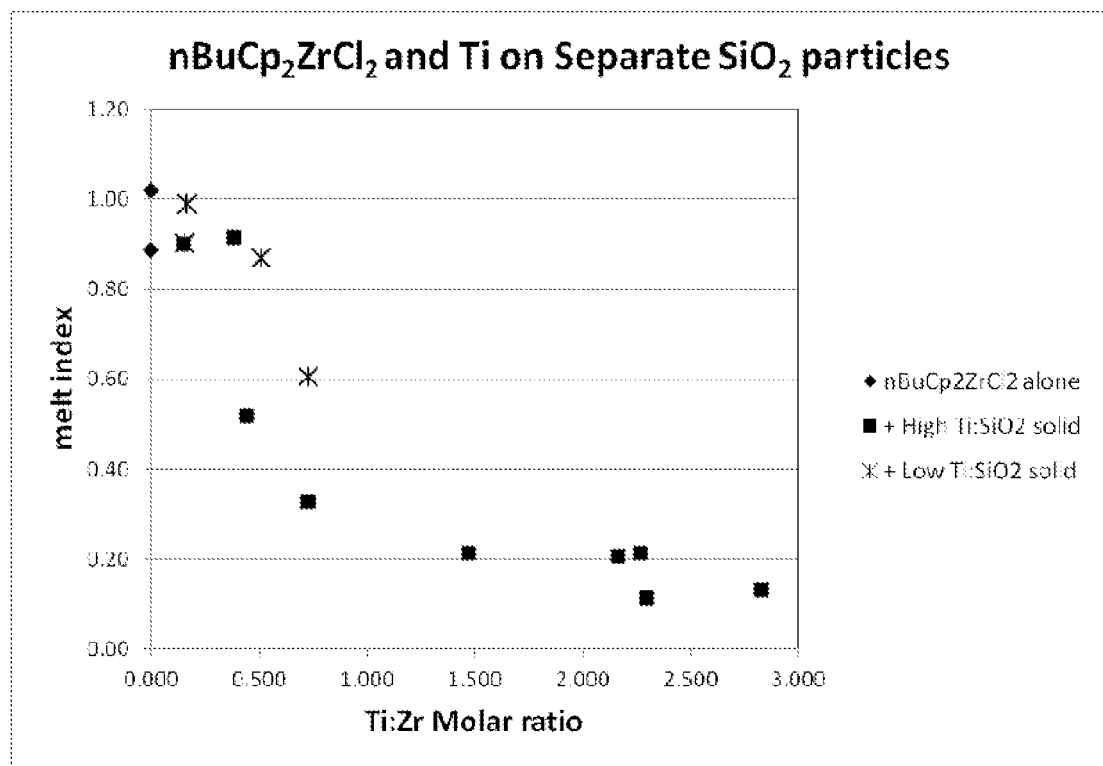
FIG. 6 illustrates the melt index of a copolymer obtained using separately supported, substantially deactivated titanocene components.

The examples summarized in Table 8 and FIG. 6 illustrate that a substantially deactivated titanocene additive may be pre-supported on a silica particle separate from the active polymerization catalyst component, and added in varying amounts relative to a supported metallocene polymerization catalyst in order to lower the melt-index of polymer produced using the catalyst. Examples 49 through 57, use a higher concentration of the Ti/TIBAL:$SiO_2$ component compared to Examples 59 through 62, which use a lower concentration of the Ti/TIBAL:SiO2 component. Concentrations are calculated values based on their preparations and shown in Table 8. They are labeled as either "Hi" or "Low" in FIG. 6 depending on their relative calculated concentration (mole Ti/gram solid, the first solid possessing almost an order of magnitude more Ti on the silica than the other two; solid refers to the total weight of the support and deactivated titanocene, the reaction product of the titanocene and TIBAL and unreacted components, if any). The use of a substantially deactivated Ti-containing component prepared according to the present invention as exemplified and described above, in conjunction with a metallocene catalyst, in these examples $nBuCp_2ZrCl_2$-MAO—$SiO_2$, lowers the polymer melt index compared to polymers obtained using the control catalyst without a substantially deactivated titanocene component, Examples 63 and 64. Examples 48 and 58 demonstrate that in the absence of the active metallocene polymerization catalyst, $nBuCp_2ZrCl_2$-MAO—$SiO_2$, the use of substantially deactivated titanocene components by themselves are not active polymerization catalysts.

TABLE 8

| | Example | | | | | | | | |
|---|---|---|---|---|---|---|---|---|---|
| | 48 | 49 | 50 | 51 | 52 | 53 | 54 | 55 | 56 |
| Polym. catalyst* | none | * | * | * | * | * | * | * | * |
| MCN catalyst charge (mg) | 0 | 34.4 | 30.7 | 31.5 | 37.6 | 35 | 33.5 | 27.7 | 34.2 |
| Zr in cat. charge (mmole × E+04) | 0.00 | 4.90 | 4.37 | 4.49 | 5.36 | 4.99 | 4.77 | 3.95 | 4.87 |
| Ti-TIBA-$SiO_2$ charged to cat. charge vessel (g) | 0.0966 | 0.0492 | 0.0217 | 0.0701 | 0.1031 | 0.0735 | 0.0737 | 0.0041 | 0.0147 |
| Ti conc. (mol/g × E+05) | 1.469 | 1.47 | 1.47 | 1.47 | 1.47 | 1.47 | 1.47 | 1.47 | 1.47 |

TABLE 8-continued

| Ti added (mmol × E+04) | 14.19 | 7.23 | 3.19 | 10.3 | 15.1 | 10.8 | 10.8 | 0.602 | 2.16 |
|---|---|---|---|---|---|---|---|---|---|
| polymer yield (gms) | 0.0 | 46.5 | 63.5 | 22.5 | 47.8 | 43.8 | 57.8 | 49.6 | 56.8 |
| Cat. Productivity (g/g) | 0 | 1,353 | 2,068 | 714 | 1,271 | 1,250 | 1,725 | 1,789 | 1,661 |
| Ti/Zr molar ratio | NA | 1.475 | 0.729 | 2.295 | 2.828 | 2.166 | 2.269 | 0.153 | 0.443 |
| MI | NA | 0.21 | 0.33 | 0.12 | 0.13 | 0.21 | 0.22 | 0.90 | 0.52 |
| HLMI | NA | 2.94 | 5.35 | 1.89 | 2.13 | 3.04 | 3.81 | 15.32 | 9.35 |
| HMLI/MI | NA | 13.80 | 16.21 | 16.43 | 16.08 | 14.65 | 17.72 | 17.02 | 18.04 |

Table 8 (Continued)

| | Example | | | | | | | |
|---|---|---|---|---|---|---|---|---|
| | 57 | 58 | 59 | 60 | 61 | 62 | 63 | 64 |
| Polym. catalyst* | * | none | * | * | * | * | * | * |
| MCN catalyst charge (mg) | 30 | 0 | 28.4 | 32.2 | 28.4 | 28 | 29.7 | 33 |
| Zr in cat. charge (mmole × E+04) | 4.27 | 0.00 | 4.05 | 4.59 | 4.05 | 3.99 | 4.23 | 4.70 |
| Ti-TIBA-SiO$_2$ charged to cat. charge vessel (g) | 0.0112 | 0.1011 | 0.0397 | 0.1750 | 0.1085 | 0.0322 | 0.0000 | 0.0000 |
| Ti conc. (mol/g × E+05) | 1.47 | 0.191 | 0.171 | 0.191 | 0.191 | 0.191 | 0.00 | 0.00 |
| Ti added (mmol × E+04) | 1.65 | 1.93 | 0.679 | 3.34 | 2.07 | 0.615 | 0.00 | 0.00 |
| polymer yield (gms) | 41.2 | 0.0 | 42.5 | 55.7 | 38.1 | 39.2 | 42.2 | 49.0 |
| Cat. Productivity (g/g) | 1,373 | 0 | 1,496 | 1,730 | 1,340 | 1,400 | 1,422 | 1,486 |
| Ti/Zr molar ratio | 0.385 | NA | 0.1678 | 0.7286 | 0.5122 | 0.1542 | 0.000 | 0.000 |
| MI | 0.91 | NA | 0.99 | 0.605 | 0.87 | 0.90 | 0.89 | 1.02 |
| HLMI | 15.39 | NA | 17.12 | 10.08 | 14.81 | 15.2 | 14.52 | 16.69 |
| HMLI/MI | 16.83 | NA | 17.29 | 16.66 | 17.02 | 16.83 | 16.35 | 16.36 |

The following footnotes apply to Table 8 and Table 8 (continued)
All polymerizations in Table 8 were conducted at 80° C., 350 total psi for 60 minutes (catalyst productivity, g/g, and activity, g/g/hr, values are the same); with 0.5 mL TIBAL (1M in toluene) added as a scavenger, 75 mL 1-Hexene, and except for examples 63 and 64 Cp$_2$TiCl$_2$-TIBA-SiO$_2$ solids added to the reactor via the catalyst charge tube.
* MCN = (nBuCp)$_2$ZrCl$_2$/MAO/SiO$_2$; Zr in catalyst (when used) = 0.13 wt. %; added via a charge vessel.

The procedures described in the above examples of the invention are followed in order to prepare suitable catalyst systems for polymerizing copolymers comprising, for example, ethylene and propylene or ethylene with other alpha-olefins and olefins and copolymers of propylene with other, higher olefins such as those disclosed hereinabove.

In summary, it has been found that a titanocene compound which would otherwise be active for polymerizing olefins if used, for example with a suitable co-catalyst, can be modified so that it is inactive or substantially inactive for such polymerization, but when it is added to an active metallocene (e.g., zirconocene) polyolefin catalyst composition, especially so-called simple or inexpensive, but highly active zirconocene catalysts, the resulting catalyst system produces polyolefins exhibiting increased polymer molecular weight over and above that which would otherwise be obtained in the absence of the inactive titanocene component. Furthermore, the improvement or increase in molecular weight can be achieved without significantly changing the catalyst activity, polydispersity of the resulting polymer or the selectivity of the zirconium-based metallocene, particularly using so-called simple or inexpensive zirconocenes, thus increasing their utility in applications requiring higher molecular weight or lower melt index polymers than they would otherwise be capable of producing. A preferred embodiment of the present invention is a metallocene catalyst composition that produces a polymer which exhibits increased molecular weight (lower melt index), preferably a zirconocene, without substantially changing the activity, selectivity, such as comonomer incorporation for copolymerization, or macrostructure of the polyolefin obtained, other than to increase molecular weight. The polydispersity of polyolefin polymers produced using the new catalyst composition is, within experimental error, as narrow as that produced using the zirconocene-only, except that the molecular weight of the polymer produced using the inventive catalyst system is shifted to a higher value.

Alternative Embodiments

The following enumerated paragraphs illustrate various and alternative embodiments of the present invention:

1. An olefin polymerization catalyst or catalyst system comprising a mixture, contact product, reaction product or complex comprising as elements or components:

(A) at least one metallocene pre-catalyst compound or polymerization-active metallocene compound;
(B) at least one titanium-containing metallocene compound;
and when (A) is a metallocene pre-catalyst compound,
(C) at least one compound selected from the group consisting of:
(c1) an organoaluminum oxy-compound;
(c2) an ionizing ionic compound; and
(c3) an organoaluminum compound;
provided however:
(I) the titanium-containing metallocene compound is inactive or substantially inactive for the polymerization of olefins; or
(II) if the titanium containing metallocene compound is initially active or capable of being activated for olefin polymerization and thus includes titanium which exhibits an oxidation state of $Ti^{+4}$, the titanium present in the compound is reduced to an oxidation state of $Ti^{+3}$ so that the titanium containing metallocene compound is inactive or substantially inactive prior to or concurrently with the use of the catalyst system for olefin polymerization.

2. The catalyst system of Paragraph 1 wherein the inactive or substantially inactive titanium-containing metallocene compound comprises the reaction product or contact product of a polymerization active titanium-containing metallocene compound and at least one organometallic compound, organoaluminum compound or alumoxane compound.

3. The catalyst system of Paragraph 2 wherein the organoaluminum compound is a compound represented by Formula (I), Formula (II), Formula (III) or Formula (IV):

   (I),

   (II), wherein:
$R^a$ is a hydrocarbon group of 1 to 12 carbon atoms, X is a halogen atom or hydrogen, and n is 1 to 3; and wherein Y is —$OR^b$ group, —$OSiR^c_3$ group, —$OAlR^d_2$ group, —$NR^e_2$ group, —$SiR^f_3$ group or —$N(R^g)AlR^h_2$ group; n is 1 to 2; $R^b$, $R^c$, $R^d$ and $R^h$ are each independently selected from the group consisting of methyl, ethyl, isopropyl, isobutyl, cyclohexyl, and phenyl; $R^e$ is selected from the group consisting of hydrogen, methyl, ethyl, isopropyl, phenyl, and trimethylsilyl; and $R^f$ and $R^g$ are each independently methyl or ethyl;
or an alumoxane compound represented by Formula (A) or Formula (B)

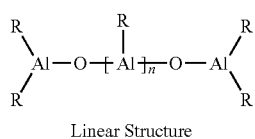

Linear Structure

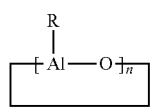

Cyclic Structure wherein in the above formulas, R is a $C_1$ to about $C_{20}$ alkyl group; a $C_2$ to about $C_{20}$ alkenyl group; or a $C_7$ to about $C_{12}$ arylalkyl group; and n is an integer indicating a degree of polymerization and is about 2 to about 50;

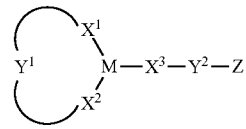

wherein M is B, Al, Ga or In;
$X^1$, $X^2$, $X^3$ are, in each case independently of one another, $CHR^1$, $NR^2$, O or S;
$Y^1$, $Y^2$ are, in each case independently of one another, —$(CH_2)_m$—, O—$(CH_2)_p$—$C_6H_4$—$(CH_2)_q$—, O—$(CH_2)_p$—$C_6H_6$—$(CH_2)_q$—, O—$(CH_2)_p$—$C_6H_8$—$(CH_2)_q$, O—$(CH_2)_p$—$C_6H_{10}$—$(CH_2)_q$—, O—$(CH_2)_p$—$C_5H_4$—$(CH_2)_q$—, O—$(CH_2)_p$—$C_5H_6$—$(CH_2)_q$—, O—$(CH_2)_p$—$C_5H_8$—$(CH_2)_q$—, or —$(CH_2)_p$—CH=CH—$(CH_2)_q$—;
Z is $NR^3$, $R^4$, $PR^3R^4$, $OR^5$ or $SR^5$;
$R^1$ is H, OH, halogen, $C_{1-6}$-alkyl or $C_{1-6}$-alkoxyl, $C_{5-7}$-cycloalkyl or phenyl;
$R^2$, $R^3$, $R^4$, $R^5$ are, in each case independently of one another, H or $C_{1-6}$-alkyl, $C_{5-7}$-cycloalkyl, phenyl, or wherein $R^3$ and $R^4$ together also form a $C_{4-6}$-alkylene bridge;
m is a number from 1 to 6;
p, q are, in each case independently of one another, a number from 0 to 2;

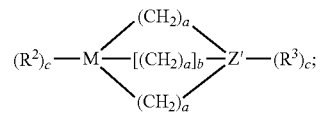

wherein M, $R^2$ and $R^3$ are defined as above and in which Z' is N or P;
a is a number from 2 to 4; and
b, c are the numbers 0 or 1 with b+c=1.

4. The catalyst system of Paragraph 2 wherein the organometallic compound or organoaluminum compound comprises at least one beta hydrogen.

5. The catalyst system of Paragraph 3 wherein:
(A) the organoaluminum compound of Formula (I) is selected from the group consisting of trimethylaluminum, triethylaluminum, triisopropylaluminum, triisobutylaluminum, trioctylaluminum, tri-2-ethylhexylaluminum, isoprenylaluminum, dimethylaluminum chloride, diethylaluminum chloride, diisopropylaluminum chloride, diisobutylaluminum chloride, dimethylaluminum bromide, methylaluminum sesquichloride, ethylaluminum sesquichloride, isopropylaluminum sesquichloride, butylaluminum sesquichloride, ethylaluminum sesquibromide, methylaluminum dichloride, ethylaluminum dichloride, isopropylaluminum dichloride, ethylaluminum dibromide, dimethylaluminum hydride, diethylaluminum hydride, dihydrophenylaluminum, diisopropylaluminum hydride, di-n-butylaluminum hydride, diisobutylaluminum hydride, diisohexylaluminum hydride, diphenylalunimum hydride, dicylohexylaluminum hydride, di-sec-heptylaluminum hydride and di-sec-nonylaluminum hydride;
(B) the organoaluminum compound of Formula (II) is selected from the group consisting of dimethylaluminum methoxide, diethylaluminum ethoxide and diisobutylaluminum methoxide, diethylaluminum phenoxide, $Et_2Al(OS$- iMe$_3$), (iso-Bu)$_2$Al(OSiMe$_3$), (iso-Bu)$_2$Al(OSiEt$_3$), Et$_2$AlOAlEt$_2$, (iso-Bu)$_2$AlOAl(iso-Bu)$_2$, Me$_2$AlNEt$_2$, Et$_2$AlNHMe, Me$_2$AlNHEt, Et$_2$AlN(SiMe$_3$)$_2$, (iso-Bu)$_2$AlN(SiMe$_3$)$_2$, (iso-Bu)$_2$AlSiMe$_3$, Et$_2$AlN(Me)AlEt$_2$ and (iso-Bu)$_2$AlN(Et)Al(iso-Bu)$_2$; and (C) the alumoxane compound of Formula (A) or Formula (B) is methylalumoxane or ethylalumoxane or isobutylalumoxane.

6. The catalyst system of Paragraph 3 wherein:

(A) the organoaluminum compound of Formula (III) is selected from the group consisting of: 1-alumina-1-(4-dimethylaminobutyl)cyclobutane; 1-alumina-1-(2-dimethylaminoethyl)cyclopentane; 1-alumina-1-(2-diethylaminoethyl)cyclopentane; 1-alumina-1-(2-dipropylaminoethyl)cyclopentane; 1-alumina-1-(2-diisopropylaminoethyl)cyclopentane; 1-alumina-1-(2-dibutylaminoethyl)cyclopentane; 1-alumina-1-(3-dimethylaminopropyl)cyclopentane; 1-alumina-1-(3-diethylaminopropyl)cyclopentane; 1-alumina-1-(3-dipropylaminopropyl)cyclopentane; 1-alumina-1-(3-diisopropylaminopropyl)cyclopentane; 1-alumina-1-(3-dibutylaminopropyl)cyclopentane; 1-alumina-1-(4-dimethylaminobutyl)cyclopentane; 1-alumina-1-(4-diethylaminobutyl)cyclopentane; 1-alumina-1-(4-dipropylaminobutyl)cyclopentane; 1-alumina-1-(4-diisopropylaminobutyl)cyclopentane; 1-alumina-1-(4-dibutylaminobutyl)cyclopentane; 1-alumina-1-(3-dimethylaminopropyl)-2-methylcyclopentane; 1-alumina-1-(2-dimethylaminoethyl)cyclohexane; 1-alumina-1-(2-diethylaminoethyl)cyclohexane; 1-alumina-1-(2-dipropylaminoethyl)cyclohexane; 1-alumina-1-(2-diisopropylaminoethyl)cyclohexane; 1-alumina-1-(2-dibutylaminoethyl)cyclohexane; 1-alumina-1-(3-dimethylaminopropyl)cyclohexane; 1-alumina-1-(3-diethylaminopropyl)cyclohexane; 1-alumina-1-(3-dipropylaminopropyl)cyclohexane; 1-alumina-1-(3-diisopropylaminopropyl)cyclohexane; 1-alumina-1-(3-dibutylaminopropyl)cyclohexane; 1-alumina-1-(4-dimethylaminobutyl)cyclohexane; 1-alumina-1-(4-diethylaminobutyl)cyclohexane; 1-alumina-1-(4-dipropylaminobutyl)cyclohexane; 1-alumina-1-(4-diisopropylaminobutyl)cyclohexane; 1-alumina-1-(4-dibutylaminobutyl)cyclohexane; 1-alumina-1-(o-dimethylaminobenzyl)cyclohexane; 1-alumina-1-(o-diethylaminobenzyl)cyclohexane; 1-alumina-1-(o-diisopropylaminobenzyl)cyclohexane; 1-alumina-1-(2-o-dimethylaminophenylethyl)cyclopentane; 1-alumina-1-(2-o-diethylaminophenylethyl)cyclobutane; 1-galla-1-(3-dimethylaminopropyl)cyclobutane; 1-galla-1-(2-dimethylaminoethyl)cyclopentane; 1-galla-1-(3-dimethylaminopropyl)cyclopentane; 1-galla-1-(2-dimethylaminoethyl)cyclopentane; 1-galla-1-(2-diethylaminoethyl)cyclopentane; 1-galla-1-(2-dipropylaminoethyl)cyclopentane; 1-galla-1-(2-diisopropylaminoethyl)cyclopentane; 1-galla-1-(2-dibutylaminoethyl)cyclopentane; 1-galla-1-(3-diethylaminopropyl)cyclopentane; 1-galla-1-(3-dipropylaminopropyl)cyclopentane; 1-galla-1-(3-diisopropylaminopropyl)cyclopentane; 1-galla-1-(3-dibutylaminopropyl)cyclopentane; 1-galla-1-(4-dimethylaminobutyl)cyclopentane; 1-galla-1-(4-diethylaminobutyl)cyclopentane; 1-galla-1-(4-dipropylaminobutyl)cyclopentane; 1-galla-1-(4-isopropylaminobutyl)cyclopentane; 1-galla-1-(4-dibutylaminobutyl)cyclopentane; 1-galla-1-(3-dimethylaminopropyl)cyclohexane; 1-galla-1-(3-diethylaminopropyl)cyclohexane; 1-galla-1-(3-dipropylaminopropyl)cyclohexane; 1-galla-1-(3-diisopropylaminopropyl)cyclohexane; 1-galla-1-(3-dibutylaminopropyl)cyclohexane; 1-galla-1-(2-dimethylaminoethyl)cyclohexane; 1-galla-1-(2-diethylaminoethyl)cyclohexane; 1-galla-1-(2-dipropylaminoethyl)cyclohexane; 1-galla-1-(2-diisopropylaminoethyl)cyclohexane; 1-galla-1-(2-dibutylaminoethyl)cyclohexane; 1-galla-1-(4-dimethylaminobutyl)cyclohexane; 1-galla-1-(4-diethylaminobutyl)cyclohexane; 1-galla-1-(4-dipropylaminobutyl)cyclohexane; 1-galla-1-(4-isopropylaminobutyl)cyclohexane; 1-galla-1-(4-dibutylaminobutyl)cyclohexane; 1-galla-1-(o-dimethylaminobenzyl)cyclobutane; 1-galla-1-(o-dimethylaminobenzyl)cyclopentane; 1-galla-1-(o-dimethylaminobenzyl)cyclohexane; 1-galla-1-(o-diethylaminobenzyl)cyclohexane; 1-galla-1-(o-dipropylaminobenzyl)cycloheptane; 1-inda-1-(2-diethylaminoethyl)cyclobutane; 1-inda-1-(2-dimethylaminoethyl)cyclopentane; 1-inda-1-(2-diethylaminoethyl)cyclopentane; 1-inda-1-(2-dipropylaminoethyl)cyclopentane; 1-inda-1-(2-diisopropylaminoethyl)cyclopentane; 1-inda-1-(2-dibutylaminoethyl)cyclopentane; 1-inda-1-(3-dimethylaminopropyl)cyclopentane; 1-inda-1-(3-diethylaminopropyl)cyclopentane; 1-inda-1-(3-dipropylaminopropyl)cyclopentane; 1-inda-1-(3-diisopropylaminopropyl)cyclopentane; 1-inda-1-(3-dibutylaminopropyl)cyclopentane; 1-inda-1-(4-dimethylaminobutyl)cyclopentane; 1-inda-1-(4-diethylaminobutyl)cyclopentane; 1-inda-1-(4-dipropylaminobutyl)cyclopentane; 1-inda-1-(4-diisopropylaminobutyl)cyclopentane; 1-inda-1-(4-dibutylaminobutyl)cyclopentane; 1-inda-1-(2-dimethylaminoethyl)cyclohexane; 1-inda-1-(2-diethylaminoethyl)cyclohexane; 1-inda-1-(2-dipropylaminoethyl)cyclohexane; 1-inda-1-(2-diisopropylaminoethyl)cyclohexane; 1-inda-1-(2-dibutylaminoethyl)cyclohexane; 1-inda-1-(3-dimethylaminopropyl)cyclohexane; 1-inda-1-(3-diethylaminopropyl)cyclohexane; 1-inda-1-(3-dipropylaminopropyl)cyclohexane; 1-inda-1-(3-diisopropylaminopropyl)cyclohexane; 1-inda-1-(3-dibutylaminopropyl)cyclohexane; 1-inda-1-(4-dimethylaminobutyl)cyclohexane; 1-inda-1-(4-diethylaminobutyl)cyclohexane; 1-inda-1-(4-dipropylaminobutyl)cyclohexane; 1-inda-1-(4-diisopropylaminobutyl)cyclohexane; 1-inda-1-(4-dibutylaminobutyl)cyclohexane; 1-inda-1-(o-diisopropylaminobenzyl)cyclobutane; 1-inda-1-(o-dimethylaminobenzyl)cyclopentane; 1-inda-1-(o-dibutylaminobenzyl)cyclopentane; 1-inda-1-(o-dimethylaminobenzyl)cyclohexane; 1-inda-1-(o-diethylaminobenzyl)cyclohexane; 1-inda-1-(o-dimethylaminobenzyl)cyclooctane; 2,5-dimethyl-1-(3-dimethylaminopropyl)-2,5-diaza-1-aluminacyclopentane; 2,5-dimethyl-1-(3-dimethylaminopropyl)-2,5-diaza-1-aluminacyclohexane; 2,5-dimethyl-1-(3-dimethylaminopropyl)-2,5-diaza-1-aluminacycloheptane; 2,5-dimethyl-1-(3-dimethylaminopropyl)-2,5-diaza-1-aluminacyclopentane; 2,5-dimethyl-1-(3-diethylaminopropyl)-2,5-diaza-1-aluminacyclohexane; 2,5-dimethyl-1-(3-diethylaminopropyl)-2,5-diaza-1-aluminacycloheptane; 2,5-diethyl-1-(3-dimethylaminopropyl)-2,5-diaza-1-aluminacyclohexane; 2,5-diethyl- 1-(3-dimethylaminopropyl)-2,5-diaza-1-aluminacyclopentane, 2,5-diethyl-1-(4-dimethylaminobutyl)-2,5-diaza-1-aluminacyclohexane; 2,5-diethyl-1-(4-dimethylaminobutyl)-2,5-diaza-1-aluminacyclopentane; 2,5-diethyl-1-(4-dimethylaminobutyl)-2,5-diaza-1-aluminacycloheptane; 2-ethyl-5-propyl-1-(4-dimethylaminobutyl)-2,5-diaza-1-aluminacyclohexane; 2-ethyl-5-propyl-1-(4-dimethylaminobutyl)-2,5-diaza-1-aluminacyclopentane; 2-ethyl-5-propyl-1-(4-dimethylaminobutyl)-2,5-diaza-1-aluminacycloheptane; 2,5-dimethyl-1-(3-dimethylaminopropyl)-2,5-diaza-1-gallacyclopentane; 2,5-dimethyl-1-(3-dimethylaminopropyl)-2,5-diaza-1-gallacyclohexane; 2,5-dimethyl-1-(3-dimethylaminopropyl)-2,5-diaza-1-gallacycloheptane; 2,5-dimethyl-1-(3-diethylaminopropyl)-2,5-diaza-1-gallacyclopentane; 2,5-dimethyl-1-(3-diethylaminopropyl)-2,5-diaza-1-gallacyclohexane; 2,5-dimethyl-1-(3-diethylaminopropyl)-2,5-diaza-1-gallacycloheptane; 2,5-diethyl-1-(3-dimethylaminopropyl)-2,5-diaza-1-gallacyclohexane; 2,5-diethyl-1-(3-dimethylaminopropyl)-2,5-diaza-1-gallacyclopentane; 2,5-diethyl-1-(3-dimethylaminopropyl)-2,5-diaza-1-gallacycloheptane; 2,5-diethyl-1-(4-dimethylaminobutyl)-2,5-diaza-1-gallacyclohexane; 2,5-diethyl-1-(4-dimethylaminobutyl)-2,5-diaza-1-gallacyclopentane; 2,5-diethyl-1-(4-dimethylaminobutyl)-2,5-diaza-1-gallacycloheptane; 2-ethyl-5-propyl-1-(4-dimethylaminobutyl)-2,5-diaza-1-gallacyclohexane; 2-ethyl-5-propyl-1-(4-dimethylaminobutyl)-2,5-diaza-1-gallacyclopentane; 2-ethyl-5-propyl-1-(4-dimethylaminobutyl)-2,5-diaza-1-gallacycloheptane; 2,5-dimethyl-1-(3-dimethylaminopropyl)-2,5-diaza-1-indacyclopentane; 2,5-dimethyl-1-(3-dimethylaminopropyl)-2,5-diaza-1-indacyclohexane; 2,5-dimethyl-1-(3-dimethylaminopropyl)-2,5-diaza-1-indacycloheptane; 2,5-dimethyl-1-(3-diethylaminopropyl)-2,5-diaza-1-indacyclopentane; 2,5-dimethyl-1-(3-diethylaminopropyl)-2,5-diaza-1-indacyclohexane; 2,5-dimethyl-1-(3-diethylaminopropyl)-2,5-diaza-1-indacycloheptane; 2,5-diethyl-1-(3-dimethylaminopropyl)-2,5-diaza-1-indacyclohexane; 2,5-diethyl-1-(3-dimethylaminopropyl)-2,5-diaza-1-indacyclopentane; 2,5-diethyl-1-(3-dimethylaminopropyl)-2,5-diaza-1-indacycloheptane; 2,5-diethyl-1-(3-dimethylaminobutyl)-2,5-diaza-1-indacyclohexane; 2,5-diethyl-1-(3-dimethylaminobutyl)-2,5-diaza-1-indacyclopentane; 2,5-diethyl-1-(3-dimethylaminobutyl)-2,5-diaza-1-indacycloheptane; 2-ethyl-5-propyl-1-(4-dimethylaminobutyl)-2,5-diaza-1indacyclohexane; 2-ethyl-5-propyl-1-(4-dimethylaminobutyl)-2,5-diaza-1-indacyclopentane and 2-ethyl-5-propyl-1-(4-dimethylaminobutyl)-2,5-diaza-1-indacycloheptane; or (B) the organoaluminum compound of Formula (IV) is selected from the group consisting of: 5-methyl-1-galla-5-azacyclooctane; 1,5-dimethyl-1-galla-5-azacyclooctane; 1,5-diethyl-1-galla-5-azacyclooctane; 1,5-dipropyl-1-galla-5-azacyclooctane; 1,5-dimethyl-1-alumina-5-azacyclooctane; 1,5-diethyl-1-alumina-5-azacyclooctane; 1,5-diisopropyl-1-alumina-5-azacyclooctane; 1,5-dibutyl-1-alumina-5-azacyclooctane; 1-methyl-5-ethyl-1-galla-5-azacyclooctane; 1-ethyl-5-methyl-1-alumina-5-azacyclooctane; 1,6-dimethyl-1-galla-6-azacyclodecane; 1,6-dimethyl-1-alumina-6-azacyclodecane; 1,6-diethyl-1-galla-6-azacyclodecane; 1,4-dimethyl-1-galla-4-azacyclohexane; 1,6-diethyl-1-alumina-6-azacyclodecane; 1-galla-5-azabicyclo[3.3.3]undecane; 1-galla-4-azabicyclo[2.2.2]octane; 1-alumina-5-azabicyclo[3.3.3]undecane; 1-alumina-4-azabicyclo[2.2.2]octane; 1-galla-6-azabicyclo[4.4.4]tetradecane; 1-alumina-6-azabicyclo[4.4.4]tetradecane; 1,5-dimethyl-1-inda-5-azacyclooctane; 1,5-diethyl-1-inda-5-azacyclooctane; 1,5-dipropyl-1-inda-5-azacyclooctane; 1,5-diisopropyl-1-inda-5-azacyclooctane; 1,5-dibutyl-1-inda-5-azacyclooctane; 1-methyl-5-ethyl-1-inda-5-azacyclooctane; 1-ethyl-5-propyl-1-inda-5-azacyclooctane; 1,6-dimethyl-1-inda-6-azacyclodecane; 1,6-diethyl-1-inda-6-azacyclodecane; 1,4-dimethyl-1-inda-4-azacyclohexane; 1-inda-5-azabicyclo[3.3.3]undecane; 1-inda-4-azabicyclo[2.2.2]octane; 1-methyl-5-cyclohexyl-1-inda-5-azacyclooctane; 1-methyl-5-phenyl-1-inda-5-azacyclooctane; 1-inda-6-azabicyclo[4.4.4]tetradecane; 1,6-dimethyl-1-galla-6-azacyclodecane; 1,6-diethyl-1-galla-6-azacyclodecane; 1,6-dipropyl-1-galla-6-azacyclodecane; 1,6-diisopropyl-1-galla-6-azacyclodecane; 1,6-dibutyl-1-galla-6-azacyclodecane; 1,6-di-tert-butyl-1-galla-6-azacyclodecane; 1,6-diisobutyl-1-galla-6-azacyclodecane; 1,4-dimethyl-1-galla-4-azacyclohexane; 1,4-diethyl-1-galla-4-azacyclohexane; 1,4-dipropyl-1-galla-4-azacyclohexane; 1,4-diisopropyl-1-galla-4-azacyclohexane; 1,4-dibutyl-1-galla-4-azacyclohexane; 1,4-diisobutyl-1-galla-4-azacyclohexane; 1,4-di-tert-butyl-1-galla-4-azacyclohexane; 1-methyl-5-ethyl-1-galla-5-azacyclooctane; 1-methyl-5-propyl-1-galla-5-azacyclooctane; 1-propyl-5-methyl-1-galla-5-azacyclooctane; 1-ethyl-5-methyl-1-galla-5-azacyclooctane; 1-ethyl-6-propyl-1-galla-6-azacyclodecane; 1-propyl-6-butyl-1-galla-6-azacyclodecane; 1-methyl-6-ethyl-1-galla-6-azacyclodecane; 1-methyl-4-ethyl-1-galla-4-azacyclohexane; 1-propyl-4-methyl-1-galla-4-azacyclohexane, and 1-ethyl-4-butyl-1-galla-4-azacyclohexane, substituted by $C_{5-7}$-cycloalkyl or phenyl; or (C) ethylaluminacyclopentane $((C_4H_8)AlC_2H_5)$, ring-substituted ethylaluminacyclopentanes $((RCH_2CH)_2C_4H_{(8-n)}AlC_2H_5)$ or ethylaluminacyclopentene $((RCH_2CH)_2C_4H_4AlC_2H_5)$, wherein R=$C_3H_7$, $C_5H_{11}$, or $C_8H_{17}$ and n=1 or 2.

7. The catalyst system of Paragraph 1 wherein the metallocene pre-catalyst compound is at least one transition metal compound represented by the formula:

$$Cp*qZL^xmL^ynL^3p$$

wherein:
(a) each Cp* independently represents anionic, delocalized, Π-bonded, cyclopentadienyl group, substituted cyclopentadienyl group, cyclopentadienyl derivative group, or substituted cyclopentadienyl derivative group, with two Cp* groups being optionally joined together by a moiety having up to 30 non-hydrogen atoms thereby forming a bridged structure;
(b) Z represents at least one transition metal selected from Ti, Zr, or Hf in the +2, +3 or +4 oxidation state, provided however that titanium in the +3 formal oxidation state is not an active metallocene polymerization catalyst;
(c) $L^x$ is divalent substituent of up to 50 non-hydrogen atoms that, when present, together with Cp* forms a metallocycle with Z;
(d) $L^y$ each occurrence independently represents an optional neutral Lewis base having up to 20 non-hydrogen atoms, or $L^y$ can represent a second transition metal compound of the same type as in said formula such that two metal Z centers are bridged by one or two $L^3$ groups;
(e) $L^3$ each occurrence independently represents a monovalent, anionic moiety having up to 50 non-hydrogen atoms, or a neutral, conjugated or non-conjugated diene Π-bonded to Z, optionally with two $L^3$ groups together constituting a divalent anionic moiety having both valences bound to Z, and optionally with $L^3$ and $L^y$ together constituting a moiety both covalently bound to Z and coordinated thereto by a Lewis base functionality;

(f) q is an integer of 1 or 2 and represents the number of Cp* groups bound to Z;

(g) m is an integer of 0 or 1 and represents the number of $L^x$ groups bound to Z;

(h) n is an integer of from 0 to 3; p is an integer of from 1 to 3;

(i) the sum of q+m+p being equal to the formal oxidation state of Z; and provided that where any one of $L^x$, $L^y$ and $L^3$ is hydrocarbyl containing, such L group is not Cp*.

8. The catalyst system of Paragraph 7 wherein $R^1$ each occurrence independently represents hydrogen, silyl, hydrocarbyl, or hydrocarbyloxy having up to 30 carbon or silicon atoms; and x is an integer of 1 to 8.

9. The catalyst system of any one of Paragraphs 7 or 8, wherein Cp* is selected from cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, or decahydroanthracenyl.

10. The catalyst system of Paragraph 9 wherein Cp* is substituted with at least one $C_1$ to $C_{10}$ hydrocarbyl group.

11. The catalyst system of any one of Paragraphs 7 and 8 wherein at least one $L^3$ group is selected from halogen or hydrocarbyl.

12. The catalyst system of any one of Paragraphs 7 and 8 wherein $L^3$ is selected from halogen or hydrogen, and c3 is at least one organometallic compound represented by the formula:

$$M(R^{12})s$$

wherein M is aluminum, $R^{12}$ is hydrocarbyl, and s is 3, intimately associated with said pre-catalyst in an amount sufficient to provide a molar ratio of organometallic compound to pre-catalyst of from about 1:1 to about 2000:1.

13. The catalyst system of Paragraph 7 wherein the metallocene pre-catalyst compound is selected from the group consisting of (Indenyl)$_2$ZrCl$_2$, (n-butylcyclopentadienyl)$_2$ZrCl$_2$, rac-bis(Indenyl)ethan-1,2-diyl-ZrCl$_2$, bis(1-n-butyl-3-methyl-cyclopentadienyl)zirconium dichloride, Rac-dimethylsilylbis(Indenyl)zirconium dichloride and Rac-dimethylsilylbis(2-methylindenyl)zirconium dichloride.

14. The catalyst system of Paragraph 7 wherein the molar ratio of titanium in the titanocene compound, before or after deactivation or substantial deactivation, to transition metal in the metallocene pre-catalyst compound or activated transition metal compound is about 0.0001 to about 100.

15. The catalyst system of Paragraph 6 wherein the ratio of Al to Ti present in the catalyst system is about 100:1 to greater than about 1:1.

16. The catalyst system of Paragraph 1 further comprising a fine particle carrier, wherein said catalyst system or at least one of said component (A), (B) or (C) is supported on the fine particle carrier.

17. The catalyst system of Paragraph 7 wherein the at least one olefin is prepolymerized on the fine particle carrier.

18. The catalyst system of Paragraph 1 wherein the polymerization-active metallocene compound or the pre-catalyst metallocene compound is or has been activated for olefin polymerization by contact with an alkylalumoxane.

19. A process for preparing an olefin polymerization catalyst system comprising bringing into contact in an inert solvent or diluent under an inert atmosphere:

(A) at least one metallocene pre-catalyst compound or polymerization-active metallocene compound;

(B) at least one titanium-containing metallocene compound;

and when (A) is a metallocene pre-catalyst compound (C) at least one compound selected from the group consisting of:
(c1) an organoaluminum oxy-compound;
(c2) an ionizing ionic compound; and
(c3) an organoaluminum compound;

provided however:

(I) the titanium-containing metallocene compound is inactive or substantially inactive for the polymerization of olefins; or (II) if the titanium-containing metallocene compound is active for olefin polymerization and thereby includes titanium which exhibits an oxidation state of $Ti^{+4}$, it is modified so that the titanium exhibits an oxidation state of $Ti^{+3}$ so as to inactivate or substantially inactivate the titanium-containing metallocene for olefin polymerization.

20. The process according to Paragraph 19 wherein the titanocene is deactivated using a concentration of at least one organometallic compound or organoaluminum compound sufficient to react with the titanium-containing metallocene at the temperature of reaction and for a time sufficient to deactivate or substantially deactivate the metallocene for olefin polymerization.

21. The process according to Paragraph 19 wherein the organoaluminum compound is a compound represented by Formula (I), Formula (II), Formula (III) or Formula (IV):

$$R^a{}_n AlX_{3-n} \qquad (I),$$

$$R^a{}_n AlY_{3-n} \qquad (II),$$

wherein:

$R^a$ is a hydrocarbon group of 1 to 12 carbon atoms, X is a halogen atom or hydrogen, and n is 1 to 3; and wherein Y is —OR$^b$ group, —OSiR$^c{}_3$ group, —OAlR$^d{}_2$ group, —NR$^e{}_2$ group, —SiR$^f{}_3$ group or —N(R$^g$)AlR$^h{}_2$ group; n is 1 to 2; R$^b$, R$^c$, R$^d$ and R$^h$ are each independently selected from the group consisting of methyl, ethyl, isopropyl, isobutyl, cyclohexyl, and phenyl; R$^e$ is selected from the group consisting of hydrogen, methyl, ethyl, isopropyl, phenyl, and trimethylsilyl; and R$^f$ and R$^g$ are each independently methyl or ethyl;

or an alumoxane compound represented by Formula (A) or Formula (B):

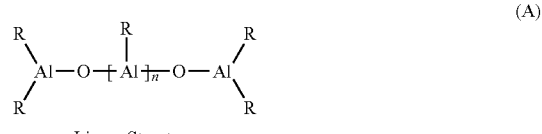

Linear Structure

Cyclic Structure wherein in the above formulas, R is a $C_1$ to about $C_{20}$ alkyl group; a $C_2$ to about $C_{20}$ alkenyl group; or a $C_7$ to about $C_{12}$ arylalkyl group; and n is an integer indicating a degree of polymerization and is about 2 to about 50;

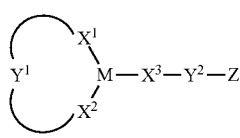

(III)

wherein M is B, Al, Ga or In;

$X^1$, $X^2$, $X^3$ are, in each case independently of one another, $CHR^1$, $NR^2$, O or S;

$Y^1$, $Y^2$ are, in each case independently of one another, $-(CH_2)_m-$, $O-(CH_2)_p-C_6H_4-(CH_2)_q-$, $O-(CH_2)_p-C_6H_6-(CH_2)_q-$, $O-(CH_2)_p-C_6H_8-(CH_2)_q$, $O-(CH_2)_p-C_6H_{10}-(CH_2)_q-$, $O-(CH_2)_p-C_5H_4-(CH_2)_q-$, $O-(CH_2)_p-C_5H_6-(CH_2)_q-$, $O-(CH_2)_p-C_5H_8-(CH_2)_q-$, or $-(CH_2)_p-CH=CH-(CH_2)_q-$;

Z is $NR^3$, $R^4$, $PR^3R^4$, $OR^5$ or $SR^5$;

$R^1$ is H, OH, halogen, $C_{1-6}$-alkyl or $C_{1-6}$-alkoxyl, $C_{5-7}$-cycloalkyl or phenyl;

$R^2$, $R^3$, $R^4$, $R^5$ are, in each case independently of one another, H or $C_{1-6}$-alkyl, $C_{5-7}$-cycloalkyl, phenyl, or wherein $R^3$ and $R^4$ together also form a $C_{4-6}$-alkylene bridge;

m is a number from 1 to 6;

p, q are, in each case independently of one another, a number from 0 to 2;

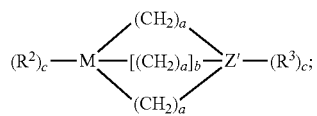

(IV)

wherein M, $R^2$ and $R^3$ are defined as above and in which Z' is N or P;

a is a number from 2 to 4; and b, c are the numbers 0 or 1 with b+c=1.

22. The process according to Paragraph 20 wherein the organometallic compound or organoaluminum compound comprises at least one beta hydrogen.

23. The process according to Paragraph 21 wherein:

(A) the organoaluminum compound of Formula (I) is selected from the group consisting of trimethylaluminum, triethylaluminum, triisopropylaluminum, triisobutylaluminum, trioctylaluminum, tri-2-ethylhexylaluminum, isoprenylaluminum, dimethylaluminum chloride, diethylaluminum chloride, diisopropylaluminum chloride, diisobutylaluminum chloride, dimethylaluminum bromide, methylaluminum sesquichloride, ethylaluminum sesquichloride, isopropylaluminum sesquichloride, butylaluminum sesquichloride, ethylaluminum sesquibromide, methylaluminum dichloride, ethylaluminum dichloride, isopropylaluminum dichloride, ethylaluminum dibromide, dimethylaluminum hydride, diethylaluminum hydride, dihydrophenylaluminum, diisopropylaluminum hydride, di-n-butylaluminum hydride, diisobutylaluminum hydride, diisohexylaluminum hydride, diphenylaluminum hydride, dicylohexylaluminum hydride, di-sec-heptylaluminum hydride and di-sec-nonylaluminum hydride; or (B) the organoaluminum compound of Formula (II) is selected from the group consisting of dimethylaluminum methoxide, diethylaluminum ethoxide and diisobutylaluminum methoxide, diethylaluminum phenoxide, $Et_2Al(OSiMe_3)$, $(iso-Bu)_2Al(OSiMe_3)$, $(iso-Bu)_2Al(OSiEt_3)$, $Et_2AlOAlEt_2$, $(iso-Bu)_2AlOAl(iso-Bu)_2$, $Me_2AlNEt_2$, $Et_2AlNHMe$, $Me_2AlNHEt$, $Et_2AlN(SiMe_3)_2$, $(iso-Bu)_2AlN(SiMe_3)_2$, $(iso-Bu)_2AlSiMe_3$, $Et_2AlN(Me)AlEt_2$ and $(iso-Bu)_2AlN(Et)Al(iso-Bu)_2$; or (C) the alumoxane compound of Formula (A) or Formula (B) is methylalumoxane or ethylalumoxane or isobutylalumoxane.

24. The process according to Paragraph 19 wherein:

(A) the organoaluminum compound of Formula (III) is selected from the group consisting of:

1-alumina-1-(4-dimethylaminobutyl)cyclobutane; 1-alumina-1-(2-dimethylaminoethyl)cyclopentane; 1-alumina-1-(2-diethylaminoethyl)cyclopentane; 1-alumina-1-(2-dipropylaminoethyl)cyclopentane; 1-alumina-1-(2-diisopropylaminoethyl)cyclopentane; 1-alumina-1-(2-dibutylaminoethyl)cyclopentane; 1-alumina-1-(3-dimethylaminopropyl)cyclopentane; 1-alumina-1-(3-diethylaminopropyl)cyclopentane; 1-alumina-1-(3-dipropylaminopropyl)cyclopentane; 1-alumina-1-(3-diisopropylaminopropyl)cyclopentane; 1-alumina-1-(3-dibutylaminopropyl)cyclopentane; 1-alumina-1-(4-dimethylaminobutyl)cyclopentane; 1-alumina-1-(4-diethylaminobutyl)cyclopentane; 1-alumina-1-(4-dipropylaminobutyl)cyclopentane; 1-alumina-1-(4-diisopropylaminobutyl)cyclopentane; 1-alumina-1-(4-dibutylaminobutyl)cyclopentane; 1-alumina-1-(3-dimethylaminopropyl)-2-methylcyclopentane; 1-alumina-1-(2-dimethylaminoethyl)cyclohexane; 1-alumina-1-(2-diethylaminoethyl)cyclohexane; 1-alumina-1-(2-dipropylaminoethyl)cyclohexane; 1-alumina-1-(2-diisopropylaminoethyl)cyclohexane; 1-alumina-1-(2-dibutylaminoethyl)cyclohexane; 1-alumina-1-(3-dimethylaminopropyl)cyclohexane; 1-alumina-1-(3-diethylaminopropyl)cyclohexane; 1-alumina-1-(3-dipropylaminopropyl)cyclohexane; 1-alumina-1-(3-diisopropylaminopropyl)cyclohexane; 1-alumina-1-(3-dibutylaminopropyl)cyclohexane; 1-alumina-1-(4-dimethylaminobutyl)cyclohexane; 1-alumina-1-(4-diethylaminobutyl)cyclohexane; 1-alumina-1-(4-dipropylaminobutyl)cyclohexane; 1-alumina-1-(4-diisopropylaminobutyl)cyclohexane; 1-alumina-1-(4-dibutylaminobutyl)cyclohexane; 1-alumina-1-(o-diethylaminobenzyl)cyclopentane; 1-alumina-1-(o-diethylaminobenzyl)cyclohexane; 1-alumina-1-(o-diisopropylaminobenzyl)cyclohexane; 1-alumina-1-(2-o-dimethylaminophenylethyl)cyclopentane; 1-alumina-1-(2-o-diethylaminophenylethyl)cyclobutane; 1-galla-1-(3-dimethylaminopropyl)cyclobutane; 1-galla-1-(2-dimethylaminoethyl)cyclopentane; 1-galla-1-(3-dimethylaminopropyl)cyclopentane; 1-galla-1-(2-dimethylaminoethyl)cyclopentane; 1-galla-1-(2-diethylaminoethyl)cyclopentane; 1-galla-1-(2-dipropylaminoethyl)cyclopentane; 1-galla-1-(2-diisopropylaminoethyl)cyclopentane; 1-galla-1-(2-dibutylaminoethyl)cyclopentane; 1-galla-1-(3-diethylaminopropyl)cyclopentane; 1-galla-1-(3-dipropylaminopropyl)cyclopentane; 1-galla-1-(3-diisopropylaminopropyl)cyclopentane; 1-galla-1-(3-dibutylaminopropyl)cyclopentane; 1-galla-1-(4- dimethylaminobutyl)cyclopentane; 1-galla-1-(4-diethylaminobutyl)cyclopentane; 1-galla-1-(4-dipropylaminobutyl)cyclopentane; 1-galla-1-(4-isopropylaminobutyl)cyclopentane; 1-galla-1-(4-dibutylaminobutyl)cyclopentane; 1-galla-1-(3-dimethylaminopropyl)cyclohexane; 1-galla-1-(3-diethylaminopropyl)cyclohexane; 1-galla-1-(3-dipropylaminopropyl)cyclohexane; 1-galla-1-(3-diisopropylaminopropyl)cyclohexane; 1-galla-1-(3-dibutylaminopropyl)cyclohexane; 1-galla-1-(2-dimethylaminoethyl)cyclohexane; 1-galla-1-(2-diethylaminoethyl)cyclohexane; 1-galla-1-(2-dipropylaminoethyl)cyclohexane; 1-galla-1-(2-diisopropylaminoethyl)cyclohexane; 1-galla-1-(2-dibutylaminoethyl)cyclohexane; 1-galla-1-(4-dimethylaminobutyl)cyclohexane; 1-galla-1-(4-diethylaminobutyl)cyclohexane; 1-galla-1-(4-dipropylaminobutyl)cyclohexane; 1-galla-1-(4-isopropylaminobutyl)cyclohexane; 1-galla-1-(4-dibutylaminobutyl)cyclohexane; 1-galla-1-(o-dimethylaminobenzyl)cyclobutane; 1-galla-1-(o-dimethylaminobenzyl)cyclopentane; 1-galla-1-(o-dimethylaminobenzyl)cyclohexane; 1-galla-1-(o-diethylaminobenzyl)cyclohexane; 1-galla-1-(o-dipropylaminobenzyl)cycloheptane; 1-inda-1-(2-diethylaminoethyl)cyclobutane; 1-inda-1-(2-dimethylaminoethyl)cyclopentane; 1-inda-1-(2-diethylaminoethyl)cyclopentane; 1-inda-1-(2-dipropylaminoethyl)cyclopentane; 1-inda-1-(2-diisopropylaminoethyl)cyclopentane; 1-inda-1-(2-dibutylaminoethyl)cyclopentane; 1-inda-1-(3-dimethylaminopropyl)cyclopentane; 1-inda-1-(3-diethylaminopropyl)cyclopentane; 1-inda-1-(3-dipropylaminopropyl)cyclopentane; 1-inda-1-(3-diisopropylaminopropyl)cyclopentane; 1-inda-1-(3-dibutylaminopropyl)cyclopentane; 1-inda-1-(4-dimethylaminobutyl)cyclopentane; 1-inda-1-(4-diethylaminobutyl)cyclopentane; 1-inda-1-(4-dipropylaminobutyl)cyclopentane; 1-inda-1-(4-diisopropylaminobutyl)cyclopentane; 1-inda-1-(4-dibutylaminobutyl)cyclopentane; 1-inda-1-(2-dimethylaminoethyl)cyclohexane; 1-inda-1-(2-diethylaminoethyl)cyclohexane; 1-inda-1-(2-dipropylaminoethyl)cyclohexane; 1-inda-1-(2-diisopropylaminoethyl)cyclohexane; 1-inda-1-(2-dibutylaminoethyl)cyclohexane; 1-inda-1-(3-dimethylaminopropyl)cyclohexane; 1-inda-1-(3-diethylaminopropyl)cyclohexane; 1-inda-1-(3-dipropylaminopropyl)cyclohexane; 1-inda-1-(3-diisopropylaminopropyl)cyclohexane; 1-inda-1-(3-dibutylaminopropyl)cyclohexane; 1-inda-1-(4-dimethylaminobutyl)cyclohexane; 1-inda-1-(4-diethylaminobutyl)cyclohexane; 1-inda-1-(4-dipropylaminobutyl)cyclohexane; 1-inda-1-(4-diisopropylaminobutyl)cyclohexane; 1-inda-1-(4-dibutylaminobutyl)cyclohexane; 1-inda-1-(o-diisopropylaminobenzyl)cyclobutane; 1-inda-1-(o-dimethylaminobenzyl)cyclopentane; 1-inda-1-(o-dibutylaminobenzyl)cyclopentane; 1-inda-1-(o-dimethylaminobenzyl)cyclohexane; 1-inda-1-(o-diethylaminobenzyl)cyclohexane; 1-inda-1-(o-dimethylaminobenzyl)cyclooctane; 2,5-dimethyl-1-(3-dimethylaminopropyl)-2,5-diaza-1-aluminacyclopentane; 2,5-dimethyl-1-(3-dimethylaminopropyl)-2,5-diaza-1-aluminacyclohexane; 2,5-dimethyl-1-(3-dimethylaminopropyl)-2,5-diaza-1-aluminacycloheptane; 2,5-dimethyl-1-(3-dimethylaminopropyl)-2,5-diaza-1-aluminacyclopentane; 2,5-dimethyl-1-(3-diethylaminopropyl)-2,5-diaza-1-aluminacyclohexane; 2,5-dimethyl-1-(3-diethylaminopropyl)-2,5-diaza-1-aluminacycloheptane; 2,5-diethyl-1-(3-dimethylaminopropyl)-2,5-diaza-1-aluminacyclohexane; 2,5-diethyl-1-(3-dimethylaminopropyl)-2,5-diaza-1-aluminacyclopentane, 2,5-diethyl-1-(4-dimethylaminobutyl)-2,5-diaza-1-aluminacyclohexane; 2,5-diethyl-1-(4-dimethylaminobutyl)-2,5-diaza-1-aluminacyclopentane; 2,5-diethyl-1-(4-dimethylaminobutyl)-2,5-diaza-1-aluminacycloheptane; 2-ethyl-5-propyl-1-(4-dimethylaminobutyl)-2,5-diaza-1-aluminacyclohexane; 2-ethyl-5-propyl-1-(4-dimethylaminobutyl)-2,5-diaza-1-aluminacyclopentane; 2-ethyl-5-propyl-1-(4-dimethylaminobutyl)-2,5-diaza-1-aluminacycloheptane; 2,5-dimethyl-1-(3-dimethylaminopropyl)-2,5-diaza-1-gallacyclopentane; 2,5-dimethyl-1-(3-dimethylaminopropyl)-2,5-diaza-1-gallacyclohexane; 2,5-dimethyl-1-(3-dimethylaminopropyl)-2,5-diaza-1-gallacycloheptane; 2,5-dimethyl-1-(3-diethylaminopropyl)-2,5-diaza-1-gallacyclopentane; 2,5-dimethyl-1-(3-diethylaminopropyl)-2,5-diaza-1-gallacyclohexane; 2,5-dimethyl-1-(3-diethylaminopropyl)-2,5-diaza-1-gallacycloheptane; 2,5-diethyl-1-(3-dimethylaminopropyl)-2,5-diaza-1-gallacyclohexane; 2,5-diethyl-1-(3-dimethylaminopropyl)-2,5-diaza-1-gallacyclopentane; 2,5-diethyl-1-(3-dimethylaminopropyl)-2,5-diaza-1-gallacycloheptane; 2,5-diethyl-1-(4-dimethylaminobutyl)-2,5-diaza-1-gallacyclohexane; 2,5-diethyl-1-(4-dimethylaminobutyl)-2,5-diaza-1-gallacyclopentane; 2,5-diethyl-1-(4-dimethylaminobutyl)-2,5-diaza-1-gallacycloheptane; 2-ethyl-5-propyl-1-(4-dimethylaminobutyl)-2,5-diaza-1-gallacyclohexane; 2-ethyl-5-propyl-1-(4-dimethylaminobutyl)-2,5-diaza-1-gallacyclopentane; 2-ethyl-5-propyl-1-(4-dimethylaminobutyl)-2,5-diaza-1-gallacycloheptane; 2,5-dimethyl-1-(3-dimethylaminopropyl)-2,5-diaza-1-indacyclopentane; 2,5-dimethyl-1-(3-dimethylaminopropyl)-2,5-diaza-1-indacyclohexane; 2,5-dimethyl-1-(3-dimethylaminopropyl)-2,5-diaza-1-indacycloheptane; 2,5-dimethyl-1-(3-diethylaminopropyl)-2,5-diaza-1-indacyclopentane; 2,5-dimethyl-1-(3-diethylaminopropyl)-2,5-diaza-1-indacyclohexane; 2,5-dimethyl-1-(3-diethylaminopropyl)-2,5-diaza-1-indacycloheptane; 2,5-diethyl-1-(3-dimethylaminopropyl)-2,5-diaza-1-indacyclohexane; 2,5-diethyl-1-(3-dimethylaminopropyl)-2,5-diaza-1-indacyclopentane; 2,5-diethyl-1-(3-dimethylaminopropyl)-2,5-diaza-1-indacycloheptane; 2,5-diethyl-1-(3-dimethylaminobutyl)-2,5-diaza-1-indacyclohexane; 2,5-diethyl-1-(3-dimethylaminobutyl)-2,5-diaza-1-indacyclopentane; 2,5-diethyl-1-(3-dimethylaminobutyl)-2,5-diaza-1-indacycloheptane; 2-ethyl-5-propyl-1-(4-dimethylaminobutyl)-2,5-diaza-1indacyclohexane; 2-ethyl-5-propyl-1-(4-dimethylaminobutyl)-2,5-diaza-1-indacyclopentane and 2-ethyl-5-propyl-1-(4-dimethylaminobutyl)-2,5-diaza-1-indacycloheptane; or (B) the organoaluminum compound of Formula (IV) is selected from the group consisting of: 5-methyl-1-galla-5-azacyclooctane; 1,5-dimethyl-1-galla-5-azacyclooctane; 1,5-diethyl-1-galla-5-azacyclooctane; 1,5-dipropyl-1-galla-5-azacyclooctane; 1,5-dimethyl-1-alumina-5-azacyclooctane; 1,5-diethyl-1-alumina-5-azacyclooctane; 1,5-diisopropyl-1-alumina-5-azacyclooctane; 1,5-dibutyl-1-alumina-5-azacyclooctane; 1-methyl-5-ethyl-1-galla-5-azacyclooctane; 1-ethyl-5-methyl-1-alumina-5-azacyclooctane; 1,6-dimethyl-1-galla-6-azacyclodecane; 1,6-dimethyl-1-alumina-6- azacyclodecane; 1,6-diethyl-1-galla-6-azacyclodecane; 1,4-dimethyl-1-galla-4-azacyclohexane; 1,6-diethyl-1-alumina-6-azacyclodecane; 1-galla-5-azabicyclo[3.3.3]undecane; 1-galla-4-azabicyclo[2.2.2]octane; 1-alumina-5-azabicyclo[3.3.3]undecane; 1-alumina-4-azabicyclo[2.2.2]octane; 1-galla-6-azabicyclo[4.4.4]tetradecane; 1-alumina-6-azabicyclo[4.4.4]tetradecane; 1,5-dimethyl-1-inda-5-azacyclooctane; 1,5-diethyl-1-inda-5-azacyclooctane; 1,5-dipropyl-1-inda-5-azacyclooctane; 1,5-diisopropyl-1-inda-5-azacyclooctane; 1,5-dibutyl-1-inda-5-azacyclooctane; 1-methyl-5-ethyl-1-inda-5-azacyclooctane; 1-ethyl-5-propyl-1-inda-5-azacyclooctane; 1,6-dimethyl-1-inda-6-azacyclodecane; 1,6-diethyl-1-inda-6-azacyclodecane; 1,4-dimethyl-1-inda-4-azacyclohexane; 1-inda-5-azabicyclo[3.3.3]undecane; 1-inda-4-azabicyclo[2.2.2]octane; 1-methyl-5-cyclohexyl-1-inda-5-azacyclooctane; 1-methyl-5-phenyl-1-inda-5-azacyclooctane; 1-inda-6-azabicyclo[4.4.4]tetradecane; 1,6-dimethyl-1-galla-6-azacyclodecane; 1,6-diethyl-1-galla-6-azacyclodecane; 1,6-dipropyl-1-galla-6-azacyclodecane; 1,6-diisopropyl-1-galla-6-azacyclodecane; 1,6-dibutyl-1-galla-6-azacyclodecane; 1,6-di-tert-butyl-1-galla-6-azacyclodecane; 1,6-diisobutyl-1-galla-6-azacyclodecane; 1,4-dimethyl-1-galla-4-azacyclohexane; 1,4-diethyl-1-galla-4-azacyclohexane; 1,4-dipropyl-1-galla-4-azacyclohexane; 1,4-diisopropyl-1-galla-4-azacyclohexane; 1,4-dibutyl-1-galla-4-azacyclohexane; 1,4-diisobutyl-1-galla-4-azacyclohexane; 1,4-di-tert-butyl-1-galla-4-azacyclohexane; 1-methyl-5-ethyl-1-galla-5-azacyclooctane; 1-methyl-5-propyl-1-galla-5-azacyclooctane; 1-propyl-5-methyl-1-galla-5-azacyclooctane; 1-ethyl-5-methyl-1-galla-5-azacyclooctane; 1-ethyl-6-propyl-1-galla-6-azacyclodecane; 1-propyl-6-butyl-1-galla-6-azacyclodecane; 1-methyl-6-ethyl-1-galla-6-azacyclodecane; 1-methyl-4-ethyl-1-galla-4-azacyclohexane; 1-propyl-4-methyl-1-galla-4-azacyclohexane, and 1-ethyl-4-butyl-1-galla-4-azacyclohexane, substituted by $C_{5-7}$-cycloalkyl or phenyl; or (C) ethylaluminacyclopentane $((C_4H_8)AlC_2H_5)$, ring-substituted ethylaluminacyclopentanes $((RCH_2CH)_nC_4H_{(8-n)}AlC_2H_5)$ or ethylaluminacyclopentene $((RCH_2CH)_2C_4H_4AlC_2H_5)$, wherein R=$C_3H_7$, $C_5H_{11}$, or $C_8H_{17}$ and n=1 or 2.

25. The process according to Paragraph 19 wherein the metallocene pre-catalyst compound is at least one transition metal compound represented by the formula:

$$Cp*qZL^x{}_mL^y{}_nL^3{}_p$$

wherein:
(a) each Cp* independently represents anionic, delocalized, π-bonded, cyclopentadienyl group, substituted cyclopentadienyl group, cyclopentadienyl derivative group, or substituted cyclopentadienyl derivative group, with two Cp* groups being optionally joined together by a moiety having up to 30 non-hydrogen atoms thereby forming a bridged structure;
(b) Z represents at least one transition metal selected from Ti, Zr, or Hf in the +2, +3 or +4 oxidation state, provided however that titanium in the +3 formal oxidation state is not an active metallocene polymerization catalyst;
(c) $L^x$ is divalent substituent of up to 50 non-hydrogen atoms that, when present, together with Cp* forms a metallocycle with Z;
(d) $L^y$ each occurrence independently represents an optional neutral Lewis base having up to 20 non-hydrogen atoms, or $L^y$ can represent a second transition metal compound of the same type as in said formula such that two metal Z centers are bridged by one or two $L^3$ groups;
(e) $L^3$ each occurrence independently represents a monovalent, anionic moiety having up to 50 non-hydrogen atoms, or a neutral, conjugated or non-conjugated diene π-bonded to Z, optionally with two $L^3$ groups together constituting a divalent anionic moiety having both valences bound to Z, and optionally with $L^3$ and $L^y$ together constituting a moiety both covalently bound to Z and coordinated thereto by a Lewis base functionality;
(f) q is an integer of 1 or 2 and represents the number of Cp* groups bound to Z;
(g) m is an integer of 0 or 1 and represents the number of $L^x$ groups bound to Z;
(h) n is an integer of from 0 to 3; p is an integer of from 1 to 3;
(i) the sum of q+m+p being equal to the formal oxidation state of Z; and provided that where any one of $L^x$, $L^y$ and $L^3$ is hydrocarbyl containing, such L group is not Cp*.

26. The process according to Paragraph 25 wherein $R^1$ each occurrence independently represents hydrogen, silyl, hydrocarbyl, or hydrocarbyloxy having up to 30 carbon or silicon atoms; and x is an integer of 1 to 8.

27. The process according to any one of Paragraphs or 26, wherein Cp* is selected from cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, or decahydroanthracenyl.

28. The process according to Paragraph 27, wherein Cp* is substituted with at least one C1 to C10 hydrocarbyl group.

29. The process according to any one of Paragraphs 25 or 26 wherein at least one $L^3$ group is selected from halogen or hydrocarbyl.

30. The process according to any one of Paragraphs 25 or 26 wherein $L^3$ is selected from halogen or hydrogen, and c3 is at least one organometallic compound represented by the formula:

$$M(R^{12})_s$$

wherein M is aluminum, $R^{12}$ is hydrocarbyl, and s is 3, intimately associated with said pre-catalyst in an amount sufficient to provide a molar ratio of organometallic compound to pre-catalyst of from about 1:1 to about 2000:1.

31. The process according to Paragraph 25 wherein the metallocene pre-catalyst compound is selected from the group consisting of $(Indenyl)_2ZrCl_2$, $(n-butylcyclopentadienyl)_2ZrCl_2$, rac-bis(Indenyl)ethan-1,2-diyl-$ZrCl_2$, bis(1-n-butyl-3-methyl-cyclopentadienyl)zirconium dichloride, Rac-dimethylsilylbis(Indenyl)zirconium dichloride and Rac-dimethylsilylbis(2-methylindenyl)zirconium dichloride.

32. The process according to Paragraph 25 wherein the molar ratio of titanium in the titanocene compound, before or after deactivation or substantial deactivation, to transition metal in the metallocene pre-catalyst compound or activated transition metal compound is about 0.0001 to about 100.

33. The process according to Paragraph 19 wherein the ratio of Al to Ti present in the catalyst system is about 100:1 to greater than about 1:1.

34. The process according to Paragraph 19 further comprising contacting (A), and ((B) or (C)) in the presence of a fine particle carrier.

35. The process according to Paragraph 34, wherein at least one olefin is prepolymerized on the fine particle carrier.

36. The process according to Paragraph 23 or Paragraph 34 wherein the solvent or diluent is thereafter removed.

37. The process according to Paragraph 34 wherein the support carrier comprises: (i) at least one porous inorganic oxide selected from the group consisting of $SiO_2$, $Al_2O_3$, MgO, ZrO$_2$, TiO$_2$, B$_2$O$_3$, CaO, ZnO, BaO, ThO$_2$, V$_2$O$_5$, and Cr$_2$O$_3$; or (ii) catalyst support-activator agglomerate particles comprising a composite of: (A) at least one inorganic oxide selected from SiO$_2$, Al$_2$O$_3$, MgO, AlPO$_4$, TiO$_2$, ZrO$_2$, or Cr$_2$O$_3$; and (B) at least one ion containing layered material having interspaces between the layers, said support-activator having sufficient Lewis acidity to activate the pre-catalyst when the pre-catalyst is in contact with the support-activator, the layered material having a cationic component and an anionic component, wherein the cationic component is present within the interspace of the layered material, the layered material being intimately dispersed with the inorganic oxide component within the agglomerate particles.

38. The process according to Paragraph 37 wherein Cp* is selected from cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, or decahydroanthracenyl.

39. The process of Paragraph 19 wherein the polymerization-active metallocene compound or the pre-catalyst metallocene compound are activated for olefin polymerization by contact with an alkylalumoxane.

40. A process for homopolymerizing an olefin, alpha-olefin or cyclic olefin, or copolymerizing an olefin, alpha-olefin or cyclic olefin with at least one C$_3$ to C$_{20}$ alpha-olefin monomer and optionally with at least one polymerizable diene to form a polymer under olefin polymerization conditions and using the catalyst according to Paragraph 1 or the catalyst produced according to Paragraph 19.

41. The process according to Paragraph 40 wherein the catalyst is selected from the group consisting of metallocene complexes.

42. The process according to paragraph 40 wherein the monomers are selected from the group consisting of ethylene, propylene, butene-1, pentene-1,4-methyl-pentene-1, hexene-1, octene-1, decene-1,3-methyl-pentene-1, norbornene, norbornadiene, vinyl norbornene, ethylidene norbornene, and 3,5,5-trimethyl-hexene-1.

43. The process according to paragraph 40 wherein the monomers are further selected from a diene wherein the diene is selected from the group consisting of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, cyclopentadiene, vinylnorbornene, norbornadiene, ethylidene norbornene, divinylbenzene, and dicyclopentadiene.

44. The process according to paragraph 43 wherein the diene is present at about 0.00001 weight % to about 1.0 weight %, based upon the total weight of the polymer composition.

45. The process according to paragraph 40 wherein at least one catalyst component is supported on a carrier.

46. The process according to paragraph 40 wherein the process is a slurry process.

47. The process according to paragraph 40 wherein the process is a gas phase process.

48. The process according to paragraph 40 wherein the process is a bulk phase process.

49. A process for producing a polyolefin using the catalyst system of Paragraph 1 wherein the polymer exhibits: (I) a molecular weight distribution as measured by Mw/Mn, wherein Mw is weight average molecular weight and Mn is number average molecular weight, of greater than about 1.75 and less than about 3; and (II) a melt index (MI), measured according to ASTM D 1238, Condition E, of less than 1.0.

A polymerization process comprising contacting at least one olefin monomer under polymerization conditions with a catalyst system comprising: (I) as a pre-catalyst, at least one metallocene transition metal compound capable of: (i) being activated upon contact with an organometallic compound co-catalyst or a support-activator; wherein said transition metal is at least one metal selected from the group consisting of Groups 3, 4 and the Lanthanide metals of the Periodic Table of Elements; in intimate contact with (II): (i) a catalyst support; or (ii) catalyst support-activator agglomerate particles, wherein (i) comprises (A) at least one inorganic oxide selected from SiO$_2$, Al$_2$O$_3$, MgO, AlPO$_4$, TiO$_2$, ZrO$_2$, or Cr$_2$O$_3$; and (ii) comprises a composite of: (A) at least one inorganic oxide selected from SiO$_2$, Al$_2$O$_3$, MgO, AlPO$_4$, TiO$_2$, ZrO$_2$, or Cr$_2$O$_3$; and (B) at least one ion containing layered material having interspaces between the layers, said support-activator having sufficient Lewis acidity to activate the pre-catalyst when the pre-catalyst is in contact with the support-activator, the layered material having a cationic component and an anionic component, wherein the cationic component is present within the interspace of the layered material, the layered material being intimately dispersed with the inorganic oxide component within the agglomerate particles; and (III) a titanocene compound which is inactive or substantially inactive towards the polymerization of the olefin monomer; wherein the titanocene has been inactivated by contacting it with an alkyl organoaluminum or alumoxane compound and each of (I), (II) and (III) are present in an amount sufficient to provide a catalyst system having the ability to polymerize at least one olefin monomer.

For purposes of the present invention the following terms shall have the indicated meaning:

The term "about" when used as a modifier for, or in conjunction with, a variable, characteristic or condition is intended to convey that the numbers, ranges, characteristics and conditions disclosed herein are flexible and that practice of the present invention by those skilled in the art using temperatures, rates, times, concentrations, carbon numbers, amounts, contents, properties such as size, density, surface area, etc., that are outside of the stated range or different from a single stated value, will achieve the desired result or results as described in the application, namely, an olefin polymerization catalyst or catalyst system comprising at least one titanium-containing metallocene compound which is inactive or substantially inactive for the polymerization of olefins.

"Comprise" or "comprising": Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct within the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited elements or methods steps.

"Group" or "Groups": Any reference to a Group or Groups of the Periodic Table of the Elements shall be to the Group or Groups as reflected in the Periodic Table of Elements using the IUPAC system for numbering groups of elements as Groups 1-18.

"Periodic Table": All references to the Periodic Table of the Elements herein refers to the Periodic Table of the Elements, published by the International Union of Pure and Applied Chemistry (IUPAC), published on-line at http://old.iupac.org/reports/periodic_table/; version date 22 Jun. 2007.

"Substantially": Unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met. In particular, see above for use of the term "substantially" with respect to deactivation of a titanocene pre-catalyst.

All documents described herein are incorporated by reference herein, including any patent applications and/or testing procedures. The principles, preferred embodiments, and modes of operation of the present invention have been described in the foregoing specification.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An olefin polymerization catalyst or catalyst system comprising a mixture, contact product, reaction product or complex comprising as elements or components:
   (A) at least one metallocene pre-catalyst compound or polymerization-active metallocene compound;
   (B) at least one titanium-containing metallocene compound;
   and when (A) is a metallocene pre-catalyst compound,
   (C) at least one compound selected from the group consisting of:
      (c1) an organoaluminum oxy-compound;
      (c2) an ionizing ionic compound; and
      (c3) an organoaluminum compound;
   provided however:
   (I) the titanium-containing metallocene compound is inactive or substantially inactive for the polymerization of olefins; or
   (II) when the titanium containing metallocene compound is initially active or capable of being activated for olefin polymerization and thus includes titanium which exhibits an oxidation state of $Ti^{+4}$, the titanium present in the compound is reduced to an oxidation state of $Ti^{+3}$ so that the titanium containing metallocene compound is inactive or substantially inactive prior to or concurrently with the use of the catalyst system for olefin polymerization;
   wherein substantially inactive means that the titanium compound will produce less than about 50% of the amount of polyolefin compared to its polymerization-active counterpart.

2. The catalyst system of claim 1 wherein the inactive or substantially inactive titanium-containing metallocene compound comprises the reaction product or contact product of a polymerization active titanium-containing metallocene compound and at least one (1) organometallic compound, (2) organoaluminum compound or (3) alumoxane compound.

3. The catalyst system of claim 2 wherein:
(1) the organometallic compound is a compound represented by Formula (III) or Formula (IV):

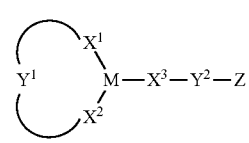

(III)

wherein M is B, Al, Ga or In;

$X^1$, $X^2$, $X^3$ are, in each case independently of one another, $CHR^1$, $NR^2$, O or S;

$Y^1$, $Y^2$ are, in each case independently of one another, —$(CH_2)_m$—, O—$(CH_2)_p$—$C_6H_4$—$(CH_2)_q$—, O—$(CH_2)_p$—$C_6H_6$—$(CH_2)_q$—, O—$(CH_2)_p$—$C_6H_8$—$(CH_2)_q$—, O—$(CH_2)_p$—$C_6H_{10}$—$(CH_2)_q$—, O—$(CH_2)_p$—$C_5H_4$—$(CH_2)_q$—, O—$(CH_2)_p$—$C_5H_6$—$(CH_2)_q$—, O—$(CH_2)_p$—$C_5H_8$—$(CH_2)_q$—, or —$(CH_2)_p$—CH=CH—$(CH_2)_q$—;

Z is $NR^3R^4$, $PR^3R^4$, $OR^5$ or $SR^5$;

$R^1$ is H, OH, halogen, $C_{1-6}$-alkyl or $C_{1-6}$-alkoxyl, $C_{5-7}$-cycloalkyl or phenyl;

$R^2$, $R^3$, $R^4$, $R^5$ are, in each case independently of one another, H or $C_{1-6}$-alkyl, $C_{5-7}$-cycloalkyl, phenyl, or wherein $R^3$ and $R^4$ together also form a $C_{4-6}$-alkylene bridge;

m is a number from 1 to 6;

p, q are, in each case independently of one another, a number from 0 to 2;

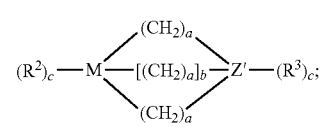

(IV)

wherein M, $R^2$ and $R^3$ are defined as above and in which Z' is N or P;

a is a number from 2 to 4; and b, c are the numbers 0 or 1 with b+c=1;

(2) the organoaluminum compound is a compound represented by Formula (I) or Formula (II):

(I),

(II), wherein:

$R^a$ is a hydrocarbon group of 1 to 12 carbon atoms, X is a halogen atom or hydrogen, and n is 1 to 3; and wherein Y is —$OR^b$ group, —$OSiR^c_3$ group, —$OAlR^d_2$ group, —$NR^e_2$ group, —$SiR^f_3$ group or —$N(R^g)AlR^h_2$ group; n is 1 to 2; $R^b$, $R^c$, $R^d$ and $R^h$ are each independently selected from the group consisting of methyl, ethyl, isopropyl, isobutyl, cyclohexyl, and phenyl; $R^e$ is selected from the group consisting of hydrogen, methyl, ethyl, isopropyl, phenyl, and trimethylsilyl; and $R^f$ and $R^g$ are each independently methyl or ethyl;

(3) the alumoxane compound is a compound represented by Formula (A) or Formula (B):

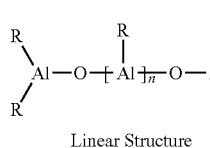

Linear Structure

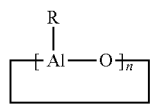

Cyclic Structure wherein in the above formulas, R is a $C_1$ to about $C_{20}$ alkyl group; a $C_2$ to about $C_{20}$ alkenyl group; or a $C_7$ to about $C_{12}$ arylalkyl group; and n is an integer indicating a degree of polymerization and is about 2 to about 50.

4. The catalyst system of claim 3 wherein:
(A) the organoaluminum compound of Formula (I) is selected from the group consisting of trimethylaluminum, triethylaluminum, triisopropylaluminum, triisobutylaluminum, trioctylaluminum, tri-2-ethylhexylaluminum, isoprenylaluminum, dimethylaluminum chloride, diethylaluminum chloride, diisopropylaluminum chloride, diisobutylaluminum chloride, dimethylaluminum bromide, methylaluminum sesquichoride, ethylaluminum sesquichloride, isopropylaluminum sesquichloride, butylaluminum sesquichloride, ethylaluminum sesquibromide, methylaluminum dichloride, ethylaluminum dichloride, isopropylaluminum dichloride, ethylaluminum dibromide, dimethylaluminum hydride, diethylaluminum hydride, dihydrophenylaluminum, diisopropylaluminum hydride, di-n-butylaluminum hydride, diisobutylaluminum hydride, diisohexylaluminum hydride, diphenylalunimum hydride, dicylohexylaluminum hydride, di-sec-heptylaluminum hydride and di-sec-nonylaluminum hydride;
(B) the organoaluminum compound of Formula (II) is selected from the group consisting of dimethylaluminum methoxide, diethylaluminum ethoxide and diisobutylaluminum methoxide, diethylaluminum phenoxide, $Et_2Al(OSiMe_3)$, $(iso-Bu)_2Al(OSiMe_3)$, $(iso-Bu)_2Al(OSiEt_3)$, $Et_2AlOAlEt_2$, $(iso-Bu)_2AlOAl(iso-Bu)_2$, $Me_2AlNEt_2$, $Et_2AlNHMe$, $Me_2AlNHEt$, $Et_2AlN(SiMe_3)_2$, $(iso-Bu)_2AlN(SiMe_3)_2$, $(iso-Bu)_2AlSiMe_3$, $Et_2AlN(Me)AlEt_2$ and $(iso-Bu)_2AlN(Et)Al(iso-Bu)_2$;
(C) the alumoxane compound of Formula (A) or Formula (B) is methylalumoxane or ethylalumoxane or isobutylalumoxane;
(D) the organometallic compound of Formula (III) is selected from the group consisting of:
1-alumina-1-(4-dimethylaminobutyl)cyclobutane; 1-alumina-1-(2-dimethylaminoethyl)cyclopentane; 1-alumina-1-(2-diethylaminoethyl)cyclopentane; 1-alumina-1-(2-dipropylaminoethyl)cyclopentane;
1-alumina-1-(2-diisopropylaminoethyl)cyclopentane;
1-alumina-1-(2-dibutylaminoethyl)cyclopentane;
1-alumina-1-(3-dimethylaminopropyl)cyclopentane;
1-alumina-1-(3-diethylaminopropyl)cyclopentane;
1-alumina-1-(3-dipropylaminopropyl)cyclopentane;
1-alumina-1-(3-diisopropylaminopropyl)cyclopentane;
1-alumina-1-(3-dibutylaminopropyl)cyclopentane;
1-alumina-1-(4-dimethylaminobutyl)cyclopentane;
1-alumina-1-(4-diethylaminobutyl)cyclopentane;
1-alumina-1-(4-dipropylaminobutyl)cyclopentane;
1-alumina-1-(4-diisopropylaminobutyl)cyclopentane;
1-alumina-1-(4-dibutylaminobutyl)cyclopentane;
1-alumina-1-(3-dimetylaminopropyl) -2-methylcyclopentane; 1-alumina-1-(2-dimethylaminoethyl)cyclohexane; 1-alumina-1-(2-diethylaminoethyl)cyclohexane; 1-alumina-1-(2-dipropylaminoethyl)cyclohexane; 1-alumina-1-(2-diisopropylaminoethyl)cyclohexane; 1-alumina-1-(2-dibutylaminoethyl)cyclohexane; 1-alumina-1-(3-dimethylaminopropyl)cyclohexane; 1-alumina-1-(3-diethylaminopropyl)cyclohexane; 1-alumina-1-(3-dipropylaminopropyl)cyclohexane; 1-alumina-1-(3-diisopropylaminopropyl)cyclohexane; 1-alumina-1-(3-dibutylaminopropyl)cyclohexane; 1-alumina-1-(4-dimethylaminobutyl)cyclohexane; 1-alumina-1-(4-diethylaminobutyl)cyclohexane; 1-alumina-1-(4-dipropylaminobutyl)cyclohexane; 1-alumina-1-(4-diisopropylaminobutyl)cyclohexane; 1-alumina-1-(4-dibutylaminobutyl)cyclohexane; 1-alumina-1-(o-diethylaminobenzyl)cyclopentane; 1-alumina-1-(o-diethylaminobenzyl)cyclohexane; 1-alumina-1-(o-diisopropylaminobenzyl)cyclohexane;1-alumina-1-(2-o-dimethylaminophenylethyl)cyclopentane;1-alumina-1-(2-o-diethylaminophenylethyl)cyclobutane; 1-galla-1-(3-dimethylaminopropyl)cyclobutane; 1-galla-1-(2-dimethylaminoethyl)cyclopentane; 1-galla-1-(3-dimethylaminopropyl)cyclopentane; 1-galla-1-(2-dimethylaminoethyl)cyclopentane; 1-galla-1-(2-diethylaminoethyl)cyclopentane; 1-galla-1-(2-dipropylaminoethyl)cyclopentane; 1-galla-1-(2-diisopropylaminoethyl)cyclopentane; 1-galla-1-(2-dibutylaminoethyl)cyclopentane; 1-galla-1-(3-diethylaminopropyl)cyclopentane; 1-galla-1-(3-dipropylaminopropyl)cyclopentane; 1-galla-1-(3-diisopropylaminopropyl)cyclopentane; 1-galla-1-(3-dibutylaminopropyl)cyclopentane; 1-galla-1-(4-dimethylaminobutyl)cyclopentane; 1-galla-1-(4-diethylaminobutyl)cyclopentane; 1-galla-1-(4-dipropylaminobutyl)cyclopentane; 1-galla-1-(4-isopropylaminobutyl)cyclopentane; 1-galla-1-(4-dibutylaminobutyl)cyclopentane; 1-galla-1-(3-dimethylaminopropyl)cyclohexane; 1-galla-1-(3-diethylaminopropyl)cyclohexane; 1-galla-1-(3-dipropylaminopropyl)cyclohexane; 1-galla-1-(3-diisopropylaminopropyl)cyclohexane; 1-galla-1-(3-dibutylaminopropyl)cyclohexane; 1-galla-1-(2-dimethylaminoethyl)cyclohexane; 1-galla-1-(2-diethylaminoethyl)cyclohexane; 1-galla-1-(2-dipropylaminoethyl)cyclohexane; 1-galla-1-(2-diisopropylaminoethyl)cyclohexane; 1-galla-1-(2-dibutylaminoethyl)cyclohexane; 1-galla-1-(4-dimethylaminobutyl)cyclohexane; 1-galla-1-(4-diethylaminobutyl)cyclohexane; 1-galla-1-(4-dipropylaminobutyl)cyclohexane; 1-galla-1-(4-isopropylaminobutyl)cyclohexane; 1-galla-1-(4-dibutylaminobutyl)cyclohexane; 1-galla-1-(o-dimethylaminobenzyl)cyclobutane; 1-galla-1-(o-dimethylaminobenzyl)cyclopentane; 1-galla-1-(o-dimethylaminobenzyl)cyclohexane; 1-galla-1-(o-diethylaminobenzyl)cyclohexane; 1-galla-1-(o-dipropylaminobenzyl)cycloheptane; 1-inda-1-(2-diethylaminoethyl)cyclobutane; 1-inda-1-(2-dimethylaminoethyl)cyclopentane; 1-inda-1-(2-diethylaminoethyl)cyclopentane; 1-inda-1-(2-dipropylaminoethyl)cyclopentane; 1-inda-1-(2- diisopropylaminoethyl)cyclopentane; dibutylaminoethyl)cyclopentane; dimethylaminopropyl)cyclopentane; diethylaminopropyl)cyclopentane; dipropylaminopropyl)cyclopentane; diisopropylaminopropyl)cyclopentane; dibutylaminopropyl)cyclopentane; dimethylaminobutyl)cyclopentane; diethylaminobutyl)cyclopentane; dipropylaminobutyl)cyclopentane; diisopropylaminobutyl)cyclopentane; dibutylaminobutyl)cyclopentane; dimethylaminoethyl)cyclohexane; diethylaminoethyl)cyclohexane; dipropylaminoethyl)cyclohexane; diisopropylaminoethyl)cyclohexane; dibutylaminoethyl)cyclohexane; dimethylaminopropyl)cyclohexane; diethylaminopropyl)cyclohexane; dipropylaminopropyl)cyclohexane; diisopropylaminopropyl)cyclohexane; dibutylaminopropyl)cyclohexane; diethylaminobutyl)cyclohexane; dipropylaminobutyl)cyclohexane; diisopropylaminobutyl)cyclohexane; dibutylaminobutyl)cyclohexane; diisopropylaminobenzyl)cyclobutane; dimethylaminobenzyl)cyclopentane; dibutylaminobenzyl)cyclopentane; dimethylaminobenzyl)cyclohexane; diethylaminobenzyl)cyclohexane; dimethylaminobenzyl)cyclooctane; 1-inda-1-(2-dimethylaminoethyl)cyclopentane; 1-inda-1-(3-dimethylaminopropyl)cyclopentane; 1-inda-1-(3-diethylaminopropyl)cyclopentane; 1-inda-1-(3-dipropylaminopropyl)cyclopentane; 1-inda-1-(3-diisopropylaminopropyl)cyclopentane; 1-inda-1-(3-dibutylaminopropyl)cyclopentane; 1-inda-1-(4-dimethylaminobutyl)cyclopentane; 1-inda-1-(4-diethylaminobutyl)cyclopentane; 1-inda-1-(4-dipropylaminobutyl)cyclopentane; 1-inda-1-(4-diisopropylaminobutyl)cyclopentane; 1-inda-1-(4-dibutylaminobutyl)cyclopentane; 1-inda-1-(2-dimethylaminoethyl)cyclohexane; 1-inda-1-(2-diethylaminoethyl)cyclohexane; 1-inda-1-(2-dipropylaminoethyl)cyclohexane; 1-inda-1-(2-diisopropylaminoethyl)cyclohexane; 1-inda-1-(2-dibutylaminoethyl)cyclohexane; 1-inda-1-(3-dimethylaminopropyl)cyclohexane; 1-inda-1-(3-diethylaminopropyl)cyclohexane; 1-inda-1-(3-dipropylaminopropyl)cyclohexane; 1-inda-1-(3-diisopropylaminopropyl)cyclohexane; 1-inda-1-(3-dibutylaminopropyl)cyclohexane; 1-inda-1-(4-diethylaminobutyl)cyclohexane; 1-inda-1-(4-dipropylaminobutyl)cyclohexane; 1-inda-1-(4-diisopropylaminobutyl)cyclohexane; 1-inda-1-(4-dibutylaminobutyl)cyclohexane; 1-inda-1-(o-dimethylaminobenzyl)cyclopentane; 1-inda-1-(o-dibutylaminobenzyl)cyclopentane; 1-inda-1-(o-dimethylaminobenzyl)cyclohexane; 1-inda-1-(o-diethylaminobenzyl)cyclohexane; 1-inda-1-(o-dimethylaminobenzyl)cyclooctane; 2,5-dimethyl-1-(3-dimethylaminopropyl)-2,5-diaza-1-aluminacyclopentane; 2,5-dimethyl-1-(3-dimethylaminopropyl)-2,5-diaza-1-aluminacyclohexane; 2,5-dimethyl-1-(3-dimethylaminopropyl)-2,5-diaza-1-aluminacycloheptane; 2,5-dimethyl-1-(3-dimethylaminopropyl)-2,5-diaza-1-aluminacyclopentane; 2,5-dimethyl-1-(3-diethylaminopropyl)-2,5-diaza-1-aluminacyclohexane; 2,5-dimethyl-1-(3-diethylaminopropyl)-2,5-diaza-1-aluminacycloheptane; 2,5-diethyl-1-(3-dimethylaminopropyl)-2,5-diaza-1-aluminacyclohexane; 2,5-diethyl-1-(3-dimethylaminopropyl)-2,5-diaza-1-aluminacyclopentane; 2,5-diethyl-1-(4-dimethylaminobutyl)-2,5-diaza-1-aluminacyclohexane; 2,5-diethyl-1-(4-dimethylaminobutyl)-2,5-diaza-1-aluminacyclopentane; 2,5-diethyl-1-(4-dimethylaminobutyl)-2,5-diaza-1-aluminacycloheptane; 2-ethyl-5-propyl-1-(4-dimethylaminobutyl)-2,5-diaza-1-aluminacyclohexane; 2-ethyl-5-propyl-1-(4-dimethylaminobutyl)-2,5-diaza-1-aluminacyclopentane; 2-ethyl-5-propyl-1-(4-dimethylaminobutyl)-2,5-diaza-1-aluminacycloheptane; 2,5-dimethyl-1-(3-dimethylaminopropyl)-2,5-diaza-1-gallacyclopentane; 2,5-dimethyl-1-(3-dimethylaminopropyl)-2,5-diaza-1-gallacyclohexane; 2,5-dimethyl-1-(3-dimethylaminopropyl)-2,5-diaza-1-gallacycloheptane; 2,5-dimethyl-1-(3-diethylaminopropyl)-2,5-diaza-1-gallacyclopentane; 2,5-dimethyl-1-(3-diethylaminopropyl)-2,5-diaza-1gallacyclohexane; 2,5-dimethyl-1-(3-diethylaminopropyl)-2,5-diaza-1-gallacycloheptane; 2,5-diethyl-1-(3-dimethylaminopropyl)-2,5-diaza-1-gallacyclohexane; 2,5-diethyl-1-(3-dimethylaminopropyl)-2,5-diaza-1-gallacyclopentane; 2,5-diethyl-1-(3-dimethylaminopropyl)-2,5-diaza-1-gallacycloheptane; 2,5-diethyl-1-(4-dimethylaminobutyl)-2,5-diaza-1-gallacyclohexane; 2,5-diethyl-1-(4-dimethylaminobutyl)-2,5-diaza-1-gallacyclopentane; 2,5-diethyl-1-(4-dimethylaminobutyl)-2,5-diaza-1-gallacycloheptane; 2-ethyl-5-propyl-1-(4-dimethylaminobutyl)-2,5-diaza-1-gallacyclohexane; 2-ethyl-5-propyl-1-(4-dimethylaminobutyl)-2,5-diaza-1-gallacyclopentane; 2-ethyl-5-propyl-1-(4-dimethylaminobutyl)-2,5-diaza-1-gallacycloheptane; 2,5-dimethyl-1-(3-dimethylaminopropyl)-2,5-diaza-1-indacyclopentane; 2,5-dimethyl-1-(3-dimethylaminopropyl)-2,5-diaza-1-indacyclohexane; 2,5-dimethyl-1-(3-dimethylaminopropyl)-2,5-diaza-1-indacycloheptane; 2,5-dimethyl-1-(3-diethylaminopropyl)-2,5-diaza-1-indacyclopentane; 2,5-dimethyl-1-(3-diethylaminopropyl)-2,5-diaza-1-indacyclohexane; 2,5-dimethyl-1-(3-diethylaminopropyl)-2,5-diaza-1-indacycloheptane; 2,5-diethyl-1-(3-dimethylaminopropyl)-2,5-diaza-1-indacyclohexane; 2,5-diethyl-1-(3-dimethylaminopropyl)-2,5-diaza-1-indacyclopentane; 2,5-diethyl-1-(3-dimethylaminopropyl)-2,5-diaza-1-indacycloheptane; 2,5-diethyl-1-(3-dimethylaminobutyl)-2,5-diaza-1-indacyclohexane; 2,5-diethyl-1-(3-dimethylaminobutyl)-2,5-diaza-1-indacyclopentane; 2,5-diethyl-1-(3-dimethylaminobutyl)-2,5-diaza-1-indacycloheptane; 2ethyl-5-propyl-1-(4-dimethylaminobutyl)-2,5-diaza-1-indacyclohexane; 2-ethyl-5-propyl-1-(4-dimethylaminobutyl)-2,5-diaza-1-indacyclopentane and 2-ethyl-5-propyl-1(4-dimethylaminobutyl)-2,5-diaza-1indacycloheptane;

(E) the organometallic compound of Formula (IV) is selected from the group consisting of:

5-methyl-1-galla-5-azacyclooctane; 1,5-dimethyl-1-galla-5-azacyclooctane; 1,5-diethyl-1-galla-5-azacyclooctane; 1,5-dipropyl-1-galla-5-azacyclooctane; 1,5-dimethyl-1alumina-5-azacyclooctane; 1,5-diethyl-1alumina-5-azacyclooctane; 1,5-diisopropyl-1alumina-5-azacyclooctane; 1,5-dibutyl-1alumina-5-azacyclooctane; 1-methyl-5-ethyl-1-galla-5-azacyclooctane; 1-ethyl-5-methyl-1alumina-5-azacyclooctane; 1,6-dimethyl-1-galla-6-azacyclodecane; 1,6-dimethyl-1alumina-6-azacyclodecane; 1,6-diethyl-1-galla-6-azacyclodecane; 1,4-dimethyl-1-galla-4-azacyclohexane; 1,6-diethyl-1-alumina-6-azacyclodecane; 1-galla-5-azabicyclo[3.3.3]undecane; 1-galla-4-azabicyclo[2.2.2]octane; 1-alumina-5-azabicyclo[3.3.3]undecane; 1-alumina-4-azabicyclo[2.2.2]octane; 1-galla-6-azabicyclo[4.4.4]tetradecane; 1-alumina-6-azabicyclo[4.4.4]tetradecane; 1,5-dimethyl-1inda-5-azacyclooctane; 1,5-diethyl-1inda-5-azacyclooctane; 1,5-dipropyl-1inda-5-azacyclooctane; 1,5-diisopropyl-1inda-5-azacyclooctane; 1,5-dibutyl-1inda-5-azacyclooctane; 1-methyl-5-ethyl-1inda-5-azacyclooctane; 1-ethyl-5-propyl-1inda-5-azacyclooctane; 1,6-dimethyl-1inda-6-azacyclodecane; 1,6-diethyl-1inda-6-azacyclodecane; 1,4-dimethyl-1inda-4-azacyclohexane; 1-inda-5-azabicyclo[3.3.3]undecane; 1-inda-4-azabicyclo[2.2.2]octane; 1-methyl-5-cyclohexyl-1inda-5-azacyclooctane; 1-methyl-5-phenyl-1-inda-5-azacyclooctane; 1-inda-6-azabicyclo[4.4.4]tetradecane; 1,6-dimethyl-1-galla-6-azacyclodecane; 1,6-diethyl-1-galla-6-azacyclodecane; 1,6-dipropyl-1galla-6-azacyclodecane; 1,6-diisopropyl-1galla-6-azacyclodecane; 1,6-dibutyl-1galla-6-azacyclodecane; 1,6-di-tert-butyl-1galla-6-azacyclodecane; 1,6-diisobutyl-1galla-6-azacyclodecane; 1,4-dimethyl-1-galla-4-azacyclohexane; 1,4-diethyl-1-galla-4-azacyclohexane; 1,4-dipropyl -1-galla-4-azacyclohexane; 1,4-diisopropyl-1galla-4-azacyclohexane; 1,4-dibutyl-1galla-4-azacyclohexane; 1,4-diisobutyl-1galla-4-azacyclohexane; 1,4-di-tert-butyl-1galla-4-azacyclohexane; 1-methyl-5-ethyl-1galla-5-azacyclooctane; 1-methyl-5-propyl-1galla-5-azacyclooctane; 1-propyl-5-methyl-1galla-5-azacyclooctane; 1-ethyl-5-methyl-1galla-5-azacyclooctane; 1-ethyl-6-propyl-1galla-6-azacyclodecane; 1-propyl-6-butyl-1galla-6-azacyclodecane; 1-methyl-6-ethyl-1galla-6-azacyclodecane; 1-methyl-4-ethyl-1galla-4-azacyclohexane; 1-propyl-4-methyl-1galla-4-azacyclohexane, and 1-ethyl-4-butyl-1galla-4-azacyclohexane, substituted by $C_{1-6}$-alkyl, $C_{5-7}$-cycloalkyl or phenyl; or (F) the organometallic compound of Formula (III) is selected from the group consisting of ethylaluminacyclopentane (($C_4H_8$)$AlC_2H_5$) ring-substituted ethylaluminacyclopentanes (($RCH_2CH$)$_n C_4H_{(8-n)} AlC_2H_5$) and ethylaluminacyclopentene (($RCH_2CH$)$_2 C_4 AlC_2H_5$), wherein R=$C_3H_7$, $C_5H^{11}$, or $C_8H_{17}$ and n=1 or 2.

5. The catalyst system of claim 1 wherein the metallocene pre-catalyst compound is at least one transition metal compound represented by the formula:

$$Cp^*_q ZL^x_m L^y_n L^3_p \quad (I)$$

wherein:
(a) each Cp* independently represents anionic, delocalized, π-bonded, cyclopentadienyl group, substituted cyclopentadienyl group, cyclopentadienyl derivative group, or substituted cyclopentadienyl derivative group, with two Cp* groups being optionally joined together by a moiety having up to 30 non-hydrogen atoms thereby forming a bridged structure;
(b) Z represents at least one transition metal selected from Ti, Zr, or Hf in the +2, +3 or +4 oxidation state, provided however that titanium in the +3 formal oxidation state is not an active metallocene polymerization catalyst;
(c) $L^x$ is divalent substituent of up to 50 non-hydrogen atoms that, when present, together with Cp* forms a metallocycle with Z;
(d) $L^y$ each occurrence independently represents an optional neutral Lewis base having up to 20 non-hydrogen atoms, or $L^y$ represents a second transition metal compound of the same type as in said formula such that two metal Z centers are bridged by one or two $L^3$ groups;
(e) $L^3$ each occurrence independently represents a monovalent, anionic moiety having up to 50 non-hydrogen atoms, or a neutral, conjugated or non-conjugated diene π-bonded to Z, optionally with two $L^3$ groups together constituting a divalent anionic moiety having both valences bound to Z, and optionally with $L^3$ and $L^y$ together constituting a moiety both covalently bound to Z and coordinated thereto by a Lewis base functionality;
(f) q is an integer of 1 or 2 and represents the number of Cp* groups bound to Z;
(g) m is an integer of 0 or 1 and represents the number of $L^x$ groups bound to Z;
(h) n is an integer of from 0 to 3;
(i) p is an integer of from 1 to 3;
(j) the sum of q+m+p being equal to the formal oxidation state of Z; and
provided that where any one of $L^x$, $L^y$ and $L^3$ is hydrocarbyl containing, such L group is not Cp*.

6. The catalyst system of claim 5 wherein:
Formula (I) contains two Cp* groups linked by a bridging group corresponding to the Formula:

$$(E(R^1)_2)_x \quad (II)$$

wherein
E is silicon or carbon;
$R^1$ each occurrence independently represents hydrogen, silyl, hydrocarbyl, or hydrocarbyloxy having up to 30 carbon or silicon atoms; and x is an integer of 1 to 8; and
wherein Cp* is selected from the group consisting of cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl.

7. The catalyst system of claim 5 wherein $L^3$ is selected from halogen or hydrogen, and (c3) is at least one organometallic compound represented by the formula:

$$M(R^{12})_s$$

wherein M is aluminum, $R^{12}$ is hydrocarbyl, and s is 3, intimately associated with said pre-catalyst in an amount sufficient to provide a molar ratio of organometallic compound to pre-catalyst of from about 1:1 to about 2000:1.

8. The catalyst system of claim 5 wherein the metallocene pre-catalyst compound is selected from the group consisting of (Indenyl)$_2$ ZrCl$_2$, (n-butylcyclopentadienyl)$_2$ ZrCl$_2$, rac-bis(Indenyl)ethan-1,2-diyl-ZrCl$_2$, bis(1-n-butyl-3-methylcyclopentadienyl)zirconium dichloride, Rac-dimethylsilyl-bis(Indenyl)zirconium dichloride and Rac-dimethylsilylbis(2-methylindenyl)zirconium dichloride.

9. The catalyst system of claim 1 further comprising a fine particle carrier, wherein said catalyst system or at least one of said component (A), (B) or (C) is supported on the fine particle carrier.

10. A process for preparing an olefin polymerization catalyst system comprising bringing into contact in an inert solvent or diluent under an inert atmosphere:
(A) at least one metallocene pre-catalyst compound or polymerization-active metallocene compound;
(B) at least one titanium-containing metallocene compound;
and when (A) is a metallocene pre-catalyst compound
(C) at least one compound selected from the group consisting of:
(c1) an organoaluminum oxy-compound;
(c2) an ionizing ionic compound; and
(c3) an organoaluminum compound;
provided however:
(I) the titanium-containing metallocene compound is inactive or substantially inactive for the polymerization of olefins; or
(II) when the titanium-containing metallocene compound is active for olefin polymerization and thereby includes titanium which exhibits an oxidation state of Ti$^{+4}$, it is modified so that the titanium exhibits an oxidation state of Ti$^{+3}$ so as to inactivate or substantially inactivate the titanium-containing metallocene for olefin polymerization;
wherein substantially inactive means that the titanium compound will produce less than about 50% of the amount of polyolefin compared to its polymerization-active counterpart.

11. The process according to claim 10 wherein the titanocene is deactivated using a concentration of at least one (1) organometallic compound or (2) organoaluminum compound or (3) alumoxane compound sufficient to react with the titanium-containing metallocene at the temperature of reaction and for a time sufficient to deactivate or substantially deactivate the metallocene for olefin polymerization.

12. The process according to claim 11 wherein:
(1) the organometallic compound is a compound represented by Fromula (III) or Formula (IV):

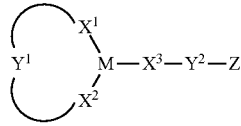

wherein M is B, Al, Ga or In;
$X^1$, $x^2$, $x^3$ are, in each case independently of one another, $CHR^1$, $NR^2$, O or S;
$Y^1$, $Y^2$ are, in each case independently of one another, —$(CH_2)_m$—, O—$(CH_2)_p$—$C_6H_4$—$(CH_2)_q$—, O—$(CH_2)_p$—$C_6H_6$—$(CH_2)_q$—, O—$(CH_2)_p$—$C_6H_8$—$(CH_2)_q$—, O—$(CH_2)_p$—$C_6H_{10}$—$(CH_2)_q$—, O—$(CH_2)_p$—$C_5H_4$—$(CH_2)_q$—, O—$(CH_2)_p$—$C_5H_6$—$(CH_2)_q$—, O—$(CH_2)_p$—$C_5H_8$—$(CH_2)_q$—, or —$(CH_2)_p$—CH=CH—$(CH_2)_q$—;
Z is $NR^3 R^4$, $PR^3 R^4$, $OR^5$ or $SR^5$;
$R^1$ is H, OH, halogen, $C_{1-6}$-alkyl or $C_{1-6}$-alkoxyl, $C_{5-7}$-cycloalkyl or phenyl;
$R^2$, $R^3$, $R^4$, $R^5$ are, in each case independently of one another, H or $C_{1-6}$-alkyl, $C_{5-7}$-cycloalkyl, phenyl, or wherein $R^3$ and $R^4$ together also form a $C_{4-6}$-alkylene bridge;
m is a number from 1 to 6;
p, q are, in each case independently of one another, a number from 0 to 2;

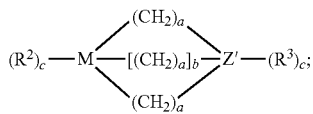

wherein M, $R^2$ and $R^3$ are defined as above and in which Z' is N or P;
a is a number from 2 to 4; and
b, c are the numbers 0 or 1 with b+c=1;
(2) the organoaluminum compound is a compound represented by Formula (I) or Formula (II):

wherein:
$R^a$ is a hydrocarbon group of 1 to 12 carbon atoms, X is a halogen atom or hydrogen, and n is 1 to 3; and wherein Y is —$OR^b$ group, —$OSiR^c_3$ group, —$OAlR^d_2$ group, —$NR^e_2$ group, —$SiR^f_3$ group or —$N(R^g)AlR^h_2$ group; n is 1 to 2; $R^b$, $R^c$, $R^d$ and $R^h$ are each independently selected from the group consisting of methyl, ethyl, isopropyl, isobutyl, cyclohexyl, and phenyl; $R^e$ is selected from the group consisting of hydrogen, methyl, ethyl, isopropyl, phenyl, and trimethylsilyl; and $R^f$ and $R^g$ are each independently methyl or ethyl;

(3) the alumoxane compound is a compound represented by Formula (A) or Formula (B):

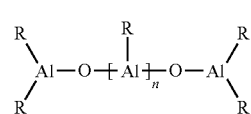

Linear Structure

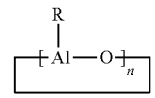

Cyclic Structure wherein in the above formulas, R is a $C_1$ to about $C_{20}$ alkyl group; a $C_2$ to about $C_{20}$ alkenyl group; or a $C_7$ to about $C_{12}$ arylalkyl group; and n is an integer indicating a degree of polymerization and is about 2 to about 50.

13. The process according to claim 12 wherein:
(A) the organoaluminum compound of Formula (I) is selected from the group consisting of trimethylaluminum, triethylaluminum, triisopropylaluminum, triisobutylaluminum, trioctylaluminum, tri-2-ethylhexylaluminum, isoprenylaluminum, dimethylaluminum chloride, diethylaluminum chloride, diisopropylaluminum chloride, diisobutylaluminum chloride, dimethylaluminum bromide, methylaluminum sesquichoride, ethylaluminum sesquichloride, isopropylaluminum sesquichloride, butylaluminum sesquichloride, ethylaluminum sesquibromide, methylaluminum dichloride, ethylaluminum dichloride, isopropylaluminum dichloride, ethylaluminum dibromide, dimethylaluminum hydride, diethylaluminum hydride, dihydrophenylaluminum, diisopropylaluminum hydride, di-n-butylaluminum hydride, diisobutylaluminum hydride, diisohexylaluminum hydride, diphenylaluminum hydride, dicylohexylaluminum hydride, di-sec-heptylaluminum hydride and di-sec-nonylaluminum hydride; or
(B) the organoaluminum compound of Formula (II) is selected from the group consisting of dimethylaluminum methoxide, diethylaluminum ethoxide and diisobutylaluminum methoxide, diethylaluminum phenoxide, $Et_2Al(OSiMe_3)$, $(iso-Bu)_2Al(OSiMe_3)$, $(iso-Bu)_2Al(OSiEt_3)$, $Et_2AlOAlEt_2$, $(iso-Bu)_2AlOAl(iso-Bu)_2$, $Me_2AlNEt_2$, $Et_2AlNHMe$, $Me_2AlNHEt$, $Et_2AlN(SiMe_3)_2$, $(iso-Bu)_2AlN(SiMe_3)_2$, $(iso-Bu)_2AlSiMe_3$, $Et_2AlN(Me)AlEt_2$ and $(iso-Bu)_2AlN(Et)Al(iso-Bu)_2$; or
(C) the alumoxane compound of Formula (A) or Formula (B) is methylalumoxane or ethylalumoxane or isobutylalumoxane;
(D) the organometallic compound of Formula (III) is selected from the group consisting of:
1-alumina-1(4-dimethylaminobutyl)cyclobutane; 1-alumina-1(2-dimethylaminoethyl)cyclopentane; 1-alumina-1(2-diethylaminoethyl)cyclopentane; 1-alumina-1(2-dipropylaminoethyl)cyclopentane; 1-alumina-1(2-diisopropylaminoethyl)cyclopentane; 1-alumina-1(2-dibutylaminoethyl)cyclopentane; 1-alumina-1(3-dimethylaminopropyl)cyclopentane; 1-alumina-1(3-diethylaminopropyl)cyclopentane; 1-alumina-1(3-dipropylaminopropyl)cyclopentane; 1-alumina-1(3-diisopropylaminopropyl)cyclopentane; 1-alumina-1(3-dibutylaminopropyl)cyclopentane; 1-alumina-1(4- dimethylaminobutyl)cyclopentane; 1-alumina-1(4-diethylaminobutyl)cyclopentane; 1-alumina-1(4-dipropylaminobutyl)cyclopentane; 1-alumina-1(4-diisopropylaminobutyl)cyclopentane; 1-alumina-1(4-dibutylaminobutyl)cyclopentane; 1-alumina-1(3-dimetylaminopropyl)-2-methylcyclopentane; 1-alumina-1(2-dimethylaminoethyl)cyclohexane; 1-alumina-1(2-diethylaminoethyl)cyclohexane; 1-alumina-1(2-dipropylaminoethyl)cyclohexane; 1-alumina-1(2-diisopropylaminoethyl)cyclohexane; 1-alumina-1(2-dibutylaminoethyl)cyclohexane; 1-alumina-1(3-dimethylaminopropyl)cyclohexane; 1-alumina-1(3-diethylaminopropyl)cyclohexane; 1-alumina-1(3-dipropylaminopropyl)cyclohexane; 1-alumina-1(3-diisopropylaminopropyl)cyclohexane; 1-alumina-1(3-dibutylaminopropyl)cyclohexane; 1-alumina-1(4-dimethylaminobutyl)cyclohexane; 1-alumina-1(4-diethylaminobutyl)cyclohexane; 1-alumina-1(4-diisopropylaminobutyl)cyclohexane; 1-alumina-1(4-dibutylaminobutyl)cyclohexane; 1-alumina-1-(o-diethylaminobenzyl)cyclopentane; 1-alumina-1-(o-diethylaminobenzyl)cyclohexane; 1-alumina-1-(o-diisopropylaminobenzyl)cyclohexane; 1-alumina-1-(2-o-dimethylaminophenylethyl)cyclopentane; 1-alumina-1-(2-o-diethylaminophenylethyl)cyclobutane; 1-galla-1-(3-dimethylaminopropyl)cyclobutane; 1-galla-1-(2-dimethylaminoethyl)cyclopentane; 1-galla-1-(3-dimethylaminopropyl)cyclopentane; 1-galla-1-(2-dimethylaminoethyl)cyclopentane; 1-galla-1-(2-diethylaminoethyl)cyclopentane; 1-galla-1-(2-dipropylaminoethyl)cyclopentane; 1-galla-1-(2-diisopropylaminoethyl)cyclopentane; 1-galla-1-(2-dibutylaminoethyl)cyclopentane; 1-galla-1-(3-diethylaminopropyl)cyclopentane; 1-galla-1-(3-dipropylaminopropyl)cyclopentane; 1-galla-1-(3-diisopropylaminopropyl)cyclopentane; 1-galla-1-(3-dibutylaminopropyl)cyclopentane; 1-galla-1-(4-dimethylaminobutyl)cyclopentane; 1-galla-1-(4-diethylaminobutyl)cyclopentane; 1-galla-1-(4-dipropylaminobutyl)cyclopentane; 1-galla-1-(4-isopropylaminobutyl)cyclopentane; 1-galla-1-(4-dibutylaminobutyl)cyclopentane; 1-galla-1-(3-dimethylaminopropyl)cyclohexane; 1-galla-1-(3-diethylaminopropyl)cyclohexane; 1-galla-1-(3-dipropylaminopropyl)cyclohexane; 1-galla-1-(3-diisopropylaminopropyl)cyclohexane; 1-galla-1-(3-dibutylaminopropyl)cyclohexane; 1-galla-1-(2-diethylaminoethyl)cyclohexane; 1-galla-1-(2-dipropylaminoethyl)cyclohexane; 1-galla-1-(2-diisopropylaminoethyl)cyclohexane; 1-galla-1-(2-dibutylaminoethyl)cyclohexane; 1-galla-1-(4-dimethylaminobutyl)cyclohexane; 1-galla-1-(4-diethylaminobutyl)cyclohexane; 1-galla-1-(4-dipropylaminobutyl)cyclohexane; 1-galla-1-(4-isopropylaminobutyl)cyclohexane; 1-galla-1-(4-dibutylaminobutyl)cyclohexane; 1-galla-1-(o-dimethylaminobenzyl)cyclobutane; 1-galla-1-(o-dimethylaminobenzyl)cyclopentane; 1-galla-1-(o-dimethylaminobenzyl)cyclohexane; 1-galla-1-(o-diethylaminobenzyl)cyclohexane; 1-galla-1-(o-dipropylaminobenzyl)cycloheptane; 1-inda-1-(2-diethylaminoethyl)cyclobutane; 1-inda-1-(2-dimethylaminoethyl)cyclopentane; 1-inda-1-(2-diethylaminoethyl)cyclopentane; 1-inda-1-(2-dipropylaminoethyl)cyclopentane; 1-inda-1-(2-diisopropylaminoethyl)cyclopentane; 1-inda-1-(2-dibutylaminoethyl)cyclopentane; 1-inda-1-(3-dimethylaminopropyl)cyclopentane; 1-inda-1-(3-diethylaminopropyl)cyclopentane; 1-inda-1-(3-dipropylaminopropyl)cyclopentane; 1-inda-1-(3-diisopropylaminopropyl)cyclopentane; 1-inda-1-(3-dibutylaminopropyl)cyclopentane; 1-inda-1-(4-dimethylaminobutyl)cyclopentane; 1-inda-1-(4-diethylaminobutyl)cyclopentane; 1-inda-1-(4-dipropylaminobutyl)cyclopentane; 1-inda-1-(4-diisopropylaminobutyl)cyclopentane; 1-inda-1-(4-dibutylaminobutyl)cyclopentane; 1-inda-1-(2-dimethylaminoethyl)cyclohexane; 1-inda-1-(2-diethylaminoethyl)cyclohexane; 1-inda-1-(2-dipropylaminoethyl)cyclohexane; 1-inda-1-(2-diisopropylaminoethyl)cyclohexane; 1-inda-1-(2-dibutylaminoethyl)cyclohexane; 1-inda-1-(3-dimethylaminopropyl)cyclohexane; 1-inda-1-(3-diethylaminopropyl)cyclohexane; 1-inda-1-(3-dipropylaminopropyl)cyclohexane; 1-inda-1-(3-diisopropylaminopropyl)cyclohexane; 1-inda-1-(3-dibutylaminopropyl)cyclohexane; 1-inda-1-(4-dimethylaminobutyl)cyclohexane; 1-inda-1-(4-diethylaminobutyl)cyclohexane; 1-inda-1-(4-dipropylaminobutyl)cyclohexane; 1-inda-1-(4-diisopropylaminobutyl)cyclohexane; 1-inda-1-(4-dibutylaminobutyl)cyclohexane; 1-inda-1-(o-dimethylaminobenzyl)cyclopentane; 1-inda-1-(o-dibutylaminobenzyl)cyclopentane; 1-inda-1-(o-dimethylaminobenzyl)cyclohexane; 1-inda-1-(o-diethylaminobenzyl)cyclohexane; 1-inda-1-(o-dimethylaminobenzyl)cyclooctane; 2,5-dimethyl-1(3-dimethylaminopropyl)-2,5-diaza-1aluminacyclopentane; 2,5-dimethyl-1-(3-dimethylaminopropyl)-2,5-diaza-1aluminacyclohexane; 2,5-dimethyl-1(3-dimethylaminopropyl)-2,5-diaza-1aluminacycloheptane; 2,5-dimethyl-1(3-dimethylaminopropyl)-2,5-diaza-1-aluminacyclopentane; 2,5-dimethyl-1(3-diethylaminopropyl)-2,5-diaza-1aluminacyclohexane; 2,5-dimethyl-1(3-diethylaminopropyl)-2,5-diaza-1aluminacycloheptane; 2,5-diethyl-1(3-dimethylaminopropyl)-2,5-diaza-1aluminacyclohexane; 2,5-diethyl-1-(3-dimethylaminopropyl)-2,5-diaza-1aluminacyclopentane; 2,5-diethyl-1(4-dimethylaminobutyl)-2,5-diaza-1aluminacyclohexane; 2,5-diethyl-1(4-dimethylaminobutyl)-2,5-diaza-1-aluminacyclopentane; 2,5-diethyl-1(4-dimethylaminobutyl)-2,5-diaza-1-aluminacycloheptane; 2-ethyl-5-propyl-1(4-dimethylaminobutyl)-2,5-diaza-1aluminacyclohexane; 2-ethyl-5-propyl-1(4-dimethylaminobutyl)-2,5-diaza-1aluminacyclopentane; 2-ethyl-5-propyl-1(4-dimethylaminobutyl)-2,5-diaza-1-aluminacycloheptane; 2,5-dimethyl-1(3-dimethylaminopropyl)-2,5-diaza-1gallacyclopentane; 2,5-dimethyl-1(3-dimethylaminopropyl)-2,5-diaza-1gallacyclohexane; 2,5-dimethyl-1(3-dimethylaminopropyl)-2,5-diaza-1gallacycloheptane; 2,5-dimethyl-1-(3-diethylaminopropyl)-2,5-diaza-1gallacyclopentane; 2,5-dimethyl-1-(3-diethylaminopropyl)-2,5-diaza-1gallacyclohexane; 2,5-dimethyl-1(3-diethylaminopropyl)-2,5-diaza-1gallacycloheptane; 2,5-diethyl-1(3-dimethylaminopropyl)-2,5-diaza-1gallacyclohexane; 2,5-diethyl-1(3-dimethylaminopropyl)-2,5-diaza-1-gallacyclopentane; 2,5-diethyl-1(3-dimethylaminopropyl)-2,5-diaza-1-gallacycloheptane; 2,5-diethyl-1(4-dimethylaminobutyl)-2,5-diaza-1gallacyclohexane;

2,5-diethyl-1(4-dimethylaminobutyl)-2,5-diaza-1gallacyclopentane; 2,5-diethyl-1(4-dimethylaminobutyl)-2,5-diaza-1gallacycloheptane; 2-ethyl-5-propyl-1(4-dimethylaminobutyl)-2,5-diaza-1gallacyclohexane; 2-ethyl-5-propyl-1-(4-dimethylaminobutyl)-2,5-diaza-1gallacyclopentane; 2-ethyl-5-propyl-1(4-dimethylaminobutyl)-2,5-diaza-1gallacycloheptane; 2,5-dimethyl-1(3-dimethylaminopropyl)-2,5-diaza-1indacyclopentane; 2,5-dimethyl-1(3-dimethylaminopropyl)-2,5-diaza-1-indacyclohexane; 2,5-dimethyl-1(3-dimethylaminopropyl)-2,5-diaza-1-indacycloheptane; 2,5-dimethyl-1(3-diethylaminopropyl)-2,5-diaza-1-indacyclopentane; 2,5-dimethyl-1(3-diethylaminopropyl)-2,5-diaza-1indacyclohexane; 2,5-dimethyl-1(3-diethylaminopropyl)-2,5-diaza-1-indacycloheptane; 2,5-diethyl-1(3-dimethylaminopropyl)-2,5-diaza-1indacyclohexane; 2,5-diethyl-1(3-dimethylaminopropyl)-2,5-diaza-1indacyclopentane; 2,5-diethyl-1(3-dimethylaminopropyl)-2,5-diaza-1indacycloheptane; 2,5-diethyl-1-(3-dimethylaminobutyl)-2,5-diaza-1indacyclohexane; 2,5-diethyl-1-(3-dimethylaminobutyl)-2,5-diaza-1indacyclopentane; 2,5-diethyl-1-(3-dimethylaminobutyl)-2,5-diaza-1indacycloheptane; 2-ethyl-5-propyl-1(4-dimethylaminobutyl)-2,5-diaza-1indacyclohexane; 2-ethyl-5-propyl-1(4-dimethylaminobutyl)-2,5-diaza-1-indacyclopentane and 2-ethyl-5-propyl-1(4-dimethylaminobutyl)-2,5-diaza-1indacycloheptane; or (E) the organometallic compound of Formula (IV) is selected from the group consisting of:

5-methyl-1-galla-5-azacyclooctane; 1,5-dimethyl-1-galla-5-azacyclooctane; 1,5-diethyl-1-galla-5-azacyclooctane; 1,5-dipropyl-1-galla-5-azacyclooctane; 1,5-dimethyl-1alumina-5-azacyclooctane; 1,5-diethyl-1alumina-5-azacyclooctane; 1,5-diisopropyl-1alumina-5-azacyclooctane; 1,5-dibutyl-1alumina-5-azacyclooctane; 1-methyl-5-ethyl-1-galla-5-azacyclooctane; 1-ethyl-5-methyl-1alumina-5-azacyclooctane; 1,6-dimethyl-1-galla-6-azacyclodecane; 1,6-dimethyl-1alumina-6-azacyclodecane; 1,6-diethyl-1-galla-6-azacyclodecane; 1,4-dimethyl-1-galla-4-azacyclohexane; 1,6-diethyl-1-alumina-6-azacyclodecane; 1-galla-5-azabicyclo[3.3.3]undecane; 1-galla-4-azabicyclo[2.2.2]octane; 1-alumina-5-azabicyclo[3.3.3]undecane; 1-alumina-4-azabicyclo[2.2.2]octane; 1-galla-6-azabicyclo[4.4.4]tetradecane; 1-alumina-6-azabicyclo[4.4.4]tetradecane; 1,5-dimethyl-1inda-5-azacyclooctane; 1,5-diethyl-1inda-5-azacyclooctane; 1,5-dipropyl-1inda-5-azacyclooctane; 1,5-diisopropyl-1inda-5-azacyclooctane; 1,5-dibutyl-1inda-5-azacyclooctane; 1-methyl-5-ethyl-1inda-5-azacyclooctane; 1-ethyl-5-propyl-1inda-5-azacyclooctane; 1,6-dimethyl-1inda-6-azacyclodecane; 1,6-diethyl-1inda-6-azacyclodecane; 1,4-dimethyl-1inda-4-azacyclohexane; 1-inda-5-azabicyclo[3.3.3]undecane; 1-inda-4-azabicyclo[2.2.2]octane; 1-methyl-5-cyclohexyl-1inda-5-azacyclooctane; 1-methyl-5-phenyl-1-inda-5-azacyclooctane; 1-inda-6-azabicyclo[4.4.4]tetradecane; 1,6-dimethyl-1-galla-6-azacyclodecane; 1,6-diethyl-1-galla-6-azacyclodecane; 1,6-dipropyl-1galla-6-azacyclodecane; 1,6-diisopropyl-1galla-6-azacyclodecane; 1,6-dibutyl-1galla-6-azacyclodecane; 1,6-di-tert-butyl-1galla-6-azacyclodecane; 1,6-diisobutyl-1galla-6-azacyclodecane; 1,4-dimethyl-1-galla-4-azacyclohexane; 1,4-diethyl-1-galla-4-azacyclohexane; 1,4-dipropyl-1-galla-4-azacyclohexane; 1,4-diisopropyl-1-galla-4-azacyclohexane; 1,4-dibutyl-1-galla-4-azacyclohexane; 1,4-diisobutyl-1-galla-4-azacyclohexane; 1,4-di-tert-butyl-1-galla-4-azacyclohexane; 1-methyl-5-ethyl-1-galla-5-azacyclooctane; 1-methyl-5-propyl-1-galla-5-azacyclooctane; 1-propyl-5-methyl-1-galla-5-azacyclooctane; 1-ethyl-5-methyl-1-galla-5-azacyclooctane; 1-ethyl-6-propyl-1-galla-6-azacyclodecane; 1-propyl-6-butyl-1-galla-6-azacyclodecane; 1-methyl-6-ethyl-1-galla-6-azacyclodecane; 1-methyl-4-ethyl-1-galla-4-azacyclohexane; 1-propyl-4-methyl-1-galla-4-azacyclohexane, and 1-ethyl-4-butyl-1-galla-4-azacyclohexane, substituted by $C_{1-6}$-alkyl, $C_{5-7}$-cycloalkyl or phenyl; or (F) the organometallic compound of Formula (III) is selected from the group consisting of ethylaluminacyclopentane $((C_4H_8)AlC_2H_5)$, ring-substituted ethylaluminacyclopentanes $((RCH_2CH)_nC_4H_{(8-n)}AlC_2H_5)$ and ethylaluminacyclopentene $((RCH_2CH)_2C_4H_4AlC_2H_5)$, wherein $R=C_3H_7$, $C_5H_{11}$, or $C_8H_{17}$ and n=1 or 2.

14. The process according to claim 10 wherein the metallocene pre-catalyst compound is at least one transition metal compound represented by the formula:

wherein:

(a) each Cp* independently represents anionic, delocalized, π-bonded, cyclopentadienyl group, substituted cyclopentadienyl group, cyclopentadienyl derivative group, or substituted cyclopentadienyl derivative group, with two Cp* groups being optionally joined together by a moiety having up to 30 non-hydrogen atoms thereby forming a bridged structure;

(b) Z represents at least one transition metal selected from Ti, Zr, or Hf in the +2, +3 or +4 oxidation state, provided however that titanium in the +3 formal oxidation state is not an active metallocene polymerization catalyst;

(c) $L^x$ is divalent substituent of up to 50 non-hydrogen atoms that, when present, together with Cp* forms a metallocycle with Z;

(d) $L^y$ each occurrence independently represents an optional neutral Lewis base having up to 20 non-hydrogen atoms, or $L^y$ represents a second transition metal compound of the same type as in said formula such that two metal Z centers are bridged by one or two $L^3$ groups;

(e) $L^3$ each occurrence independently represents a monovalent, anionic moiety having up to 50 non-hydrogen atoms, or a neutral, conjugated or non-conjugated diene n-bonded to Z, optionally with two $L^3$ groups together constituting a divalent anionic moiety having both valences bound to Z, and optionally with $L^3$ and $L^y$ together constituting a moiety both covalently bound to Z and coordinated thereto by a Lewis base functionality;

(f) q is an integer of 1 or 2 and represents the number of Cp* groups bound to Z;

(g) m is an integer of 0 or 1 and represents the number of $L^x$ groups bound to Z;

(h) n is an integer of from 0 to 3;

(i) p is an integer of from 1 to 3;

(j) the sum of q+m+p being equal to the formal oxidation state of Z; and provided that where any one of $L^x$, $L^y$ and $L^3$ is hydrocarbyl containing, such L group is not Cp*.

15. The process according to claim 14 wherein:
Formula (I) contains two Cp* groups linked by a bridging group corresponding to the Formula:

$$(E(R^1)_2)_x \quad \text{(II)}$$

wherein
E is silicon or carbon;
$R^1$ each occurrence independently represents hydrogen, silyl, hydrocarbyl, or hydrocarbyloxy having up to 30 carbon or silicon atoms; and x is an integer of 1 to 8; and
wherein Cp* is selected from the group consisting of cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl.

16. The process according to claim 14 wherein $L^3$ is selected from halogen or hydrogen, and (c3) is at least one organometallic compound represented by the formula:

$$M(R^{12})_s$$

wherein M is aluminum, $R^{12}$ is hydrocarbyl, and s is 3, intimately associated with said pre-catalyst in an amount sufficient to provide a molar ratio of organometallic compound to pre-catalyst of from about 1:1 to about 2000:1.

17. The process according to claim 14 wherein the metallocene pre-catalyst compound is selected from the group consisting of (Indenyl)$_2$ ZrCl$_2$, (n-butylcyclopentadienyl)$_2$ ZrCl$_2$, rac-bis(Indenyl)ethan-1,2-diyl-ZrCl$_2$, bis(1-n-butyl-3-methyl-cyclopentadienyl)zirconium dichloride, rac-dimethylsilylbis(Indenyl)zirconium dichloride and rac-dimethylsilylbis(2-methylindenyl)zirconium dichloride.

18. The process according to claim 10 further comprising contacting (A), and ((B) or (C)) in the presence of a fine particle carrier and optionally thereafter removing the solvent or diluent.

19. The process of claim 10 wherein the polymerization-active metallocene compound or the pre-catalyst metallocene compound are activated for olefin polymerization by contact with an alkylalumoxane.

20. A process for homopolymerizing an olefin, alpha-olefin or cyclic olefin, or copolymerizing an olefin, alpha-olefin or cyclic olefin with at least one $C_3$ to $C_{20}$ alpha-olefin monomer and optionally with at least one polymerizable diene to form a polymer under olefin polymerization conditions and using the catalyst according to claim 1 wherein optionally at least one catalyst component is supported on a carrier, the process suitable for producing a polyolefin exhibiting: (I) a molecular weight distribution as measured by Mw/Mn, wherein Mw is weight average molecular weight and Mn is number average molecular weight, of greater than about 1.75 and less than about 3; and (II) a melt index (MI), measured according to ASTM D 1238, Condition E, of less than 1.0.

* * * * *